United States Patent
Ryu et al.

(10) Patent No.: US 10,736,044 B2
(45) Date of Patent: Aug. 4, 2020

(54) METHOD AND DEVICE FOR CONTROLLING TRANSMISSION POWER OF USER EQUIPMENT IN BEAMFORMING SYSTEM

(71) Applicant: Samsung Electronics Co., Ltd., Suwon-si, Gyeonggi-do (KR)

(72) Inventors: Hyunseok Ryu, Yongin-si (KR); Namjeong Lee, Suwon-si (KR); Jeongho Park, Seoul (KR); Jiyun Seol, Seongnam-si (KR); Hyukmin Son, Hanam-si (KR); Peng Xue, Suwon-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/347,440

(22) PCT Filed: Nov. 3, 2017

(86) PCT No.: PCT/KR2017/012394
§ 371 (c)(1),
(2) Date: May 3, 2019

(87) PCT Pub. No.: WO2018/084626
PCT Pub. Date: May 11, 2018

(65) Prior Publication Data
US 2019/0268852 A1    Aug. 29, 2019

(30) Foreign Application Priority Data

Nov. 3, 2016 (KR) ........................ 10-2016-0146079
Jan. 6, 2017 (KR) ........................ 10-2017-0002569
(Continued)

(51) Int. Cl.
*H04W 52/14* (2009.01)
*H04L 5/00* (2006.01)
(Continued)

(52) U.S. Cl.
CPC .......... *H04W 52/14* (2013.01); *H04L 5/0048* (2013.01); *H04L 5/0051* (2013.01); *H04W 16/28* (2013.01);
(Continued)

(58) Field of Classification Search
CPC .... H04L 5/0048; H04L 5/0051; H04W 16/28; H04W 52/14; H04W 52/146;
(Continued)

(56) References Cited

U.S. PATENT DOCUMENTS 9,414,332 B2    8/2016  Dinan
2011/0058505 A1    3/2011  Pan et al.
(Continued)

FOREIGN PATENT DOCUMENTS

EP        2 276 302 A1    1/2011
KR    10-2014-0126346 A    10/2014
(Continued)

OTHER PUBLICATIONS

Qualcomm Incorporated, PUSCH in UpPTS, 3GPP TSG RAN WG1 #86bis, R1-1609991, XP051150016, Oct. 9, 2016, Lisbon, Portugal Retrieved from the Internet: URL:http://www.3gpp.org/ftp/Meetings_3GPP_SYNC/RAN1/Docs/.
(Continued)

*Primary Examiner* — Tan H Trinh
(74) *Attorney, Agent, or Firm* — Jefferson IP Law, LLP

(57) ABSTRACT

The present disclosure relates to a 5G or a pre-5G communication system for supporting a higher data rate since 4G communication systems such as LTE. According to an embodiment of the present disclosure, a method for deter-
(Continued)

mining transmission power of a terminal, including: receiving a terminal-specific transmission power parameter from a base station, determining transmission power of the terminal based on the terminal-specific transmission power parameter and a subcarrier spacing allocated to the terminal, and transmitting an uplink signal based on the determined transmission power, and an apparatus performing the same may be provided.

15 Claims, 40 Drawing Sheets

(30) Foreign Application Priority Data

Feb. 2, 2017 (KR) .................. 10-2017-0015105
Jun. 15, 2017 (KR) .................. 10-2017-0075747

(51) Int. Cl.
| | |
|---|---|
| H04W 76/27 | (2018.01) |
| H04W 74/08 | (2009.01) |
| H04W 56/00 | (2009.01) |
| H04W 16/28 | (2009.01) |
| H04W 52/38 | (2009.01) |
| H04W 52/24 | (2009.01) |

(52) U.S. Cl.
CPC ......... *H04W 52/146* (2013.01); *H04W 52/38* (2013.01); *H04W 56/001* (2013.01); *H04W 74/0833* (2013.01); *H04W 76/27* (2018.02); *H04W 52/242* (2013.01)

(58) Field of Classification Search
CPC . H04W 52/242; H04W 52/38; H04W 56/001; H04W 74/0833; H04W 76/27
USPC .......... 455/69, 522, 513; 370/252, 280, 311, 370/329, 328
See application file for complete search history.

(56) References Cited

U.S. PATENT DOCUMENTS

| | | | | |
|---|---|---|---|---|
| 2013/0077569 | A1* | 3/2013 | Nam | .................. H04W 52/288 370/328 |
| 2013/0102345 | A1* | 4/2013 | Jung | .................. H04B 7/0456 455/513 |
| 2013/0195002 | A1 | 8/2013 | Walker et al. | |
| 2013/0223394 | A1* | 8/2013 | Nishio | .................. H04L 5/0048 370/329 |
| 2014/0086167 | A1* | 3/2014 | Seo | .................. H04L 5/001 370/329 |
| 2014/0105110 | A1* | 4/2014 | Hoshino | .................. H04W 52/18 370/328 |
| 2014/0119228 | A1* | 5/2014 | Wang | .................. H04W 24/10 370/252 |
| 2015/0016317 | A1* | 1/2015 | Park | .................. H04W 52/146 370/280 |
| 2015/0124673 | A1* | 5/2015 | Ouchi | .................. H04W 52/146 370/311 |
| 2016/0191124 | A1 | 6/2016 | Kim | |
| 2016/0192297 | A1 | 6/2016 | Kim et al. | |
| 2016/0270086 | A1 | 9/2016 | Stirling-Gallacher et al. | |
| 2017/0019813 | A1* | 1/2017 | Kim | .................. H04W 24/08 |
| 2017/0033908 | A1* | 2/2017 | Hwang | .................. H04L 5/0053 |
| 2017/0265155 | A1* | 9/2017 | Kim | .................. H04W 88/02 |
| 2017/0290041 | A1* | 10/2017 | Alvarino | .................. H04L 5/001 |
| 2017/0303215 | A1* | 10/2017 | Kim | .................. H04W 52/48 |
| 2017/0318491 | A1 | 11/2017 | Chen et al. | |
| 2017/0374658 | A1* | 12/2017 | Kim | .................. H04L 5/00 |
| 2018/0167895 | A1* | 6/2018 | Lee | .................. H04W 52/24 |
| 2018/0213549 | A1* | 7/2018 | Kim | .................. H04W 28/0278 |
| 2019/0037562 | A1* | 1/2019 | Park | .................. H04L 1/00 |
| 2019/0103951 | A1* | 4/2019 | Park | .................. H04L 1/1861 |
| 2019/0159191 | A1* | 5/2019 | Kim | .................. H04L 5/00 |
| 2019/0174384 | A1* | 6/2019 | Kim | .................. H04W 56/001 |
| 2019/0191437 | A1* | 6/2019 | Kusashima | .................. H04W 72/04 |
| 2019/0215217 | A1* | 7/2019 | Kim | .................. H04L 5/00 |
| 2019/0274132 | A1* | 9/2019 | Nishio | .................. H04L 5/0048 |

FOREIGN PATENT DOCUMENTS

| | | |
|---|---|---|
| KR | 10-2016-0062731 A | 6/2016 |
| WO | 2016/072052 A1 | 5/2016 |
| WO | 2016/146010 A1 | 9/2016 |

OTHER PUBLICATIONS

CATT, Remaining issues for PUSCH support in UpPTS, 3GPP TSG RAN WG1 Meeting #86bis, R1-1608740, XP051148796, Oct. 9, 2016, Lisbon, Portugal Retrieved from the Internet: URL:http://www.3gpp.org/ftp/Meetings_3GPP_SYNC/RAN1/Docs/.

Huawei et al., Principles for Reference Signal Design and QCL Assumptions for NR, 3GPP TSG RAN WG1 Meeting #86, R1-167224, XP051140589, Aug. 21, 2016, Gothenburg, Sweden Retrieved from the Internet: URL:http://www.3gpp.org/ftp/Meetings_3GPP_SYNC/RAN1/Docs/.

Ericsson, on UL RS for CSI measurements, 3GPP TSG-RAN WG1 #86bis, R1-1609764, XP051149794, Oct. 9, 2016, Lisbon, Portugal Retrieved from the Internet: URL:http://www.3gpp.org/ftp/Meetings_3GPP_SYNC/RAN1/Docs/.

European Search Report dated Aug. 30, 2019, issued in the European Application No. 17868254.8.

* cited by examiner

FIG. 1F

PO-NominalPUSCH-WideBeam    INTEGER (-x1,···,xn)
PO-UE-PUSCH-WideBeam         INTEGER (-y1,···,ym)
Alpha-WideBeam               ENUMERATED {a1, a2, ···, ak}

FIG. 1G

```
P0- NominalPUSCH-NarrowBeam    INTEGER (-x1,···,xn)
P0-UE-PUSCH-NarrowBeam INTEGER (-y1,···,ym)
Alpha-NarrowBeam              ENUMERATED {a1, a2, ···, ak}
```

FIG. 1L
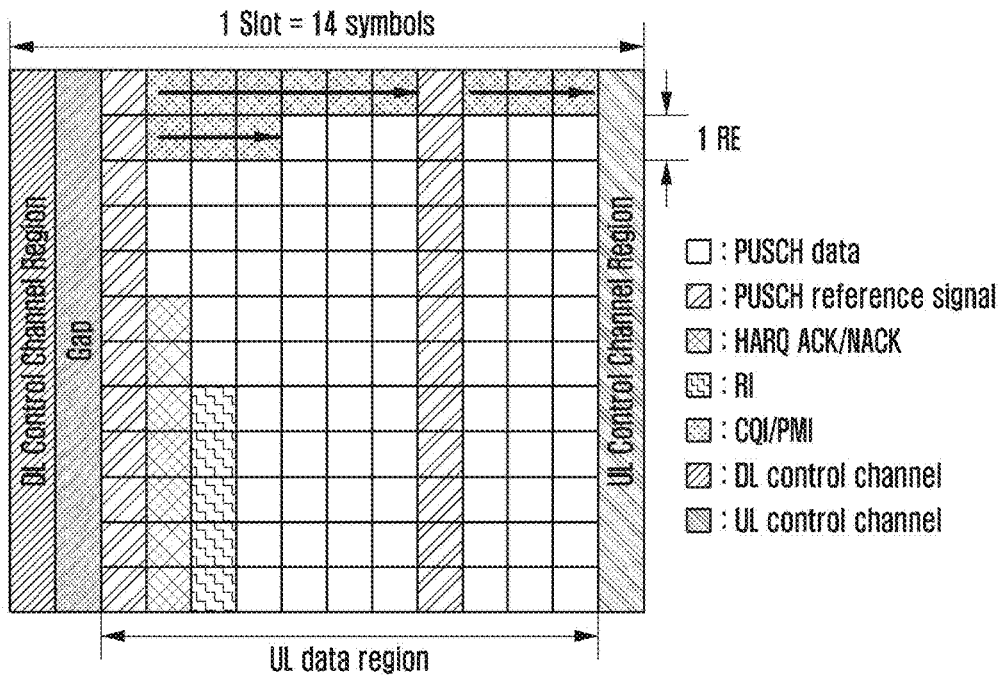
(a) UCI MAPPING REGARDLESS OF ADDITIONAL DMRS
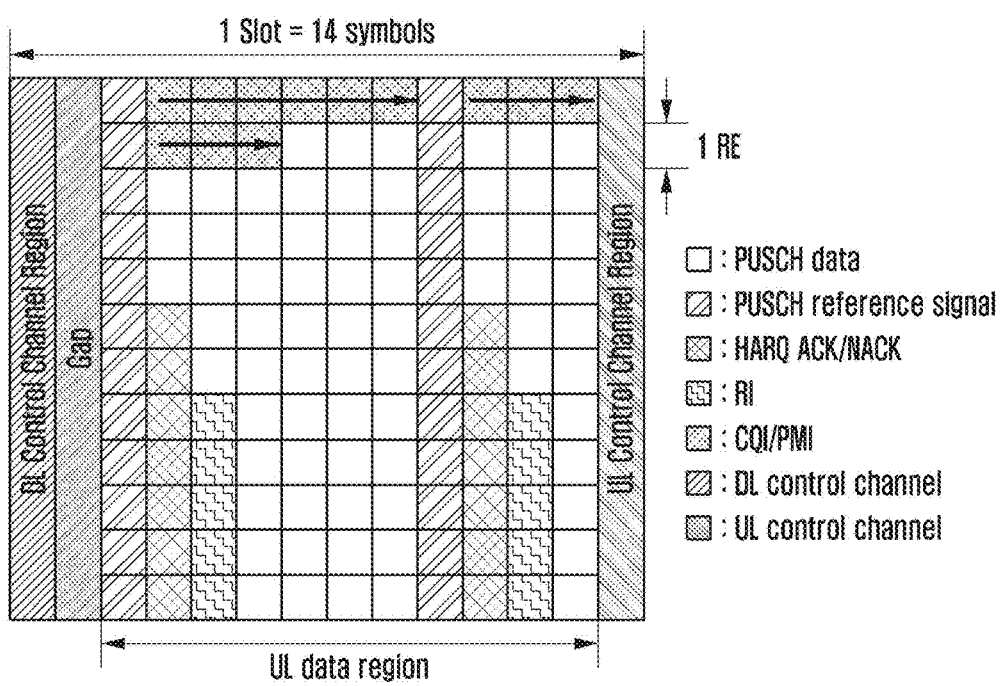
(b) UCI MAPPING IN CONSIDERATION OF ADDITIONAL DMRS FIG. 1M
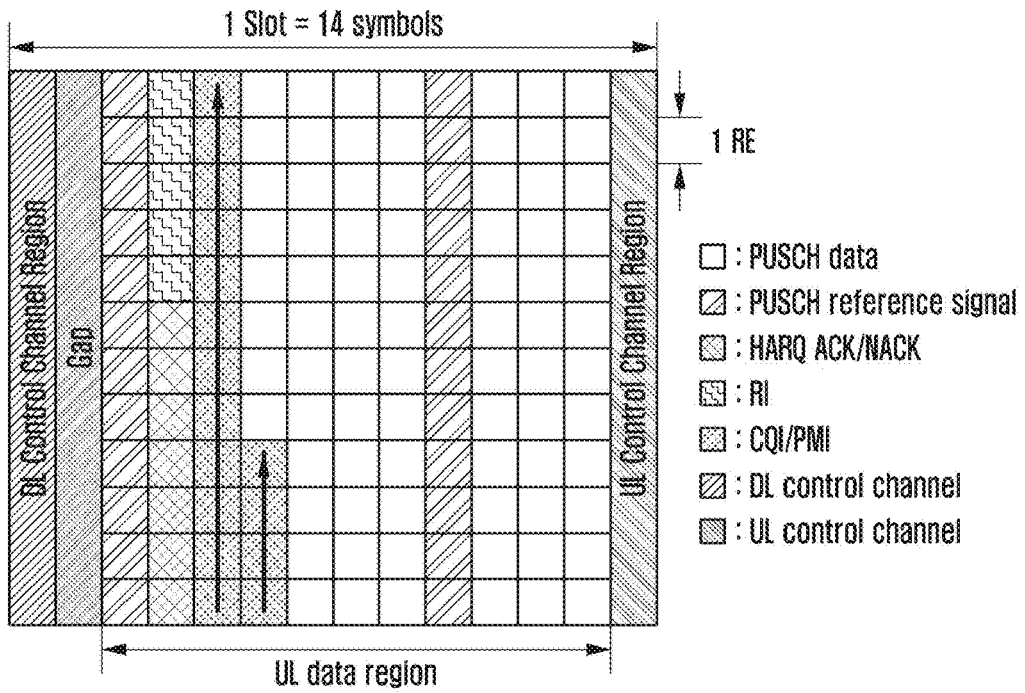
(a) UCI MAPPING REGARDLESS OF ADDITIONAL DMRS
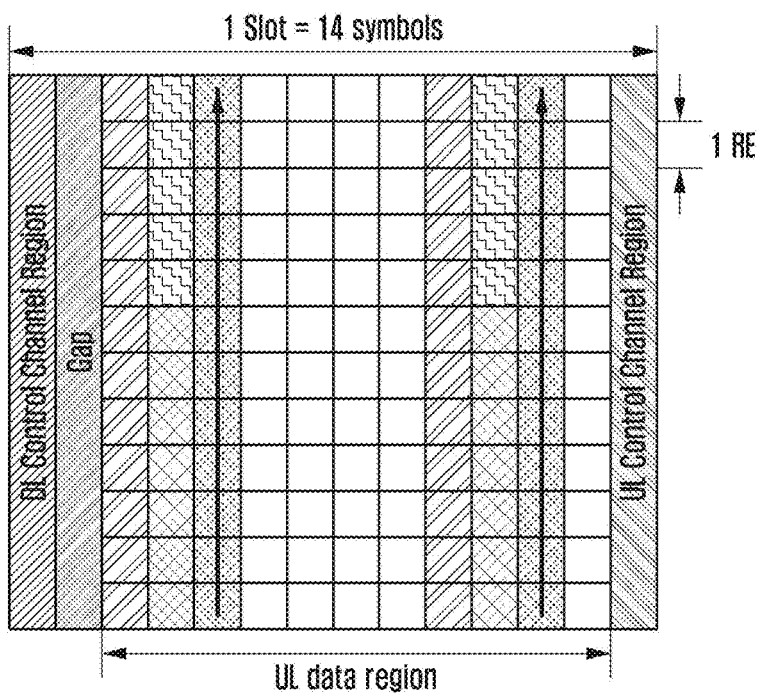
(b) UCI MAPPING IN CONSIDERATION OF ADDITIONAL DMRS

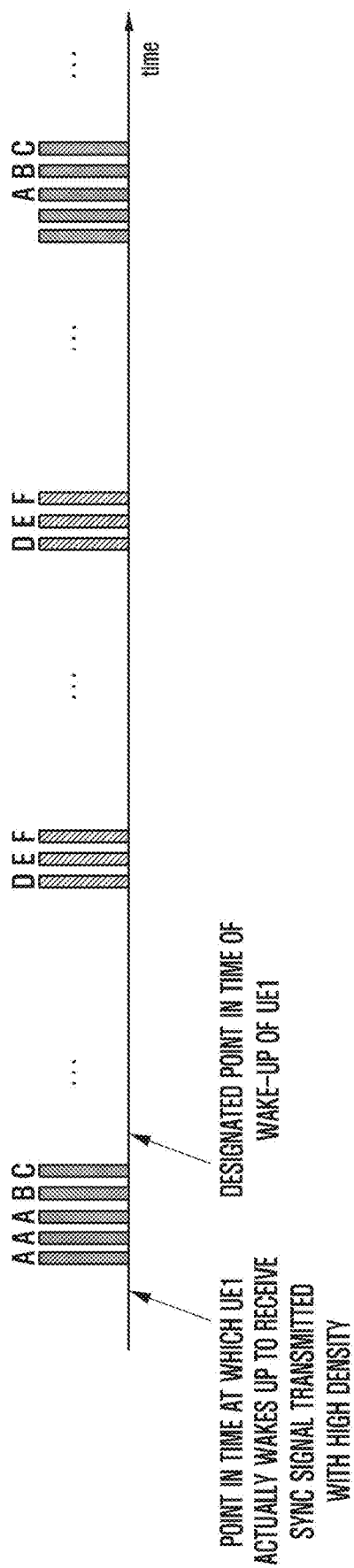

FIG. 2H

| NUMBER OF BURSTS IN BURST SET | BLOCK NUMBER IN BURST SET (m) | CYCLIC SHIFT INDEX ($\Delta_m$) |
|---|---|---|
| 1 | 0, ..., 13 | 0, ..., 13 |
| 2 | 0, ..., 27 | 14, ..., 41 |
| 4 | 0, ..., 55 | 42, ..., 97 |

FIG. 2I

| NUMBER OF BURSTS IN BURST SET | NUMBER OF BLOCKS IN BURST = 1? | BLOCK NUMBER IN BURST SET (m) | CYCLIC SHIFT INDEX ($\Delta_m$) |
|---|---|---|---|
| 1 | Yes | 0 | 0 |
| 2 | No | 0, ..., 13 | 1, ..., 14 |
| | No | 0, ..., 27 | 15, ..., 42 |
| 4 | No | 0, ..., 55 | 43, ..., 98 |

FIG. 2J

| NUMBER OF BURSTS IN BURST SET | NUMBER OF BLOCKS IN BURST = 1? | BLOCK NUMBER IN BURST SET (m) | CYCLIC SHIFT INDEX ($\Delta_m$) |
|---|---|---|---|
| 1 | Yes | 0 | 0 |
| 2 | No | 0, ..., 13 | 1, ..., 14 |
| | No | 0, ..., 27 | 15, ..., 28, 15, ..., 28 |
| 4 | No | 0, ..., 55 | 29, ..., 42, 29, ..., 42, 29, ..., 42, 29, ..., 42 |

FIG. 2K

| NUMBER OF BURSTS IN BURST SET | ROOT INDEX (u) | BLOCK NUMBER IN BURST (m) AND CYCLIC SHIFT INDEX ($\Delta_m$) |
|---|---|---|
| 1 | r1 | 0, ⋯, 13 |
| 2 | r2 | 0, ⋯, 27 |
| 4 | r3 | 0, ⋯, 55 |

FIG. 2L

| NUMBER OF BURSTS IN BURST SET | NUMBER OF BLOCKS IN BURST = 1? | ROOT INDEX (u) | BLOCK NUMBER IN BURST SET (m) AND CYCLIC SHIFT INDEX ($\Delta_m$) |
|---|---|---|---|
| 1 | Yes | r1 | 0 |
| 2 | No | r2 | 0, ..., 13 |
|  | No | r3 | 0, ..., 27 |
| 4 | No | r4 | 0, ..., 55 |

FIG. 2M

| NUMBER OF BURSTS IN BURST SET | NUMBER OF BLOCKS IN BURST = 1? | ROOT INDEX (u) | BLOCK NUMBER IN BURST SET (m) AND CYCLIC SHIFT INDEX ($\Delta$) |
|---|---|---|---|
| 1 | Yes | r1 | 0 |
| 2 | No | r2 | 1, ..., 14 |
|   | No |    | 0, ..., 27 |
| 4 | No | r3 | 0, ..., 55 |

FIG. 2N

| NUMBER OF ANTENNA PORTS | ROOT INDEX (u) | NUMBER OF BURST IN BURST SET | BLOCK NUMBER IN BURST SET (m) | CYCLIC SHIFT INDEX ($\Delta_m$) |
|---|---|---|---|---|
| 1 | r1 | 1 | 0, ..., 13 | 0, ..., 13 |
|   |    | 2 | 0, ..., 27 | 14, ..., 41 |
|   |    | 4 | 0, ..., 55 | 42, ..., 97 |
| 2 | r2 | 1 | 0, ..., 13 | 0, ..., 13 |
|   |    | 2 | 0, ..., 27 | 14, ..., 41 |
|   |    | 4 | 0, ..., 55 | 42, ..., 97 |
| 4 | r3 | 1 | 0, ..., 13 | 0, ..., 13 |
|   |    | 2 | 0, ..., 27 | 14, ..., 41 |
|   |    | 4 | 0, ..., 55 | 42, ..., 97 |

METHOD AND DEVICE FOR CONTROLLING TRANSMISSION POWER OF USER EQUIPMENT IN BEAMFORMING SYSTEM

TECHNICAL FIELD

The present disclosure relates to a method for controlling power of a terminal in a beamforming system, and more particularly, to a method and apparatus for supporting an uplink power control of a terminal according to a change of a beam.

Further, the present disclosure relates to 3GPP NR synchronization signals, essential system information (required for initial access and random access procedure), measurement RS design, synchronization signal and physical broadcast channel (PBCH) design, and synchronization signal (SS) block design.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

The present disclosure has been made in order to solve the above problems, and an aspect of the present disclosure provides a method and apparatus for controlling transmission power, and further, an aspect of the present disclosure provides a method and apparatus for an operation of a terminal and a base station for operating an uplink transmission power control according to a change of a beam in a beamforming system.

Another aspect of the present disclosure provides a method and apparatus for transmitting a synchronization signal and/or a control channel, and further, another aspect of the present disclosure provides a transmission method of a downlink (DL) common control channel except for synchronization and a method for transmitting a synchronization period in a system in which the synchronization period is variable, and provides synchronization signal design and PBCH scrambling sequence design method according thereto.

Solution to Problem

In accordance with an aspect of the present disclosure, a method for determining transmission power of a terminal includes: receiving a terminal-specific transmission power parameter from a base station; determining transmission power of the terminal based on the terminal-specific transmission power parameter and a subcarrier spacing allocated to the terminal; and transmitting an uplink signal based on the determined transmission power.

In accordance with another aspect of the present disclosure, a terminal includes: a transceiver configured to transmit and receive a signal; and a controller configured to control to receive a terminal-specific transmission power parameter from a base station, determine transmission power of the terminal based on the terminal-specific transmission power parameter and a subcarrier spacing allocated to the terminal, and transmit an uplink signal based on the determined transmission power.

In accordance with another aspect of the present disclosure, an operating method of a base station includes: transmitting a message including subcarrier spacing configuration information to a terminal; transmitting a terminal-specific transmission power parameter to the terminal; and receiving an uplink signal from the terminal, in which transmission power of the uplink signal is determined based on the terminal-specific transmission power parameter and the subcarrier spacing configuration information.

In accordance with another aspect of the present disclosure, a base station includes: a transceiver configured to transmit and receive a signal; and a controller configured to control to transmit a message including subcarrier spacing configuration information to a terminal, transmit a terminal-specific transmission power parameter to the terminal, and receive an uplink signal from the terminal, in which transmission power of the uplink signal is determined based on the terminal-specific transmission power parameter and the subcarrier spacing configuration information.

Objects of the present disclosure are not limited to the above-mentioned object. Other objects that are not mentioned may be obviously understood by those skilled in the art to which the present disclosure pertains from the following description.

Advantageous Effects of Invention

According to the embodiment of the present disclosure, the method for efficiently controlling power may be provided. Further, according to an embodiment of the present disclosure, it is possible to minimize interference caused to a neighboring cell through a power control according to a change of a beam in the system using beamforming.

Further, according to the embodiment of the present disclosure, the method for transmitting a synchronization signal and a control channel may be provided. Further, according to an embodiment of the present disclosure, it is possible to transmit the transmission method of a DL common control channel except for synchronization and a synchronization period in the system in which the synchronization period is variable.

BRIEF DESCRIPTION OF DRAWINGS

FIG. 1F is a diagram illustrating an example of a parameter for controlling transmission power of a terminal after RRC connection setup according to an embodiment of the present disclosure;

FIG. 1G is a diagram illustrating an example of another parameter for controlling transmission power of a terminal after RRC connection setup according to an embodiment of the present disclosure;

FIGS. 1LA and 1LB are diagrams illustrating another example of a subframe for transmitting uplink data and control information according to an embodiment of the present disclosure;

FIGS. 1MA and 1MB are diagrams illustrating another example of a subframe for transmitting uplink data and control information according to an embodiment of the present disclosure;

FIG. 1O is a diagram illustrating another example of reference signal transmission for channel sounding according to an embodiment of the present disclosure;

FIG. 2E is a diagram illustrating another example of Alternative scenario 1 according to an embodiment of the present disclosure;

FIG. 2H is a diagram illustrating a cyclic shift index corresponding to an m-th block of a burst set for the number of burst in the burst set according to an embodiment of the present disclosure;

FIG. 2I is a diagram illustrating a cyclic shift index 2 corresponding to an m-th block of a burst set for the number of burst in the burst set according to an embodiment of the present disclosure;

FIG. 2J is a diagram illustrating a cyclic shift index corresponding to an m-th block of a burst set for the number of burst in the burst set according to an embodiment of the present disclosure;

FIG. 2K is a diagram illustrating a root index and a cyclic shift index corresponding to an m-th block of a burst set for the number of burst in the burst set when a start point of the burst set is not known according to an embodiment of the present disclosure;

FIG. 2L is a diagram illustrating a root index and a cyclic shift index 2 corresponding to an m-th block of a burst set for the number of burst in the burst set when a start point of the burst set is not known according to an embodiment of the present disclosure;

FIG. 2M is a diagram illustrating a root index and a cyclic shift index 3 corresponding to an m-th block of a burst set for the number of burst in the burst set when a start point of the burst set is not known according to an embodiment of the present disclosure;

FIG. 2N is a diagram illustrating the number of antenna port, and a root index and a cyclic shift index corresponding to an m-th block of a burst set for the number of burst in the burst set when a start point of the burst set is not known according to an embodiment of the present disclosure;

FIG. 2O is a diagram illustrating a case in which a TSS/PBCH burst set period=2 frames and PBCH transmission period=4 frames according to an embodiment of the present disclosure;

BEST MODE

Figure 1A:
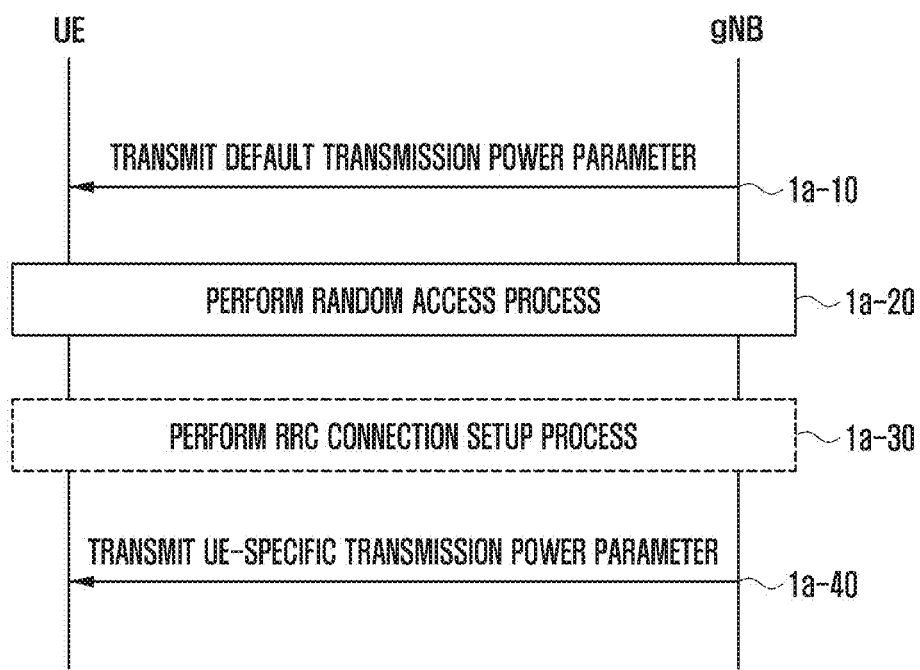
FIG. 1A is a diagram illustrating an example for transmission of a parameter for controlling transmission power of a terminal according to an embodiment of the present disclosure.

Hereinafter, embodiments of the present invention will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In embodiments of the present disclosure, a terminal may be referred to as user equipment (UE), or the like. In embodiments of the present disclosure, a base station may be referred to as an eNB, a gNB, a transmission and reception point (TRP), or the like.

First Embodiment

The embodiment of the present disclosure provides a method and apparatus for controlling transmission power.

Further, the embodiment of the present disclosure includes a method and apparatus for an operation of a base station and a terminal for controlling a transmission power of data and control channels transmitted in uplink of the terminal in a beamforming system.

A transmission power control for an uplink data channel (physical uplink shared channel (PUSCH)) of an LTE cellular communication system is as represented by Equation 1-a below.

$$P_{PUSCH}(i) = \min\left\{ \begin{array}{l} P_{CMAX}(i), \\ 10\log_{10}(M_{PUSCH}(i)) + P_{0\_PUSCH}(j) + \alpha(j) \cdot PL + \Delta_{TF}(i) + f(i) \end{array} \right\} \text{ [dBm]} \quad \text{Equation 1-a}$$

Equation 1-a represents $P_{PUSCH}(i)$, transmission power of the PUSCH which is a physical channel for uplink data transmission in an i-th subframe of the terminal. At this time, $P_{0\_PUSCH}$ is a parameter configured by $P_{0\_NOMINAL\_PUSCH} + P_{0\_UE\_PUSCH}$, and is a value informed by the base station to the terminal through higher layer signaling (RRC signaling). In particular, $P_{0\_NOMINAL\_PUSCH}$ is a cell-specific value configured by 8-bit information and has a range of [−126, 24] dB. Further, $P_{0\_UE\_PUSCH}$ is a UE-specific value configured by 4-bit information and has a range of [−8, 7] dB. The cell-specific value is transmitted by the base station through cell-specific RRC signaling (system information block (SIB)), and a user equipment (UE)-specific value is transmitted by the base station to the terminal through dedicated RRC signaling. At this time, j means a grant scheme of PUSCH. More specifically, j=0 means semi-persistent grant, j=1 means dynamic scheduled grant, and j=2 means PUSCH grant for a random access response. Meanwhile, $\alpha(j)$ is a value for compensating path-loss, and in the case of $\alpha(0)$ and $\alpha(1)$, the base station cell-specifically informs all terminals in a cell of one value of {0, 0.4, 0.5, 0.6, 0.7, 0.8, 0.9, 1} through 3-bit information. A value $\alpha(2)=1$ is used.

PL is a path-loss value calculated by the terminal, and is calculated through reception power of a cell-specific reference signal (CRS) of a downlink channel transmitted by the base station. More specifically, the base station transmits referenceSignalPower and filtering coefficient to the terminal through UE-specific or cell-specific RRC signaling, and the terminal calculates path-loss as below based thereon.

PL=referenceSignalPower−higher layer filtered *RSRP*  Equation 1-b $\Delta_{TF}(i)$ is a value related to MCS, and is configured as below.

$$\Delta_{TF}(i) = \begin{cases} 10\log_{10}((2^{BPRE \cdot K_S} - 1) \cdot \beta_{offset}^{PUSCH}) & \text{for } K_S = 1.25 \\ 0 & \text{for } K_S = 0 \end{cases} \quad \text{Equation 1-c}$$

$K_S$ is a higher layer parameter, a value given by delta-MCS-Enabled, and bits per resource element (BPRE) may be calculated as below. $\beta_{offset}^{PUSCH}$ has a value $\beta_{offset}^{PUSCH} \beta_{offset}^{CQI}$ only in a case in which uplink control information is transmitted via PUSCH without UL-SCH data, and $\beta_{offset}^{PUSCH}=1$ is used for other cases.

$$BPRE = \begin{cases} O_{CQI}/N_{RE} & \text{for control data sent via } PUSCH \text{ without } UL-SCH \text{ data} \\ \sum_{r=0}^{C-1} K_r/N_{RE} & \text{for other cases} \end{cases}$$

Equation 1-d

C indicates the number of code blocks, $K_r$ indicates a size of a code block "r", $O_{CQI}$ indicates the number of CQI/PMI bits including CRC, and $N_{RE}$ indicates the number of resource elements.

f(i) is a parameter for performing power control by a closed-loop, and may vary depending on whether accumulation-based power control is performed or absolute value-based power control is performed. Information on whether accumulation-based power control is performed or absolute value-based power control is performed is transmitted to the terminal through higher layer signaling (dedicated RRC signaling). For example, when Accumulation-enabled=on, the terminal performs the accumulation-based power control, and when Accumulation-enabled=off, the terminal performs the absolute value-based power control.

In the accumulation-based power control, f(i)=f(i−1)+ $\delta_{PUSCH}$(i−$K_{PUSCH}$). That is, in an i-th subframe, as f(i), a value obtained by accumulating a f(i−1) value used in a previous subframe (that is, i−1-th subframe) and $\delta_{PUSCH}$ value transmitted to the terminal through DCI via a physical downlink control channel (PDCCH) in a i−$K_{PUSCH}$-th subframe is used. In an FDD system, $K_{PUSCH}$=4, and in a TDD system, $K_{PUSCH}$ may have different values according to DL/UL configuration.

TABLE 1-a $K_{PUSCH}$ for TDD configurations 0-6

| TDD DL/UL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In the absolute value-based power control, f(i)=$\delta_{PUSCH}$(i−$K_{PUSCH}$). That is, in an i-th subframe, as f(i), a value transmitted to the terminal through DCI via a physical downlink control channel (PDCCH) in a i−$K_{PUSCH}$-th subframe is directly used without accumulation. In an FDD system, $K_{PUSCH}$=4, and in a TDD system, $K_{PUSCH}$ may have different values according to DL/UL configuration as in Table 1-a.

The $\delta_{PUSCH}$ values used for the accumulation-based power control and the absolute value-based power control may vary depending on a DCI format. For example, in the case of DCI formats 0, 3, and 4, a value of Table 1-b is used, and in the case of DCI format 3A, a value of Table 1-c is used.

TABLE 1-b

Mapping of TPC Command Field in DCI format 0/3/4 to absolute and accumulated $\delta_{PUSCH}$ values.

| TPC Command Field in DCI format 0/3/4 | Accumulated $\delta_{PUSCH}$ [dB] | Absolute $\delta_{PUSCH}$ [dB] only DCI format 0/4 |
|---|---|---|
| 0 | −1 | −4 |
| 1 | 0 | −1 |
| 2 | 1 | 1 |
| 3 | 3 | 4 |

TABLE 1-c

Mapping of TPC Command Field in DCI format 3A to accumulated $\delta_{PUSCH}$ values.

| TPC Command Field in DCI format 3A | Accumulated $\delta_{PUSCH}$ [dB] |
|---|---|
| 0 | −1 |
| 1 | 1 |

Meanwhile, a transmission power control for an uplink control channel (physical uplink control channel (PUCCH)) of an LTE cellular communication system is as represented by Equation 1-e below.

[수학식 1-e]

$$P_{PUSCH}(i) = \min\begin{Bmatrix} P_{CMAX}(i), \\ P_{0\_PUCCH} + PL + h(n_{CQI}, n_{HARQ}, n_{SR}) + \Delta_{F\_PUCCH}(F) + \Delta_{TxD}(F') + g(i) \end{Bmatrix} \text{[dBm]}$$

Equation 1-e

Equation 1-e represents $P_{PUCCH}(i)$, transmission power of the PUCCH which is a physical channel for uplink control information transmission in an i-th subframe of the terminal. At this time, $P_{O\_PUCCH}$ is a parameter configured by $P_{O\_NOMINAL\_PUCCH}+P_{O\_UE\_PUCCH}$, and is a value informed by the base station to the terminal through higher layer signaling (RRC signaling). In particular, $P_{O\_NOMINAL\_PUCCH}$ is a cell-specific value configured by 8-bit information and has a range of [−126, 24] dB. Further, $P_{O\_UE\_PUCCH}$ is a cell-specific value configured by 4-bit information and has a range of [−8, 7] dB. The cell-specific value is transmitted by the base station through cell-specific RRC signaling (system information block (SIB), and a user equipment (UE)-specific value is transmitted by the base station to the terminal through dedicated RRC signaling. Meanwhile, unlike the transmission power control of the PUSCH, in the PUCCH transmission power control, α(j) compensating for path-loss is not used.

PL which is a path-loss value calculated by the terminal is calculated through reception power of a cell-specific reference signal (CRS) of a downlink channel transmitted by the base station, similarly to the transmission power control of the PUSCH. More specifically, the base station transmits referenceSignalPower and filtering coefficient to the terminal through UE-specific or cell-specific RRC signaling, and the terminal calculates path-loss as Equation 1-b above based thereon.

$\Delta_{F\_PUCCH}(F)$ is transmitted to the terminal through higher layer signaling (cell-specific or UE-specific RRC signaling), and is a value varying according to a format of the PUCCH and has a relative value based on PUCCH format 1a (1-bit HARQ-ACK/NACK transmission). The $\Delta_{F\_PUCCH}(F)$ value is configured as shown in Table 1-d.

$$h(n_{CQI}, n_{HARQ}, n_{SR}) = \begin{cases} \dfrac{n_{HARQ} + n_{SR} - 1}{3} & \text{if } PUCCH \text{ transmission on two antenna ports or } n_{HARQ} + n_{SR} \geq 11 \text{ bits} \\ \dfrac{n_{HARQ} + n_{SR} - 1}{2} & \text{otherwise} \end{cases}$$ Equation 1-h TABLE 1-d

| | $\Delta_{F\_PUCCH}(F)$ Values | |
|---|---|---|
| PUCCH Format | Parameters, $\Delta_{F\_PUCCH}(F)$ | Values [dB] |
| 1 | deltaF-PUCCH-Format1 | [−2, 0, 2] |
| 1b | deltaF-PUCCH-Format1b | [1, 3, 5] |
| 2 | deltaF-PUCCH-Format2 | [−2, 0, 1, 2] |
| 2a | deltaF-PUCCH-Format2a | [−2, 0, 2] |
| 2b | deltaF-PUCCH-Format2b | [−2, 0, 2] |

$\Delta_{TxD}(F')$ is transmitted to the terminal through higher layer signaling (cell-specific or UE-specific RRC signaling) when the PUCCH is transmitted on 2-antenna ports (that is, space frequency block code (SFBC)), and is a value varying according to a format of the PUCCH. If the SFBC is not used, $\Delta_{TxD}(F')=0$.

The $\Delta_{TxD}(F')$ value is configured as shown in Table 1-e.

TABLE 1-e

| | $\Delta_{TxD}(F')$ Values | |
|---|---|---|
| PUCCH Format | Parameters, $\Delta_{F\_PUCCH}(F)$ | Values [dB] |
| 1 | deltaTxD-OffsetPUCCH-Format1 | [0, −2] |
| 1a/1b | deltaTxD-OffsetPUCCH-Format1a1b | [0, −2] |
| 2/2a/2b | deltaTxD-OffsetPUCCH-Format22a2b | [0, −2] |
| 3 | deltaTxD-OffsetPUCCH-Format3 | [0, −2] |

$h(n_{CQI}, n_{HARQ}, n_{SR})$ varies according to the PUCCH format, and here, $n_{CQI}$ means the number of bits used for feedback of channel quality information, $n_{HARQ}$ means the number of bits used for HARQ-ACK/NACK feedback, and $n_{SR}$ which is a bit used for feedback of a scheduling request is 0 or 1. More specifically, in PUCCH formats 1, 1a, and 1b, $h(n_{CQI}, n_{HARQ}, n_{SR})=0$. In PUCCH formats 2, 2a, and 2b, if a normal CP is used, $h(n_{CQI}, n_{HARQ}, n_{SR})$ is as follows.

$$h(n_{CQI}, n_{HARQ}, n_{SR}) = \begin{cases} 10\log_{10}\left(\dfrac{n_{CQI}}{4}\right) & \text{if } n_{CQI} \geq 4 \\ 0 & \text{otherwise} \end{cases}$$ Equation 1-f In PUCCH format 2, if an extended CP is used, $h(n_{CQI}, n_{HARQ}, n_{SR})$ is as follows.

$$h(n_{CQI}, n_{HARQ}, n_{SR}) = \begin{cases} 10\log_{10}\left(\dfrac{n_{CQI}+n_{HARQ}}{4}\right) & \text{if } n_{CQI}+n_{HARQ} \geq 4 \\ 0 & \text{otherwise} \end{cases}$$ Equation 1-g In PUCCH format 3, $h(n_{CQI}, n_{HARQ}, n_{SR})$ is as follows.

g(i) is a parameter for performing power control in a closed-loop, and the base station may UE-specifically correct PUCCH transmission power. Unlike the transmission power control of the PUSCH, in the PUCCH transmission power control, only the accumulation-based transmission power control is performed, and g(i) is given as Equation 1-i.

$$g(i)=g(i-1)+\Sigma_{m=0}^{M-1}\delta_{PUCCH}(i-k_m)$$ Equation 1-i

That is, in an i-th subframe, as g(i), a value obtained by accumulating a g(i−1) value used in a previous subframe (that is, i−1-th subframe) and a $\delta_{PUCCH}$ value transmitted to the terminal through DCI via a physical downlink control channel (PDCCH) in a i−$k_m$-th subframe is used. In an FDD system, M=1, $k_0$=4, and in a TDD system, M, $k_0$ may have different values according to DL/UL configuration as in Table 1-f.

TABLE 1-f

{k₀, k₁, ..., k_{M−1}} for TDD

| TDD DL/UL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 8, 9, 7, 5, 4, 11, 6 | — | — | — | — | — | — | — |
| 6 | — | — | 7 | 7 | 5 | — | — | 7 | 7 | — |

The $\delta_{PUCCH}$ value may vary according to the DCI format, and in the case of DCI format 1A/1B/1D/1/2A/2B/2C/2/3, the same value as the accumulated $\delta_{PUSCH}$ in Table 1-b is used, and in the case of DCI format 3A, as the $\delta_{PUCCH}$ value, the same value as the $\delta_{PUSCH}$ value used in Table 1-c is used.

A main purpose of controlling uplink transmission power of the terminal is to minimize an amount of interference caused to a neighboring cell and minimize power consumption of the terminal. Further, it is to make a transmission signal of the terminal to be in a dynamic range of automatic gain control of a reception end of the base station by constantly maintaining a strength of a reception signal received by the base station regardless of a position of the terminal in a cell. Such a transmission power control may be applied in the beamforming system for the same purpose. However, in the beamforming system, the interference caused to a neighboring cell and the strength of a reception signal received by the base station may vary depending on what beam the terminal use for transmission. For example, a specific terminal may use an omni-antenna not supporting beamforming for transmission. Another terminal with the small number of antenna elements may transmit uplink data and control information using a wide beam. Further, another terminal with the large number of antenna elements may transmit uplink data and control information using a narrow beam. Therefore, there is a need to use different transmission power control parameters depending on the transmission beam of the terminal.

FIG. 1A is a diagram illustrating an example for transmission of a parameter for controlling transmission power of a base station according to an embodiment of the present disclosure. The base station may not know capability of the terminal before capability negotiation with the terminal, thus may transmit a default transmission power parameter that can be commonly used by all terminals accessing in a cell regardless of their capability (1a-10). For example, $P_{O\_PUSCH}$ is configured of a cell-specific parameter, $P_{O\_NOMINAL\_PUSCH}$, and a UE-specific parameter, $P_{O\_UE\_PUSCH}$. Similarly, $P_{O\_PUCCH}$ is also configured of a cell-specific parameter, $P_{O\_NOMINAL\_PUCCH}$, and a UE-specific parameter, $P_{O\_UE\_PUCCH}$. At this time, $P_{O\_NOMINAL\_PUSCH}$ and $P_{O\_NOMINAL\_PUCCH}$ which are cell-specific parameters may be transmitted to the terminal through a control channel broadcasted by the base station like a master information block (MIB) or a system information block (SIB). As another example, $P_{O\_NOMINAL\_PUSCH}$ and $P_{O\_NOMINAL\_PUCCH}$ may be transmitted through common downlink control information (DCI) configuring a common search space. $P_{O\_UE\_PUSCH}$ and $P_{O\_UE\_PUCCH}$ which are UE-specific parameters are single default values and may be embedded in the terminal and the base station in a state before the terminal accesses the base station.

As another example, the base station may configure one or two of default values through a broadcast channel such as the MIB, the SIB, or the common DCI. For example, the base station may configure one or more of a default value for a terminal using an omni-antenna, a default value for a terminal using a wide beam, and a default value for a terminal using a narrow beam. The terminal may continuously use the default values until the base station transmits an additional instruction as in FIG. 1A. Such an additional instruction (update of $P_{O\_UE\_PUSCH}$ and $P_{O\_UE\_PUCCH}$ values) of the base station may be transmitted through UE-specific RRC signaling or through L1-signaling (PDCCH) after RRC connection setup (1a-30) (or after performing a random access process (1a-30)) (1a-40). In the case in which the update of the $P_{O\_UE\_PUSCH}$ and $P_{O\_UE\_PUCCH}$ values is made through the L1-signaling, the base station may perform transmission while including the updated $P_{O\_UE\_PUSCH}$ and $P_{O\_UE\_PUCCH}$ values or a value indicating a difference (offset value) from the default value in the PDCCH transmitted for each UE through a dedicated PDCCH. As another example, the base station may transmit the updated $P_{O\_UE\_PUSCH}$ and $P_{O\_UE\_PUCCH}$ values or the offset value to two or more UEs through a separate DCI for the power control.

Meanwhile, in order to decrease signaling overhead, single $P_{O\_PUSCH}$ and $P_{O\_PUCCH}$ values may be used regardless of cell-specific and UE-specific parameters. Such values may be dedicatedly transmitted to each terminal through UE-specific RRC signaling or cell-specifically transmitted. Therefore, default $P_{O\_PUSCH}$ and $P_{O\_PUCCH}$ values that may be used by the terminal for transmission of uplink data and control information before capability negotiation between the base station and the terminal are required. Such default values may be embedded in the base station and the terminal as mentioned above or configured by the base station through the MIB, the SIB, or the common DCI.

The terminal may continuously use the default values until the base station transmits an additional instruction (1a-40) as in FIG. 1A. Such an additional instruction (update of $P_{O\_PUSCH}$ and $P_{O\_PUCCH}$ values) of the base station may be transmitted through UE-specific RRC signaling or through L1-signaling (PDCCH) after RRC connection setup (1a-30) (or after performing a random access process (1a-20)).

The terminal may determine transmission power based on a default transmission power parameter. The terminal may determine uplink PUSCH transmission power and/or uplink PUCCH transmission power based on a default transmission power parameter. The default transmission power parameter may be used by the terminal to determine transmission power before receiving a terminal-specific transmission power parameter. If the terminal receives the terminal-specific transmission power parameter, the terminal may determine uplink transmission power of the terminal using the terminal-specific transmission power parameter. The terminal may determine uplink PUSCH transmission power and/or uplink PUCCH transmission power based on the terminal-specific transmission power parameter. The terminal-specific transmission power parameter may have priority higher than that of the default transmission power parameter. Therefore, if the terminal receives both of the default transmission power parameter, and the terminal-specific transmission power parameter, the terminal-specific transmission power parameter may take precedence in determining transmission power.

The terminal may determine, check, calculate, and obtain transmission power based on a transmission power parameter, and transmit a PUCCH or PUSCH based on the obtained transmission power value.

Figure 1B:
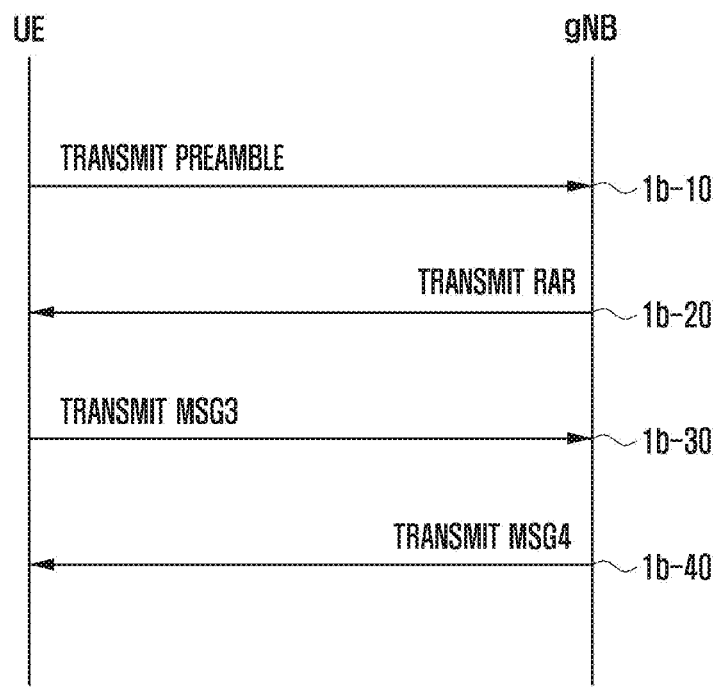
FIG. 1B is a diagram illustrating an example for transmission of a parameter for controlling transmission power of a terminal in a random access process according to an embodiment of the present disclosure.

FIG. 1B is a diagram illustrating an example for transmission of a parameter for controlling transmission power of a terminal in a random access process according to an embodiment of the present disclosure. FIG. 1B may correspond to operation 1a-20 in FIG. 1A. In operation 1b-10, the terminal transmits a random access preamble, and at this time, transmission power parameters used for the transmission of the random access preamble may be transmitted from the base station through the MIB, the SIB, or the common DCI. For example, the base station transmits preambleInitialReceivedTargetPower and powerRampingStep parameters through the SIB, preambleInitialReceivedTargetPower is a value between {−120, −118, −116, . . . , −92, −90} dBm, and powerRampingStep is a value between {0, 2, 4, 6}dB. More specifically, the transmission power for the transmission of the random access preamble of the terminal is calculated as below.

$$P_{PRACH}=\min\{P_{CMAX}(i), \text{PREAMBLE\_RECEIVED\_TARGET\_POWER+PL}\} \text{ [dBm]} \quad \text{Equation 1-j}$$

The terminal sets the preambleInitialReceivedTargetPower parameter received through the SIB as PREAMBLE_RECEIVED_TARGET_POWER, calculates path-loss, and then performs comparison with $P_{CMAX}(i)$ value, thereby determining the transmission power value of the random access preamble.

The base station receives the random access preamble transmitted by the terminal, and in operation 1b-20, the base station transmits a random access response (RAR). The RAR may include information for transmitting MSG3. The terminal receiving the RAR transmits the MSG3 to the base station in operation 1b-30. The base station receiving the MSG3 may transmit MSG3 to the terminal in operation 1b-40.

The terminal monitors the PDCCH to receive random access response (RAR) for a predetermined time after transmitting the random access preamble. Information on how long the terminal needs to monitor the PDCCH for the reception of the RAR is transmitted by the base station through ra-ResponseWindowSize parameter of the SIB. If the terminal fails to receive the RAR for ra-ResponseWindowSize time, the terminal retransmits the random access preamble. At this time, the transmission power of the random access preamble retransmitted by the terminal may be increased by powerRampingStep [dB] as compared to the transmission power used for initial random access preamble transmission using the above-mentioned powerRampingStep parameter.

In the beamforming system, if the random access preamble transmitted by the terminal is not received by the base station, the terminal may perform the following operations.

Option 1) Changing Transmission Beam Used for Random Access Preamble Transmission In the mmWave band, a beamforming system is used due to restriction of coverage. In the beamforming system, a synchronization signal may be beamformed and transmitted in multiple beam directions. The terminal may select a beam having the greatest signal strength among multiple beam directions and perform synchronization. At this time, the terminal may store information on the beam having the greatest signal strength and a beam having the next greatest signal strength (generally, N beams may be stored based on the beam having the greatest signal strength).

If the terminal did not receive the RAR for a predetermined time after transmitting the random access preamble, the terminal changes a beam of the retransmitted random access preamble using beam information stored in the synchronization process. At this time, information on a time for which the terminal needs to monitor the RAR may be transmitted by the base station to the terminal through the MIB, the SIB, or the common DCI.

If the terminal retransmits the random access preamble by changing the beam, by which beam the random access preamble is retransmitted is relevant to a process of acquiring, by the terminal, a synchronization signal beamformed and transmitted. Therefore, in order to limit the number of beam information the terminal may store, a maximum number of retransmission may be limited. The maximum number of retransmission may be transmitted by the base station to the terminal through the MIB, the SIB, or the common DCI, or a value pre-agreed between the terminal and the base station may be used as the maximum number of retransmission.

If the number of random access preamble transmission exceeds the maximum number of retransmission, the terminal stops the random access process, and may newly perform acquirement of beam information (for example, search for a beam having the greatest signal strength) through the synchronization signal beamformed and transmitted.

Option 2) Increasing Transmission Power Used for Random Access Preamble Transmission If the terminal did not receive the RAR for a predetermined time after transmitting the random access preamble, the terminal uses the same beam as the beam used at the time of initial random access preamble transmission. At this time, the transmission power of the retransmitted preamble is increased.

Information on a time for which the terminal needs to monitor the RAR may be transmitted by the base station to the terminal through the MIB, the SIB, or the common DCI.

The RAR monitoring time for applying the beam change mentioned in Option 1 and the RAR monitoring time for applying the transmission power change mentioned in Option 2 may be different from each other.

When the terminal retransmits the random access preamble by increasing the transmission power, to which degree the transmission power is increased for retransmission of the random access preamble may be relevant to a power class of the terminal (that is, maximum transmission power of the terminal). Therefore, there is a need to limit the maximum number of retransmission. The maximum number of retransmission may be transmitted by the base station to the terminal through the MIB, the SIB, or the common DCI, or a value pre-agreed between the terminal and the base station may be used as the maximum number of retransmission.

If the number of random access preamble transmission exceeds the maximum number of retransmission, the terminal stops the random access process, and may newly perform acquirement of beam information (for example, search for a beam having the greatest signal strength) through the synchronization signal beamformed and transmitted.

Option 3) Combining the Above-Mentioned Two Options

If the terminal did not receive the RAR for a predetermined time after transmitting the random access preamble, the terminal uses a beam different from the beam used at the time of initial random access preamble transmission, and increases transmission power of the retransmitted preamble.

Information on a time for which the terminal needs to monitor the RAR may be transmitted by the base station to the terminal through the MIB, the SIB, or the common DCI.

The RAR monitoring time for applying the beam change and the RAR monitoring time for applying the transmission power change may be different from each other. For example, after performing the RAR monitoring for T1 time, if the RAR is not received, the terminal increases the transmission power and retransmits the random access preamble. After the preamble retransmission, the terminal performs the RAR monitoring for T2 time, and then if the RAR is not received, may change the beam and retransmit the preamble. As another example, after performing the RAR monitoring for T1 time, if the RAR is not received, the terminal increases the transmission power and retransmits the random access preamble (first retransmission). After performing the RAR monitoring for T1 time again, if the RAR is not received, the terminal increases the transmission power and retransmits the random access preamble (second retransmission). If the RAR is not received until N-th retransmission is performed (after increasing the transmission power until the number of retransmission reaches the maximum number of retransmission), the terminal changes the beam for transmitting the random access preamble. The maximum number of retransmission may be transmitted by the base station to the terminal through the MIB or the SIB, or a value pre-agreed between the terminal and the base station may be used as the maximum number of retransmission.

Meanwhile, the beam change may be first performed, and the transmission power change may be performed later. That is, after performing the RAR monitoring for T1 time, if the RAR is not received, the terminal changes the beam and retransmits the random access preamble. After the preamble retransmission using the changed beam, the terminal performs the RAR monitoring for T2 time, and then if the RAR is not received, may increase the transmission power and retransmit the preamble. As another example, after performing the RAR monitoring for T1 time, if the RAR is not received, the terminal changes the beam and retransmits the random access preamble (first retransmission). After performing the RAR monitoring for T1 time again, if the RAR is not received, the terminal changes the beam and retransmits the random access preamble (second retransmission). If the RAR is not received until N-th retransmission is performed (after changing the beam until the number of retransmission reaches the maximum number of retransmission), the terminal increases the transmission power for transmitting the random access preamble. The maximum number of retransmission may be transmitted by the base station to the terminal through the MIB, the SIB, or the common DCI, or a value pre-agreed between the terminal and the base station may be used as the maximum number of retransmission.

If the number of random access preamble transmission exceeds the maximum number of retransmission, the terminal stops the random access process, and may newly perform acquirement of beam information (for example, search for a beam having the greatest signal strength) through the synchronization signal beamformed and transmitted.

Among the options mentioned above, which option will be used may be pre-agreed between the base station and the terminal or configured by the base station through the MIB, the SIB, or the common DCI. For example, in the case of "00", Option 1 may be used, in the case of "01", Option 2 may be used, and in the case of "10", Option 3 may be used.

Figure 1C:
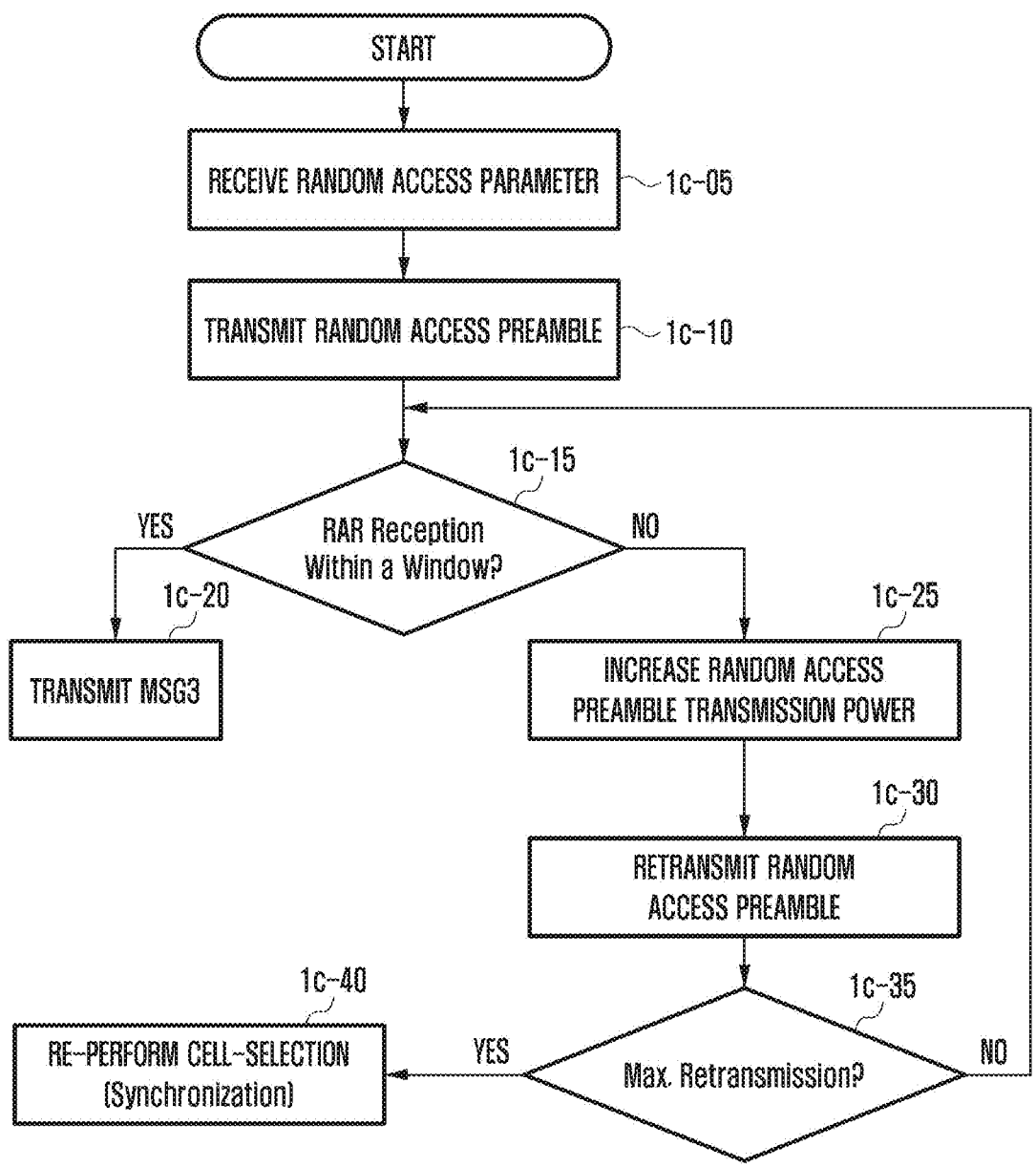
FIG. 1C is a diagram illustrating an example of an operation of a terminal for controlling transmission power of the terminal in a random access process according to an embodiment of the present disclosure.

FIG. 1C is a diagram illustrating an example of an operation of a terminal for controlling transmission power of the terminal in a random access process according to an embodiment of the present disclosure. More specifically, FIG. 1C is a diagram for detailed description of the above-mentioned Option 2.

In operation 1c-05, the terminal receives random access parameters from the base station through the MIB, the SIB, or the common DCI. The random access parameter may include a random access preamble sequence type, a time/frequency resource for random access preamble transmission, target reception power of the random access preamble, a size of power ramping step for increase in transmission power to be performed at the time of random access retransmission, a size of a RAR reception window indicating RAR monitoring time, the maximum number of retransmission of the random access preamble, and the like.

The terminal receiving the random access parameter transmits the random access preamble through Equation 1-j. (operation 1c-10).

In operation 1c-15, the terminal checks whether the RAR is received in the RAR reception window. If the RAR is received, the terminal proceeds to operation 1c-20, and if the RAR is not received, the terminal proceeds to operation 1c-25.

When the RAR is received in the RAR reception window, in operation 1c-20, the terminal may transmit Msg3. A transmission power parameter for the Msg3 transmission may be informed by the base station to the terminal through the RAR.

If the terminal did not receive the RAR in the RAR reception window, in operation 1c-25, the terminal increases random access preamble transmission power and retransmits the random access preamble. At this time, an increase amount of the random access preamble may be configured by the base station through the SIB or the common DCI (size of power ramping step), if the size of the power ramping step is configured to be 0 dB, the transmission power of the random access preamble is not increased.

The terminal performs retransmission while increasing the transmission power of the preamble until the number of retransmission of the random access preamble reaches the maximum (operation 1c-30).

In operation 1c-35, the terminal checks whether the number of retransmission reaches the maximum. If the number of retransmission reaches the maximum, the terminal proceeds to operation 1c-40, and if not, may proceed to operation 1c-15.

If the number of retransmission reaches the maximum number of retransmission, in operation 1c-40, the terminal abandons the random access process and re-performs a cell-selection process. The cell-selection process means a process in which the terminal detects a synchronization signal transmitted from each cell and accesses a beam of the base station transmitting a synchronization signal having the greatest reception signal strength. If the number of retransmission did not reach the maximum number of retransmission, the terminal, the terminal may proceed to operation 1c-15, and may continuously perform operations subsequent to operation 1c-15.

Figure 1D:
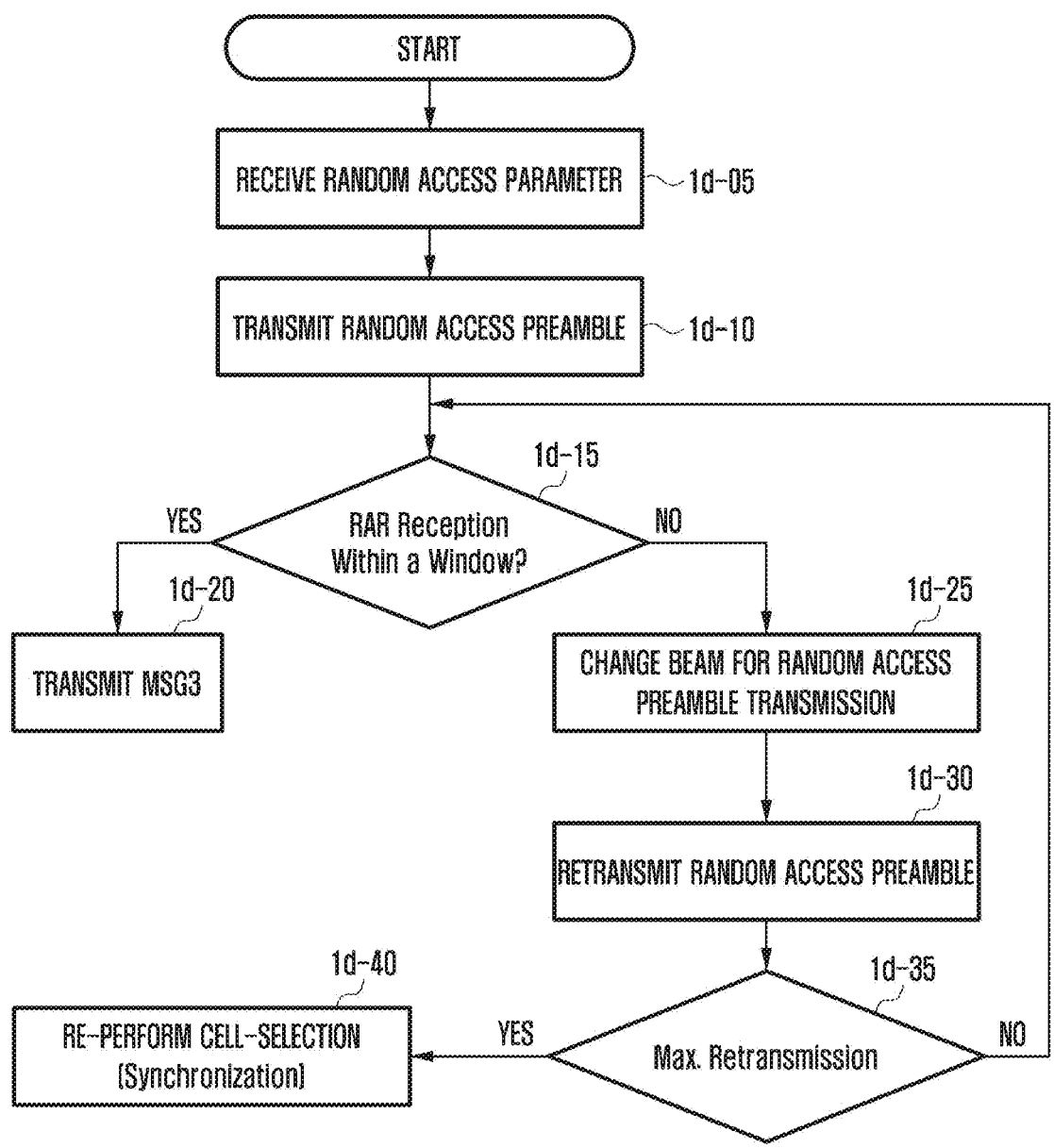
FIG. 1D is a diagram illustrating another example of an operation of a terminal for controlling transmission power of the terminal in a random access process according to an embodiment of the present disclosure.

FIG. 1D is a diagram illustrating another example of an operation of a terminal for controlling transmission power of the terminal in a random access process according to an embodiment of the present disclosure. More specifically, FIG. 1D is a diagram for detailed description of the above-mentioned Option 1.

In operation 1d-05, the terminal receives random access parameters from the base station through the MIB, the SIB, or the common DCI. The random access parameter may include a random access preamble sequence type, a time/frequency resource for random access preamble transmission, target reception power of the random access preamble, information on a beam to be used at the time of random access retransmission, a size of a RAR reception window indicating RAR monitoring time, the maximum number of retransmission of the random access preamble, and the like. At this time, as the information on the beam to be used at the time of random access retransmission, the following may be considered. A value indicating a difference in reception signal strength of the beam [x dB]: it is assumed that if a synchronization signal having the greatest reception signal strength is S1, a synchronization signal having the next greatest reception signal strength is S2, and a synchronization signal having the third greatest reception signal strength is S3 (that is, S1>S2>S3>S4> . . . ), based on a strength of a synchronization signal detected by the terminal through a synchronization signal beamformed and transmitted. At this time, [x dB] is used to select a preamble to be retransmitted by the terminal, and in the case in which S1−S2<[x dB], and S1−S3>[x dB], the terminal use a beam in which the S1 is transmitted for initial transmission of the random access preamble. Further, a beam in which S3 is transmitted may be used for first retransmission of the random access preamble, rather than the beam in which the S2 is transmitted. Similarly, in the case in which S3−S4<[x dB], and S3−S5>[x dB], the terminal may use a beam in which S5 is transmitted for second retransmission of the random access preamble, rather than a beam in which S4 is transmitted. If the beam is changed, the same value of transmission power used for transmission of the random access preamble as transmission power used for transmission of the random access preamble in the previous beam may be used.

The terminal receiving the random access parameter transmits the random access preamble in a specific beam (beam detected through a synchronization signal) through Equation 1-j (operation 1d-10).

In operation 1d-15, the terminal checks whether the RAR is received in the RAR reception window. If the RAR is received, the terminal proceeds to operation 1d-20, and if the RAR is not received, the terminal proceeds to operation 1d-25.

When the RAR is received in the RAR reception window, in operation 1d-20, the terminal may transmit Msg3. As a beam for the Msg3 transmission, the same beam as the beam used for random access preamble transmission is used, and a transmission power parameter at this time may be informed by the base station to the terminal through the RAR.

If the terminal did not receive the RAR in the RAR reception window, in operation 1d-25, the terminal changes the beam for random access preamble transmission and retransmits the random access preamble using the changed beam.

The terminal performs retransmission while changing the beam of the preamble until the number of retransmission of the random access preamble reaches the maximum (1d-30).

In operation 1d-35, the terminal checks whether the number of retransmission reaches the maximum. If the number of retransmission reaches the maximum, the terminal proceeds to operation 1c-40, and if not, may proceed to operation 1d-15.

If the number of retransmission reaches the maximum number of retransmission, in operation 1d-40, the terminal abandons the random access process and re-performs a cell-selection process. The cell-selection process means a process in which the terminal detects a synchronization signal transmitted from each cell and accesses a beam of the base station transmitting a synchronization signal having the greatest reception signal strength. If the number of retransmission did not reach the maximum number of retransmission, the terminal, the terminal may proceed to operation 1d-15, and may continuously perform operations subsequent to operation 1d-15.

Figure 1E:
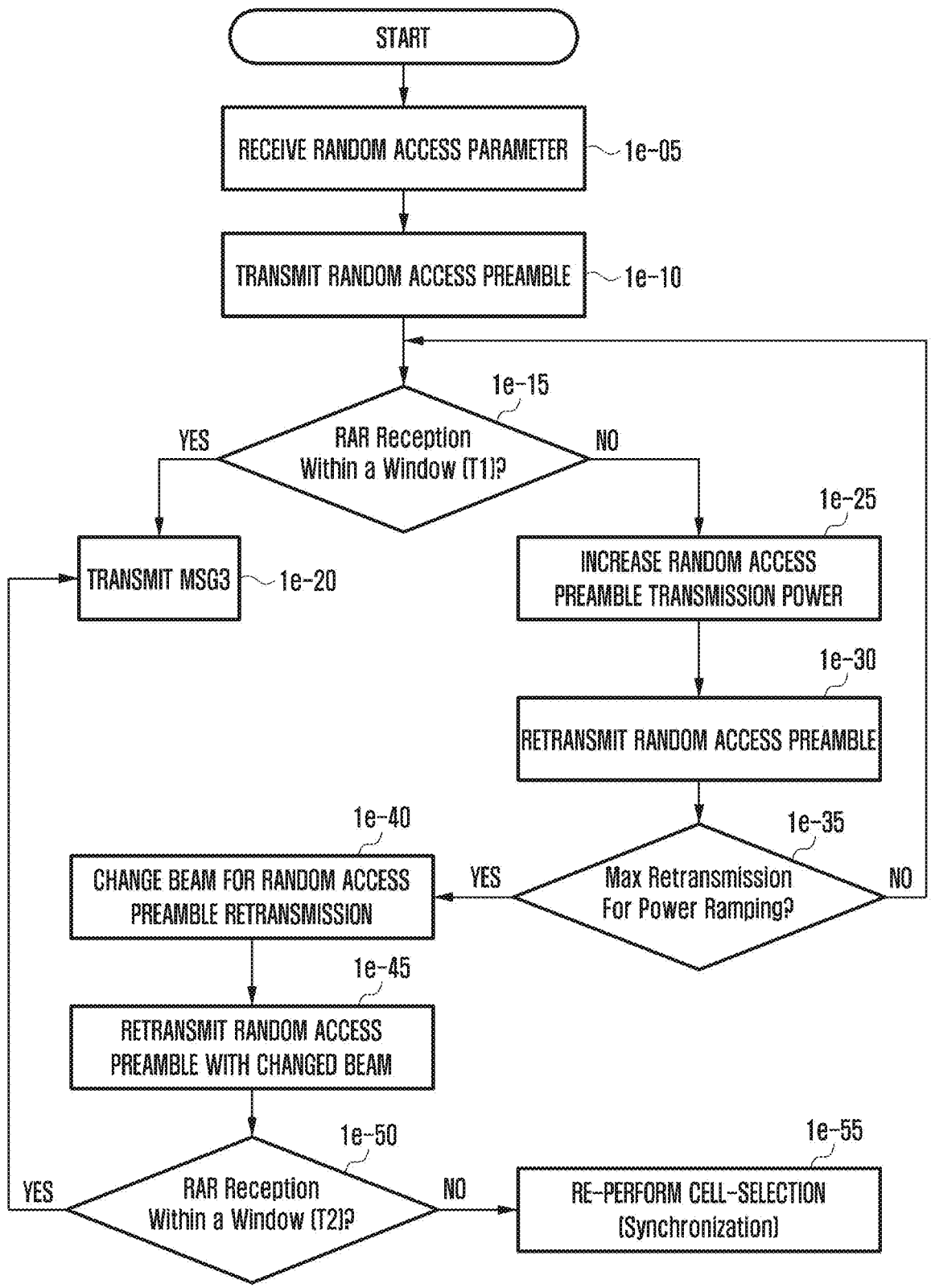
FIG. 1E is a diagram illustrating another example of an operation of a terminal for controlling transmission power of the terminal in a random access process according to an embodiment of the present disclosure.

FIG. 1E is a diagram illustrating another example of an operation of a terminal for controlling transmission power of the terminal in a random access process according to an embodiment of the present disclosure. More specifically, FIG. 1D is a diagram for detailed description of the above-mentioned Option 1.

In operation 1e-05, the terminal receives random access parameters from the base station through the MIB, the SIB, or the common DCI. The random access parameter may include a random access preamble sequence type, a time/frequency resource for random access preamble transmission, target reception power of the random access preamble, a size of power ramping step for increase in transmission power to be performed at the time of random access retransmission, information on a beam to be used at the time of random access retransmission, a size of a RAR reception window indicating RAR monitoring time, the maximum number of retransmission of the random access preamble, and the like. At this time, as the information on the beam to be used at the time of random access retransmission, the following may be considered. A value indicating a difference in reception signal strength of the beam [x dB]: it is assumed that if a synchronization signal having the greatest reception signal strength is S1, a synchronization signal having the next greatest reception signal strength is S2, and a synchronization signal having the third greatest reception signal strength is S3 (that is, S1>S2>S3>S4> . . . ), based on a strength of a synchronization signal detected by the terminal through a synchronization signal beamformed and transmitted. At this time, [x dB] is used to select a preamble to be retransmitted by the terminal, and in the case in which S1−S2<[x dB], and S1−S3>[x dB], the terminal use a beam in which the S1 is transmitted for initial transmission of the random access preamble. Further, a beam in which S3 is transmitted may be used for first retransmission of the random access preamble, rather than the beam in which the S2 is transmitted. Similarly, in the case in which S3−S4<[x dB], and S3−S5>[x dB], the terminal may use a beam in which S5 is transmitted for second retransmission of the random access preamble, rather than a beam in which S4 is transmitted.

The terminal receiving the random access parameter transmits the random access preamble in a specific beam (beam detected through a synchronization signal) through Equation 1-j (operation 1e-10).

In operation 1e-15, the terminal checks whether the RAR is received in the RAR reception window. If the RAR is received, the terminal proceeds to operation 1e-20, and if the RAR is not received, the terminal proceeds to operation 1e-25.

When the RAR is received in the RAR reception window, in operation 1e-20, the terminal may transmit Msg3. As a beam for the Msg3 transmission, the same beam as the beam used for random access preamble transmission is used, and a transmission power parameter at this time may be informed by the base station to the terminal through the RAR.

If the terminal did not receive the RAR in the RAR reception window, in operation 1e-25, the terminal may increase random access preamble transmission power and retransmit the random access preamble in the same beam as the beam used for initial transmission of the random access preamble.

The terminal performs retransmission while increasing the transmission power of the preamble until the number of retransmission of the random access preamble reaches the maximum (operation 1e-30).

In operation 1e-35, the terminal checks whether the number of retransmission reaches the maximum. If the number of retransmission reaches the maximum, the terminal proceeds to operation 1e-40, and if not, may proceed to operation 1e-15.

If the number of retransmission reaches the maximum number of retransmission, in operation 1e-40, the terminal changes the beam for random access preamble transmission and in operation 1e-45, retransmits the random access preamble using the changed beam.

In operation 1e-50, the terminal checks whether the RAR is received in the RAR reception window. If the RAR is received, the terminal proceeds to operation 1e-20, and if the RAR is not received, the terminal proceeds to operation 1e-55.

After transmitting the random access preamble using the changed beam, if the RAR is not received for a predetermined time (RAR reception window), the terminal abandons the random access process, and re-performs the cell-selection process (operation 1e-55). The cell-selection process means a process in which the terminal detects a synchronization signal transmitted from each cell and accesses a beam of the base station transmitting a synchronization signal having the greatest reception signal strength. At this time, RAR reception window (T1) for power ramping and RAR reception window (T2) may be the same as each other or different from each other.

As another example, after retransmitting the random access preamble using the changed beam, if the RAR is not received until the number of retransmission reaches the maximum number of retransmission, the random access process is abandoned, and the cell-selection process may be re-performed. The maximum number of retransmission at this time may be the same as or different from the maximum number of retransmission for power ramping.

Meanwhile, when combining Option 1 and Option 2, a sequence of preamble transmission power and beam change may be applied differently from FIG. 1E. In FIG. 1E, a case in which the transmission power is increased to transmit the random access preamble, and if the RAR is not received, the beam is changed is described. However, the beam change may be first performed, and then if the RAR is not received, the transmission power for the random access preamble may be increased.

FIGS. 1F and 1G are diagrams illustrating examples of parameters for controlling transmission power of a terminal after RRC connection setup according to an embodiment of the present disclosure. Such parameters may be transmitted to each terminal through UE-specific dedicated RRC signaling, and a cell using a wide beam and a cell using a narrow may use different parameters. As another example, a wide beam may be operated at a specific moment and a narrow beam may be operated at another moment in the same cell depending on an operation of the base station. More specifically, in order to decrease initial beam searching time of the terminal, the synchronization signal and broadcast channel may be operated using a wide beam. The base station may transmit UE-specific data and control information by forming a narrow beam based on the wide beam detected by the terminal. Therefore, in this case, the base station may configure all of P0 and alpha value for the wide beam, and P0 and alpha value for the narrow beam. In this example, two types of beam, that is, the wide beam and the narrow beam are described, but different $P_0$ values and $\alpha$ values may be configured for each beam width of the terminal. Further, in the present embodiment, $P_0$ is used by being divided into two values, P0-Nominal and P0-UE, but $P_0$ may also be used as signal $P_0$ value. For example, $P_0$ may be used in forms of P0-PUSCH-WideBeam and P0-PUSCH-NarrowBeam.

Further, similarly to the PUSCH, for the PUCCH, P0-NominalPUCCH-WideBeam (P0-NominalPUCCH-NarrowBeam), P0-UE-PUCCH-WideBeam (P0-UE-PUCCH-NarrowBeam), and Alpha-Widebeam (Alpha-Narrowbeam) may be defined, and such values may be the same as or different from values used for the PUSCH. Whether the terminal may use a wide beam or a narrow beam may depend on capability of the terminal. For example, terminals that may have a large number of antenna arrays may use a narrow beam. Therefore, such RRC signaling may be applied after capability negotiation between the base station and the terminal.

As another example, there may be beam reciprocity between a transmission beam and a reception beam of the base station, and a transmission beam and a reception beam of the terminal. At this time, beam reciprocity from the point of view of the base station and beam reciprocity from the point of view of the terminal may be considered, respectively or simultaneously. The beam reciprocity from the point of view of the base station means a case in which the transmission beam of the base station and the reception beam of the base station are the same as each other, and the beam reciprocity from the point of view of the terminal means a case in which the transmission beam of the terminal and the reception beam of the terminal are the same as each other. The case in which the reception beam of the base station and the transmission beam of the base station (or the transmission beam of the terminal and the reception beam of the terminal) are the same as each other means that beam gains or beam directions of the reception beam and the transmission beam are the same as each other. The case in which beam reciprocity is not established from the point of view of the base station means that the beam gains or beam directions of the reception beam of the base station and the transmission beam of the base station are different from each other. At this time, the different beam gains mean that gain a difference between the reception beam and the transmission beam deviates from a certain range. Similarly, the different beam directions mean that a difference between the reception beam direction and the transmission beam direction deviates from a certain range. Similarly to the case in which beam reciprocity is not established from the point of view of the base station, the case in which beam reciprocity is not established from the point of view of the terminal means that a difference in the beam gains or beam directions between the reception beam and the transmission beam deviates from a certain range.

Depending on presence and absence of such beam reciprocity, different power controls may be made. More specifically, if beam reciprocity is established, the base station may transmit P0 values for N different beams (P0 value having different values for each beam) like {P01, P02, . . . , P0N} to the terminal through RRC signaling. On the contrary, if beam reciprocity is not established, the base station may transmit P0 values for M different transmission beam—reception beam pairs (different P0 values for each beam pair) like {P01', P02', . . . , P0M'} to the terminal through RRC signaling. The base station determines whether beam reciprocity is established and if the beam reciprocity is established, transmits {P01, P02, . . . , P0N} through the RRC signaling, and if the beam reciprocity is not established, may transmit {P01', P02', . . . , P0M'} through the RRC signaling.

As another example, the base station does not determine whether beam reciprocity is established and P0 values ({P01, P02, . . . , P0N}) for the case in which the beam reciprocity is established or P0 values ({P01', P02', . . . , P0M'}) for all combinations of transmission beam—reception beam to the terminal through the RRC signaling. Thereafter, if the base station determines that beam reciprocity is established in a subframe in which the terminal transmits uplink data/control information, whether the beam reciprocity is applied or not may be informed to the terminal through "1-bit" RRC signaling or "1-bit" DCI signaling (BeamReciprocity_enabled or BeamReciprocity_disabled). The terminal receiving BeamReciprocity_enabled uses N values configured of {P01, P02, . . . , P0N}. The terminal receiving BeamReciprocity_disabled uses M values configured of {P01', P02', . . . , P0M'}.

As another example, the base station may signal a P0 value as a reference through RRC and then signal an offset value with an actually used beam from the reference through RRC or DCI. More specifically, if assuming the P0 value (P0 value for each beam) as a reference as {P01, P02, . . . , P0N}, information on which P0 will be used (e.g., P02) and offset information on how much offset value needs to be applied based on P02 may be transmitted. Alternatively, the P0 value as a reference may be signaled through the RRC, and the offset value may also be signaled through the RRC (e.g., {offset_1, offset_2, . . . , offset_K}). Further, which offset value needs to be actually used may be indicated through the DCI.

In a transmission power control of the existing LTE uplink data channel (PUSCH) and uplink control channel (PUCCH), path-loss is calculated by the terminal as in Equation 1b. In a system considering hybrid beamforming, a difference in beam gain depending on a transmission beam—reception beam pattern of the base station and the terminal may exist. At this time, the beam gain may be generated since RF elements configuring an RF chain generating the transmission beam and an RF chain forming the reception beam are different from each other. For example, since a phase shifter of the RF chain generating the transmission beam and a phase shifter of the RF chain forming the reception beam are different from each other, in order for the transmission beam and the reception beam to form the same beam width, even though the same phase shift value is used, the transmission beam and the reception beam may form beam widths different from each other. As another example, a gain difference between the transmission beam and the reception beam may be generated since the number of panels of the antenna generating the transmission beam and the number of panels of the antenna forming the reception beam are different from each other. More specifically, the number of transmission beam panels of the terminal may be smaller than the number of reception beam panels of the terminal. Accordingly, a width of the transmission beam of the terminal may be larger than a width of the reception beam of the terminal. Similarly, the number of transmission beam panels of the base station may be different from the number of reception beam panels of the base station.

Due to the gain difference between the transmission beam and the reception beam, a value of path-loss calculated by the terminal through downlink and a value of path-loss for which the terminal suffers when actually transmitting data and control information through uplink may be different from each other. More specifically, the downlink path-loss estimated by the terminal may include transmission beam gain of the base station and reception beam gain of the terminal. Further, the data and control information transmitted by the terminal through uplink are received by the base station while the transmission beam gain of the terminal and the reception beam gain of the base station are combined with the path-loss. Accordingly, even when the downlink path-loss and the uplink path-loss are the same as each other, if the transmission beam gain of the base station+the reception beam gain of the terminal reflected at the time of calculating the downlink path-loss (assumed as being GDL) and the transmission beam gain of the terminal+the reception beam gain of the base station reflected at the time of actual uplink transmission (assumed as being GUL) are different from each other, the base station may not predict transmission power actually transmitted by the terminal. For example, if GDL<GUL, downlink path-loss+GDL>uplink path-loss+GUL (in the case in which downlink path-loss is the same as uplink path-loss). At this time, the terminal transmits uplink data and control information with larger power than actually required transmission power. This may cause unnecessary power consumption and additional interference to a neighboring cell. On the contrary, if GDL>GUL, downlink path-loss+GDL<uplink path-loss+GUL (in the case in which downlink path-loss is the same as uplink path-loss). At this time, the terminal performs transmission with smaller power than actually required transmission power. This may not satisfy reception target SINR in a serving base station, thus uplink data and control information reception performance may deteriorate. Accordingly, a beam gain difference depending on a transmission/reception beam pattern needs to be reflected.

Meanwhile, the terminal may transmit power headroom report (PHR) to the base station through an MAC control element and an MAC message. At this time, the PHR information is configured of a difference between maximum transmission power that may be transmitted by the terminal and actual transmission power transmitted by the terminal. The base station determines whether the terminal may additionally increase transmission power (if the PHR value is a positive number) or whether the terminal needs to decrease transmission power (if the PHR value is a negative number) based on the PHR information transmitted by the terminal. If the PHR value is a positive number, the base station may increase resources at the time of next uplink transmission of the terminal transmitting the PHR, and if the PHR value is a negative number, the base station may decrease resources at the time of next uplink transmission of the terminal transmitting the PHR. At this time, due to the difference between GDL and GUL mentioned above, the terminal may transmit uplink data and control information with transmission power larger than transmission power that the terminal actually needs to transmit. This may cause unnecessary power consumption and additional interference to a neighboring cell. Further, due to the difference between GDL and GUL mentioned above, the terminal may transmit uplink data and control information with transmission power smaller than transmission power that the terminal actually needs to transmit. This may not satisfy reception target SINR in a serving base station, thus uplink data and control information reception performance may deteriorate. Therefore, there is a need to decrease errors generated due to the GDL and GUL.

As an example for solving the problem, the base station may inform the terminal of transmission beam gain and reception beam gain of the base station at the time of capability negotiation between the base station and the terminal. The terminal may reflect transmission/reception beam gain of the base station transmitted from the base station and transmission/reception beam gain of the terminal measured by the terminal itself in downlink path-loss calculation for the transmission power control.

As another example, the terminal may include information on transmission beam gain and reception beam gain of the terminal in PHR when transmitting the PHR to the base station. The terminal may recalculate PHR through transmission/reception beam gain of the terminal transmitted from the terminal and transmission/reception beam gain of the base station measured by the base station itself.

As another example, the base station may transmit transmission beam gain of the base station to the terminal through RRC signaling. More specifically, referenceSignalPower in Equation 1-b may be a value including transmission power of the base station and transmission beam gain of the base station. That is, referenceSignalPower configured by the base station through RRC is a value configured by transmission power of the base station+transmission beam gain of the base station. Further, RSRP measured by the terminal is reception power in which downlink path-loss and reception beam gain of the terminal are reflected. Accordingly, transmission beam gain of the base station and reception beam gain of the terminal may be naturally reflected in downlink path-loss calculated by the terminal. Therefore, the terminal may transmit transmission beam gain of the terminal to the base station, and the transmission may be made at the time of capability negotiation between the base station and the terminal, or may be made through MAC control element/MAC message for transmitting the PHR or a separate MAC control element/MAC message.

As another method of reflecting a beam gain difference depending on a transmission/reception beam pattern, the base station may appropriately use a P0 value. More specifically, P0_Nominal_PUSCH/P0_Nominal_PUCCH is a cell-specific value, and may appropriately reflect a difference in transmission beam and reception beam gain of the base station. Further, P0_UE_PUSCH/P0_UE_PUCCH may appropriately reflect a difference in transmission beam and reception beam gain of the terminal. As in the method mentioned above, the base station may acquire information on transmission beam and reception beam gain of the terminal through capability negotiation between the base station and the terminal or the base station may acquire information on transmission beam and reception beam gain of the terminal through PHR transmission of the terminal By using the information, the base station may determine P0_Nominal_PUSCH/P0_Nominal_PUCCH value or P0_UE_PUSCH/P0_UE_PUCCH value by using transmission beam gain and reception beam gain of the base station measured by the base station itself.

As another method of reflecting a beam gain difference depending on a transmission/reception beam pattern, the base station may appropriately use a closed-loop power control value. More specifically, in Equation 1-a, $f(i)$ is a value that may be dynamically controlled by the base station through the PDCCH, and may appropriately reflect a difference in transmission beam and reception beam gain of the base station. For example, the terminal may calculate downlink PL in which the transmission beam of the base station and the reception beam of the terminal (that is, GDL) are reflected to set a transmission power value of the terminal. The base station may predict uplink PL in which the transmission beam of the terminal and the reception beam of the base station (that is, GUL) are reflected by using an uplink data channel, uplink control channel, or uplink control signal (e.g., sounding reference signal, demodulation reference signal, or the like) of the terminal. The base station may infer a difference between the downlink PL calculated by the terminal and the uplink PL predicted by the base station using PHR information reported by the terminal and the uplink PL predicted by the base station itself (that is, a difference between the downlink PL and the uplink PL, offset). The base station may perform dynamic configuration through the PDCCH by reflecting the offset value in $f(i)$ (adjusting δ value included in $f(i)$).

In a hybrid beamforming system, a large number of beams may exist according to a combination of transmission beams of the base station and reception beams of the terminal. For example, if the number of transmission beams of the base station is 100, and the number of reception beams of the terminal is 2, there may be a total of 200 beam pairs. In order to perform transmission power control for each of different beams, the terminal needs to perform path-loss calculation for each beam. However, in the case of performing the path-loss calculation for too many beams, a required amount of memory of the terminal is increased, which is not preferable. On the contrary, in the case of performing the path-loss calculation for too few beams, there may be limitation in beam operation of the base station. For example, in the case of a terminal-A, signal strength for three beam (or beam pair) of a beam 1, a beam 12, and a beam 33 may be greater than other beams, and uplink data and control information may be transmitted using the beams. Therefore, although path-loss for the beams is stored, the terminal may determine that a large number of users gather around the beams or that an amount of interference caused to a neighboring cell may increase when the beams are used.

In this case, the terminal-A may not perform transmission in the corresponding subframe (the base station scheduler does not allocate a beam). Accordingly, latency may occur. In order to solve the problem, as a second-best solution, the base station may instruct the terminal-A to transmit uplink data and control information using another beam (e.g., beam 102 or beam pair 102), although it is not a preferred beam of the terminal-A. At this time, if the terminal does not store a path-loss value for the beam 102, the transmission power control may not be performed. In order to solve the problem, the following operation may be considered.

Figure 1H:
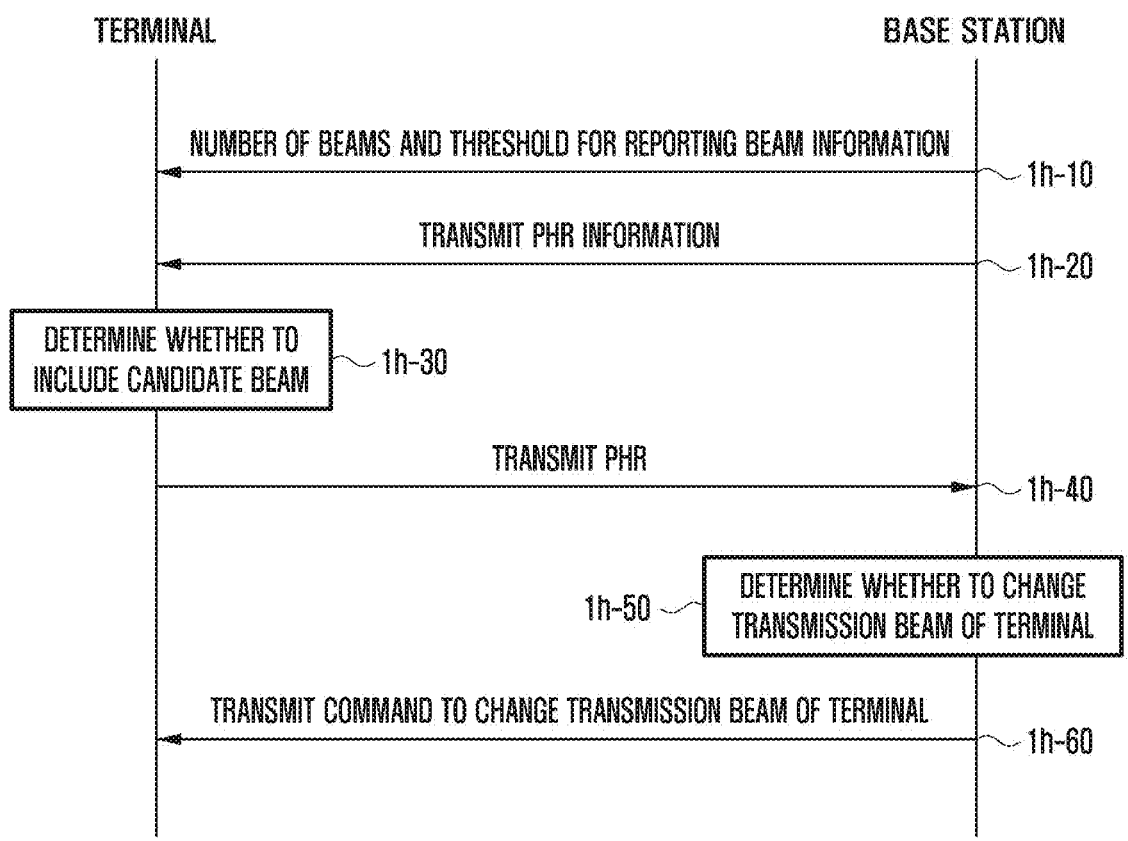
FIG. 1H is a diagram illustrating an operation of a base station and a terminal related to a change of an uplink transmission beam of the terminal based on power headroom reporting (PHR) according to an embodiment of the present disclosure.

FIG. 1H is a diagram illustrating an operation of a base station and a terminal related to a change of an uplink transmission beam of the terminal based on power headroom reporting (PHR) according to an embodiment of the present disclosure.

The base station may transmit the number of beams to be reported by the terminal to the terminal through RRC signaling, MAC control element/MAC message, or DCI. For example, if the number of beams (or beam pairs) is set to be N, the terminal reports a beam index and reception signal strength of a beam for each of N beams (hereinafter, referred to as beam information) to the base station through uplink. Such a beam information may be periodically transmitted by the terminal or aperiodically transmitted by instruction of the base station. Meanwhile, the terminal transmits PHR to the base station, and the PHR transmission may be made when a specific condition is satisfied (event triggered) or may be periodically made. The PHR information may be transmitted through the MAC control element or MAC message, and configured of a maximum transmission power value of the terminal and a transmission power value actually used by the terminal. The base station may transmit instruction to change an uplink transmission beam of the terminal using the PHR information transmitted from the terminal.

The base station may indicate for how many beams the terminal needs to perform path-loss measurement and store through the RRC signaling, MAC control element/MAC message, or DCI, and such information may be used in the PHR process. For example, if the base station indicates that the number of beam (or beam pairs)=3, the terminal may calculate and store path-loss for three beams for the power transmission control. At this time, the three beams may be three beams having the greatest signal strength based on signal strength. Alternatively, the three beams may be a beam (assumed as being beam A) having the greatest signal strength, a beam (assumed as being beam B) having a signal strength difference of x dB based on the beam A, and a beam having a signal strength difference of x dB based on beam B. A reason of having a difference of x dB is that a path-loss difference may not be large in the case of different beams having the same signal strength. Therefore, the terminal need not store multiple similar path-loss values. At this time, the x dB value may be transmitted through the RRC signaling, MAC control element/MAC message, or DCI. The number of beams for which the terminal needs to perform path-loss measurement may be indicated, and a beam index or beam index set for measurement may be indicated as well. This may also be referred to as information on the beam for path-loss measurement.

As another example, if the base station indicates that the number of beam (or beam pairs)=3, the three beams of which path-loss needs to be calculated by the terminal may be a beam (assumed as being beam A) having the greatest signal strength, and beams (assumed as being beam B and beam C) having a signal strength difference of y dB or less based on the beam A, A reason of limiting the signal strength difference to y dB or less is that if the strength difference of the beam is too large, there is no possibility of using the corresponding beam. Therefore, the terminal need not store multiple similar path-loss values. At this time, the y dB value may be transmitted through the RRC signaling, MAC control element/MAC message, or DCI.

More specifically, as in FIG. 1H, in operation 1h-10, the base station may transmit "Number of Beams" parameter that informs for how many beams beam information is to be reported, to the terminal through the RRC signaling, MAC control element/MAC message, or DCI. The terminal receiving the parameter transmits beam information as many as the number indicated by the "Number of Beams" parameter to the base station through uplink. For example, if "Number of Beams"=3, the terminal may transmit a beam index and reception signal strength of a beam (beam information) for each of three beams to the base station in uplink. At this time, the beam information may be transmitted through the PUCCH, PUSCH or MAC control element/MAC message. Meanwhile, the base station may transmit a threshold for beam information reporting to the terminal together with the "Number of Beams" parameter through the RRC signaling, MAC control element/MAC message, or DCI. A purpose of the threshold value is to decrease the number of beams reported by the terminal. For example, if "Number of Beams"=3, the terminal may transmit a beam index and reception signal strength of a beam (beam information) for each of three beams to the base station in uplink. At this time, if a difference in signal strength for three beams is very large, that is, although signal strengths of the beam-A and the beam-B are similar to each other, since signal strength of the beam-C is very small, even when the terminal reports the beam information, it may not be helpful for beam operation of the base station. Further, unnecessary reporting of beam information may waste uplink resource and increase power consumption of the terminal. Therefore, the base station may configure the threshold value so that a beam having reception signal strength of the threshold value or less is not reported.

In operation 1h-20, the base station transmits PHR information to the terminal. The PHR information may include information on the number of beams in which the PHR is to be transmitted. If the information on the number of beams is not separately included in the PHR information, the "Number of Beams" parameter used in operation 1h-10, may be used. Alternatively, the number of beams included in the PHR information may be different from the "Number of Beams" parameter used in operation 1h-10. Two thresholds (threshold-1 and threshold-2, threshold-1<threshold-2) may be included. The terminal receiving the PHR information determines whether a difference between reception signal strength of a previous serving beam (beam used for uplink data and control information transmission in previous subframe n−k) and reception signal strength of a current serving beam (beam used for uplink data and control information transmission in current subframe n) is the threshold-1 or more. If the difference in the reception signal strength between the previous serving beam and the current serving beam is the threshold-1 or more, but is less than the threshold-2, the terminal may perform transmission by including serving beam information in the PHR. At this time, the serving beam information may include an index of a serving beam and reception signal strength of the serving beam. If the difference in the reception signal strength between the previous serving beam and the current serving beam is not the threshold-1 or more, the terminal may not transmit the PHR. If the difference in the reception signal strength between the previous serving beam and the current serving beam is the threshold-2 or more, the terminal may perform transmission by including serving beam and candidate beam information in the PHR. Candidate beams mean beams that are not a serving beam but may become a serving beam. For example, if it is assumed that the number of beams configured in the PHR information transmitted by the base station to the terminal or the "Number of Beams" parameter is N, N−1 beams may be candidate beams except from the serving beam.

As another example, in operation 1h-20, the base station may configure a single threshold in the PHR information. The terminal receiving this determines whether a difference between the previous serving beam and the current serving beam is the corresponding threshold or more. If the difference between the previous serving beam and the current serving beam is the threshold or more, and the PHR value is a positive number, the terminal may include serving beam information in the PHR. If the difference between the previous serving beam and the current serving beam is the threshold or more, and the PHR value is a negative number, the terminal may perform transmission by including both of the serving beam information and candidate beam information in the PHR.

A timer value may be included in the PHR information transmitted by the base station to the terminal through the RRC signaling, rather than the above mentioned two thresholds (threshold-1 and threshold-2). The timer value may include a periodic PHR timer indicating a PHR transmission period, and a prohibit PHT timer indicating a timer in which PHR transmission is prohibited. Further, information on whether for how many beams the terminal needs to transmit PHR to the base station may be included in the PHR information transmitted by the base station to the terminal through the RRC signaling. Alternatively, information on the number of beams is not transmitted together with the PHR information, but may be transmitted to the terminal through the RRC signaling, MAC control element/MAC message, or DCI when the base station transmits a beam-related parameter.

In operation 1h-30, the terminal may determine for how many beams the terminal needs to transmit the PHR to the base station using the information on the number of beams transmitted together with the PHR information or the information on the number of beams transmitted while being included in the beam-related parameter. Alternatively, the base station may perform configure for how many beams the terminal needs to transmit the PHR using the information on the number of beams transmitted together with the PHR information or the information on the number of beams transmitted while being included in the beam-related parameter. For example, it is assumed that the information on the number of beams transmitted together with the PHR information or the information on the number of beams transmitted while being included in the beam-related parameter indicates N (N refers to the number of beams). Further, it is assumed that configuration is performed so that periodic PHR timer=10 subframes.

The terminal receiving this transmits PHR for N beams to the base station with a period of 10 subframes in operation 1h-40. At this time, if N=1, the terminal may perform transmission to the base station by including a beam index for a serving beam and reception signal strength of the beam having a corresponding index in the PHR information. If N>1, the terminal may perform transmission to the base station by including a serving beam index, candidate beam indices, reception signal strength of the serving beam and candidate beams having a corresponding index in the PHR information. The beam information may be transmitted through the MAC control element or MAC message. Meanwhile, if prohibit PHR timer=20 subframes, the terminal may not perform PHR reporting for 20 subframes.

In operation 1h-50, the base station receiving the PHR information in a subframe "n" from the terminal compares the PHR information with PHR information received in a previous subframe "n−k" to determine whether to change a transmission beam used for a data channel or control channel transmitted by the terminal in uplink in a next subframe "n+j".

In operation 1h-60, if the base station determines to change the transmission beam, the base station may inform the terminal of the changed beam index through the RRC signaling, MAC control element/MAC message, or DCI. The terminal receiving this uses the corresponding beam at the time of next uplink transmission. Unlike this, if the base station determines not to change the transmission beam, the base station may explicitly inform the terminal of the existing beam index through the RRC signaling, MAC control element/MAC message, or DCI. The terminal receiving this uses the existing beam at the time of next uplink transmission. Meanwhile, as another example of the case in which the base station determines not to change the transmission beam, the base station may not perform any operation. The terminal operates a timer based on a point in time at which the terminal transmits PHR to the base station, and performs uplink transmission using the existing beam if a beam index (changed beam index) is not received through the RRC signaling, MAC control element/MAC message, or DCI until the timer expires.

Figure 1I:
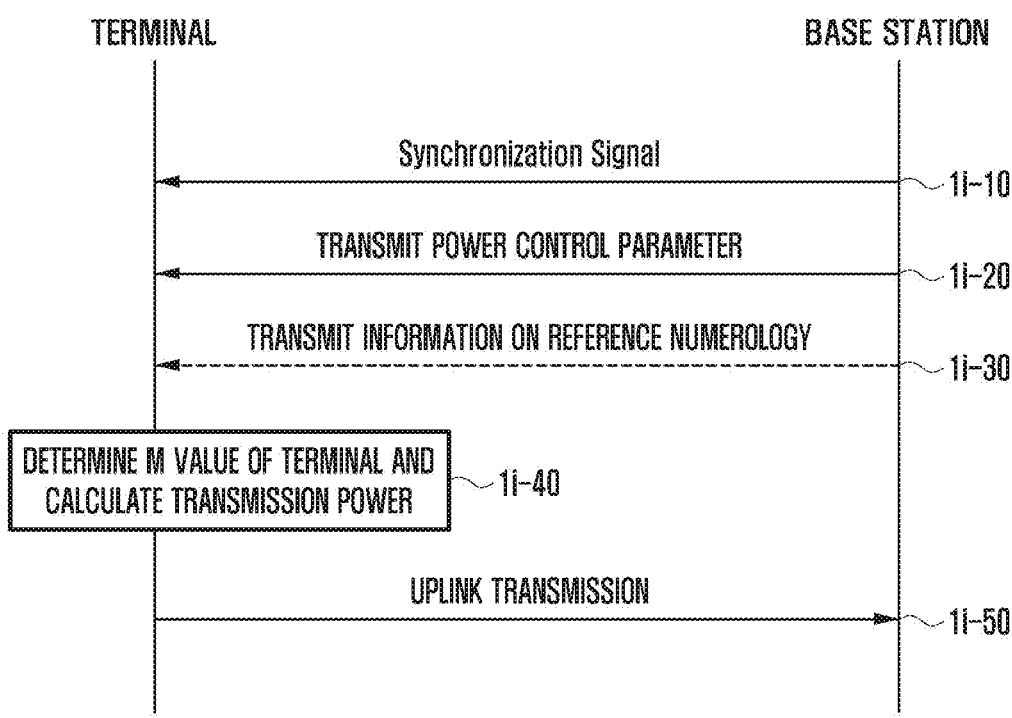
FIG. 1I is a diagram illustrating an example of an operation of a terminal when using different subcarrier spacings in one cell (or by one base station) according to an embodiment of the present disclosure.

FIG. 1I is a diagram illustrating an example of an operation of a terminal when using two or more subcarrier spacings in one cell (or by one base station) according to an embodiment of the present disclosure. It is assumed that different terminals support different services in the same cell. More specifically, a terminal-1 supports an eMBB service thus may use a subcarrier spacing (SCS) of 15 kHz, and a terminal-2 supports an URLLC service thus may use an SCS of 60 kHz. At this time, it is assumed that the terminal-1 and the terminal-2 receive allocation of 2 resource blocks (RBs) as uplink transmission resource from the base station (M=2 in Equation 1-a). Since the terminal-1 and the terminal-2 use different SCSs, power spectral densities (PSD) become different. Therefore, even if the same M=2 is allocated, in order to maintain the same PSD, the terminal-1 and the terminal-2 need to interpret the M value to be different. For example, the terminal-1 may interpret the M value to be 2, and the terminal-2 may interpret the M value to be 8. Since the SCS used by the terminal-2 is four times the SCS used by the terminal-1, in order for the terminal-2 to maintain the same PSD as the terminal-1, the terminal-2 needs to interpret the M value as 8 (2×4) even though 2 RBs are allocated. As another example, the terminal-2 may interpret the M value to be 2, and the terminal-1 may interpret the M value to be ¼. Since the SCS used by the terminal-1 is ¼ times the SCS used by the terminal-2, in order for the terminal-1 to maintain the same PSD as the terminal-2, the terminal-1 needs to interpret the M value as ¼ (2/8) even though 2 RBs are allocated. That is, depending on which value is used as a reference SCS, an operation of a terminal having a different SCS rather than the reference SCS may be changed. Therefore, a method for determining a reference SCS is required.

More specifically, in operation 1i-10, the base station transmits a synchronization signal to the terminal. At this time, it is assumed that a subcarrier spacing (SCS) used for the synchronization signal transmission is A kHz (A=2n×15 kHz, n=−1, 0, 1, 2, . . . ). At this time, the A value may vary depending on a center carrier frequency operated by the base station. For example, at the center carrier frequency of 2 GHz, A=15 kHz, and at the center carrier frequency of 30 GHz, A=120 kHz. Meanwhile, two or more A values may exist at the center carrier frequency operated by the base station. For example, a base station-1 using the center carrier frequency of 2 GHz may use the A value of 15 kHz, and a base station-2 may use the A value of 60 kHz. The terminal does not know the A value to be used at the center carrier frequency operated by the base station, thus may blindly find.

Operation 1i-20: The base station transmits uplink transmission power parameters to the terminal. The parameters are transmitted through the SIB or RRC signaling, an SCS used for the transmission through the SIB or RRC signaling may be the same as or different from an SCS of a synchronization signal. If an SCS different from the SCS of the synchronization signal is used, indication therefor is required. For example, when the uplink transmission power parameters are transmitted through the SIB, an SCS used for the SIB transmission may be indicated through the MIB. Further, after the RRC connection setup, if the uplink transmission power parameters are transmitted through the RRC signaling, an SCS used for the RRC signaling may be indicated through the MIB, SIB, or common DCI. If the same SCS as the SCS of the synchronization signal is used, separate indication is not required.

Operation 1i-30: If the same SCS as the SCS used for the synchronization signal transmission is used as a reference for determining an M value, separate reference numerology information is not required. If an SCS different from the SCS used for the synchronization signal transmission is used as a reference for determining the M value, separate indication may be required. The indication may be transmitted through the MIB, SIB, or common DCI.

Operation 1i-40: If the same SCS as the SCS used for the synchronization signal transmission is used as a reference for determining the M value, a terminal using the same SCS as the SCS used for the synchronization signal transmission may apply the number of RBs indicated by the base station through the DCI to the M value as it is. A terminal using the SCS different from the SCS used for the synchronization signal transmission may scale-up or scale-down the number of RBs indicated by the base station through the DCI based on the reference value (the SCS used for the synchronization signal transmission). For example, it is assumed that the SCS used for the synchronization signal transmission is 15 kHz, and the SCS used by the terminal for uplink transmission is 60 kHz. If the number of RBs indicated by the base station through the DCI is 2, the terminal reinterprets the M value to be 8 (2×4) and calculates transmission power. As another example, it is assumed that the SCS used for the synchronization signal transmission is 240 kHz, and the SCS used by the terminal for uplink transmission is 120 kHz. If the number of RBs indicated by the base station through the DCI is 4, the terminal reinterprets the M value to be 2 (4/2) and calculates transmission power.

Similarly, if the base station transmit reference SCS information to the terminal through the MIB, SIB, common DCI, or RRC signaling (if the SCS different from the SCS used for the synchronization signal transmission is set as a reference value), the terminal may scale-up or scale-down the number of RBs indicated by the base station through the DCI based on the reference value.

In operation 1i-50, the terminal performs uplink data and control information transmission using a calculated transmission power value.

As another example for the transmission power control of the terminal when using two or more subcarrier spacings (SCS) in one cell (or by one base station), the base station may transmit different transmission power control values to the terminal through the MIB, SIB, or common DCI depending on the SCS used in its cell. More specifically, a P0 value when using an SCS of 15 kHz and a P0 value when using an SCS of 30 kHz may be different from each other. For example, it is assumed that a terminal-1 uses the SCS of 1 kHz, and a terminal-2 uses the SCS of 30 kHz, and both of the terminal-1 and the terminal-2 receive allocation of 2 RBs for uplink data (or control information) transmission. For the terminal-1 and the terminal-2, different P0 values are configured, respectively (P0 value corresponding to the SCS of 15 kHz is configured for the terminal-1 and P0 value corresponding to the SCS of 30 kHz is configured for the terminal-2), and the terminal-1 and the terminal-2 both may apply the M value of 2 (M=2).

As another example, the same P0 value is used regardless of the SCS, but transmission power control of different SCSs may be defied by using the closed-loop power control parameter, f(i) in Equation 1-a. For example, it is assumed that a terminal-1 uses the SCS of 1 kHz, and a terminal-2 uses the SCS of 30 kHz, and both of the terminal-1 and the terminal-2 receive allocation of 2 RBs for uplink data (or control information) transmission. The same P0 value is configured for both of the terminal-1 and the terminal-2, and the terminal-1 and the terminal-2 may use the M value of 2 (M=2). The base station may control the f(i) value that may be used by the terminal-1 and the terminal-2 through the DCI (δ values included in f(i) are differently set).

Meanwhile, the transmission beam of the terminal may be dynamically changed according to a motion of obstacles positioned between the base station and the terminal or a motion of the terminal. In this case, the configuration of the power control parameter based on the RRC signaling mentioned above may not be preferable. Therefore, it is possible to perform more rapid adjustment of the transmission power through L1 signaling (configuration of the power control parameter values through the PDCCH). That is, one or all of and values may be transmitted to the terminal through the PDCCH. However in this case, since an amount of parameters transmitted through the PDCCH is increased, signaling overhead may largely increase. To prevent this, a combination of the RRC signaling and the signaling through the PDCCH may be considered. For example, a set of parameters in FIGS. 1F and 1G may be configured by the RRC signaling, and which value in the set will be used may be configured through the PDCCH.

For example, the parameters in FIGS. 1F and 1G are transmitted to the terminal through the RRC signaling, and which parameter in FIG. 1F (wide beam) and FIG. 1G (narrow beam) will be used at a specific moment (for example, specific subframe or specific slot) may be indicated by 1-bit of the DCI. That is, in the case of "1", a narrow beam may be used, and in the case of "0", a wide beam may be used. If three or more beam widths are used, indication may be made by using 2-bits or more of the DCI.

As shown in the PUSCH transmission power control of Equation 1-a and the PUCCH transmission power control of Equation 1-e, the closed-loop transmission power control may be performed in the beamforming system as well. That is, as illustrated in FIGS. 1F and 1G, the and values may be configured though the RRC signaling, and fine adjustment of transmission power for each beam may be dynamically made through the PDCCH. More specifically, the transmission power control of the uplink data channel may be represented by Equation 1-k below.

$$P_{xPUSCH}(i) = \min\left\{ \begin{array}{l} P_{CMAX}(i), \\ 10\log_{10}(M_{PUSCH}(i)) + P_{0\_PUSCH}(j) + \alpha(j) \cdot PL + \Delta_{TF}(i) + f(i) + \Delta_{Beam}(f) \end{array} \right\} \text{ [dBm]} \quad \text{Equation 1-k}$$

At this time, $P_{0\_PUSCH}(j)$ and $\alpha(j)$ may vary depending on a beam index "j". Further, $\Delta_{Beam}(j)$ means a step size of power that may vary depending on the beam index "j" dynamically configured through the PDCCH. As another example, f(i) may include a power step size varying depending on the beam index, instead of $\Delta_{Beam}(j)$. That is, when performing the accumulation-based transmission power control, $f(i)=f(i-1)+\delta_{PUSCH}(i-K_{PUSCH})+\Delta_{Beam}$, and when performing the absolute value-based transmission power control, $f(i)=\delta_{PUSCH}(i-K_{PUSCH})+\Delta_{Beam}$. $\Delta_{Beam}$ may be dynamically configured through the PDCCH. Meanwhile, a transmission power value in consideration of a beam width may be reflected in the value configured through the PDCCH, as shown in Table 1-b and Table 1-c.

The transmission power control of the uplink control channel may be represented by Equation 1-l below.

$$P_{xPUCCH}(i) = \min\{P_{CMAX}(i), P_{0_{PUCCH}}(j) + \beta(j) \cdot PL + h$$
$$(n_{CQI}, n_{HARQ}, n_{SR}) + \Delta_{F_{PUCCH}}(F) + \Delta_{TxD}(F) + g(i) +$$
$$\Delta_{Beam}(j)\} \text{ [dBm]} \quad \text{Equation 1-l}$$

At this time, $P_{0\_PUCCH}(j)$ and $\beta(j)$ may vary depending on a beam index "j". Further, $\Delta_{Beam}(j)$ means a step size of power that may vary depending on the beam index "j" dynamically configured through the PDCCH. As another example, g(i) may include a power step size varying depending on the beam index, instead of $\Delta_{Beam}(j)$. That is, when performing the accumulation-based transmission power control, $g(i)=g(i-1)+\delta_{PUSCH}(i-K_{PUSCH})+\Delta_{Beam}$, and when performing the absolute value-based transmission power control, $g(i)=\delta_{PUSCH}(i-K_{PUSCH})+\Delta_{Beam}$. $\Delta_{Beam}$ may be dynamically configured through the PDCCH. Meanwhile, a transmission power value in consideration of a beam width may be reflected in the value configured through the PDCCH, as shown in Table 1-b and Table 1-c.

Meanwhile, $\Delta_{Beam}(j)$ and $\Delta_{Beam}$ in Equation 1-k and Equation 1-l may be the same as each other or different from each other.

A waveform used for a data and control channel transmitted by the terminal in uplink may vary according to an environment of the terminal or an operation of the base station. For example, the base station-A may use orthogonal frequency division multiple access (OFDM) as the uplink waveform. Further, the base station-B may use single carrier-frequency division multiple access (SC-FDMA) as the uplink waveform. Further, the base station-C may use both of the OFDMA and the SC-FDMA Information on which waveform among the uplink waveforms may be used may be cell-specifically transmitted by the base station to the terminal through the MIB or SIB. For example, agreement may be made between the base station and the terminal so that if "00" is transmitted through the MIB or SIB, the OFDMA is used, if "01" is transmitted, the SC-FDMA is used, and if "10" is transmitted, both of the OFDMA and SC-FDMA are used.

According to the waveform used in uplink, $P_{CMAX}$ value in Equation 1-k and Equation 1-l may be differently operated. For example, $P_{CMAX}$ may be determined by the terminal as in Equation 1-m below.

$$P_{CMAX\_L} \leq P_{CMAX} \leq P_{CMAX\_H} \, P_{CMAX\_L} = \min\{P_{EMAX} -$$
$$\Delta T_C, P_{PowerClass} - \max\{MPR+AMPR+\Delta T_{IB}+\Delta T_C,$$
$$PMPR\}\} P_{CMAX\_H} = \min\{P_{EMAX}, P_{PowerClass}\} \quad \text{Equation 1-m}$$

At this time, $P_{CMAX\_L}$ means a small value of $P_{CMAX}$, and $P_{CMAX\_H}$ means a large value of $P_{CMAX}$, $P_{CMAX\_L}$ and $P_{CMAX\_H}$ may be determined in the terminal by parameters specified in Equation 1-m above, and characteristics of the uplink waveform used by the terminal may be reflected by using one or two or more of the parameters.

For example, $P_{EMAX}$ is a maximum Tx power level that may be used by the terminal for UL transmission in a specific cell, and is a value informed by the base station through UE-specific RRC signaling. The base station may reflect the uplink waveform used by the terminal when configuring PENAX. For example, when using the OFDMA, {−A1 to Z1} dB may be configured, and when using the SC-FDMA, {−A2 to Z2} dB may be configured.

As another example, $P_{PowerClass}$ is a value corresponding to a power class of the terminal, and may correspond to capability of the terminal. $P_{PowerClass}$ may be differently applied depending on the waveform that may be used by the terminal in a specific cell. For example, it is assumed that $P_{PowerClass}$ of the terminal-A is 23 dBm based on the SC-FDMA. When the OFDMA is used, implicit agreement between the base station and the terminal may be made so that the terminal is operated at 23 dBm x dB. In x dB, the x value may be configured by the base station through the RRC signaling, or a fixed value may be used as the x value.

As another example, maximum power reduction (MPR) may reflect an amount of frequency resources (the number of resource blocks (RBs)) allocated to the terminal for uplink data and control channel transmission, and modulation. At this time, the MPR value may be configured to be different depending on the uplink waveform. As the MPR value, a value pre-agreed between the base station and the terminal may be used.

As another example, additional maximum power reduction (AMPR) is a value according to an adjacent channel leakage ratio (ACLR) and spectrum emission requirement. These values may be configured to be different depending on the waveform used by the terminal.

As another example, $\Delta T_{1B}$ is a tolerance value according to a band combination in which communication is performed, and these values may be configured to be different depending on the waveform used by the terminal.

As another example, $\Delta T_C$ is a value varying according to an aggregated channel bandwidth and a guard-band, and these values may be configured to be different depending on the waveform used by the terminal.

As another example, power amplifier-maximum power reduction (PMPR) is a parameter for observing regulations in the multi-RAT environment, and these values may be configured to be different depending on the waveform used by the terminal As another example, different parameter values may be configured by the base station through the common RRC signaling, dedicated RRC signaling, or DCI depending on the waveform used in uplink. As an example, if the base station instructs to use DFT-S-OFDM for uplink transmission of a specific terminal, the terminal may perform transmission by adding power to a transmission power value calculated by the terminal itself through Equation 1-a or Equation 1-e as much as Δ1 [dB]. At this time, the instruction to use the DFT-S-OFDM and the value of Δ1 [dB] may be configured by the base station through the common RRC signaling, dedicated RRC signaling, or DCI as mentioned above. As another example, if the base station instructs to use CP-OFDM for uplink transmission of a specific terminal, the terminal may perform transmission by reducing power from the transmission power value calculated by the terminal itself through Equation 1-a or Equation 1-e as much as Δ2 [dB]. At this time, the instruction to use the CP-OFDM and the value of Δ2 [dB] may be configured by the base station through the common RRC signaling, dedicated RRC signaling, or DCI as mentioned above.

Figure 1J:
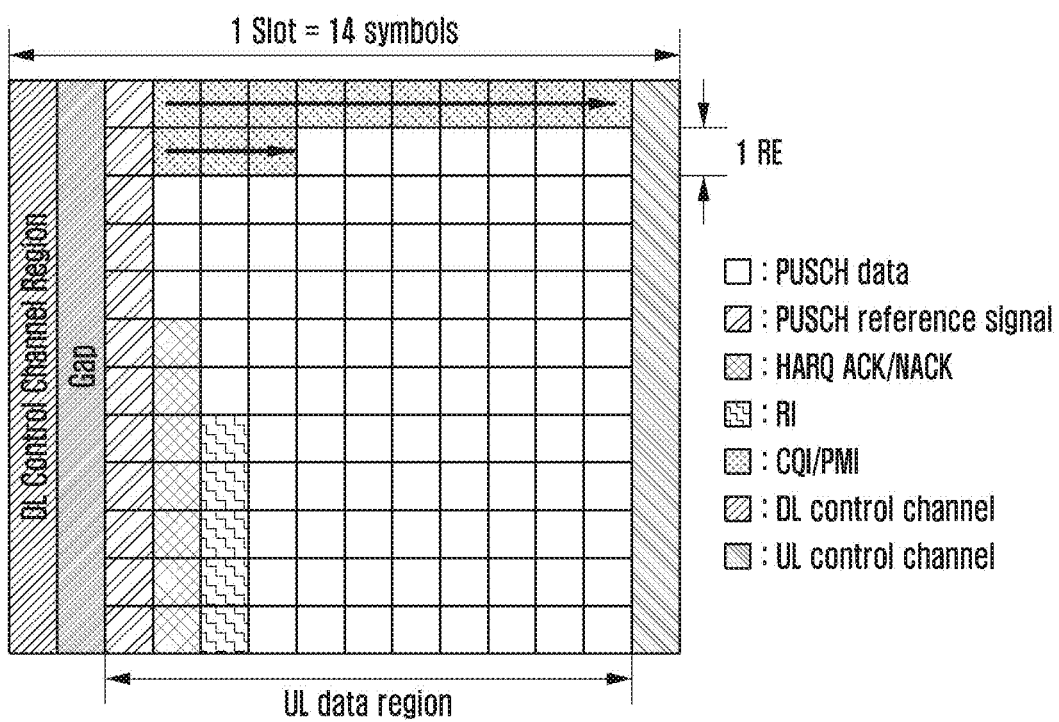
FIG. 1J is a diagram illustrating an example of a subframe for transmitting uplink data and control information according to an embodiment of the present disclosure.

FIG. 1J is a diagram illustrating an example of a subframe for transmitting uplink data and control information according to an embodiment of the present disclosure.

In this example, it is assumed that one slot is configured of 14 symbols (OPDM symbol or SC-FDM symbol), but a slot configured of the smaller number of symbols (slot configured of 7 symbols) or a slot configured of the larger number of symbols (slot configured of 28 symbols) is possible. In FIG. 1J, a first symbol indicates a downlink control channel transmitted by the base station to the terminal in the cell (e.g., physical downlink control channel (PDCCH) of LTE). A case in which only one symbol (that is, first symbol) is used for downlink control channel transmission is illustrated, but two or more symbols may also be used for the downlink control channel transmission. The base station transmits the downlink control channel to the terminal (or the terminal receives the downlink channel from the base station), and then receives an uplink control channel from the terminal (or the terminal transmits the uplink channel to the base station). For the transmission and reception of the base station or the reception and transmission of the terminal, a gap for switching TX/RX of RF is required (second symbol). After the gap, a demodulation reference signal (DMRS) for estimating by the base station the uplink channel of the terminal is required (third symbol). In this example, a case in which an RS occupies the entire symbol is illustrated, but there may be various patterns for the DMRS (for example, one DMRS may exist for every four REs, and two DMRSs may continuously exist for every six REs on a frequency axis). Further, in this example, a case in which the DMRS exists only in the third symbol, but the DMRS may also exist in two or more symbols in one slot. When the DMRS is positioned only in the third symbol, data decoding becomes possible immediately after the estimation of the uplink channel of the terminal ends at the reception end of the base station, thus a signal processing time of the reception end may be decreased.

Meanwhile, transmission may be made by including data and control information reported to the base station (uplink control information (UCI) of the terminal in an uplink (UL) data region indicated in FIG. 1J. At this time, the UCI may include hybrid ARQ (HARQ) ACK/NACK information, a rank indicator (RI), a channel quality indicator (CQI), a pre-coder matrix indicator (PMI), and beam-related information (beam measurement information: beam index and a reception signal of a beam corresponding to each beam index are indicated as BMI). When the UCI information is mapped to data information, it may be mapped as in FIG. 1H. That is, the HARQ ACK/NACK information may be mapped to a symbol adjacent to the DMRS. The mapping may improve channel estimation performs of the HARQ information, thus error probability may be decreased at the time of decoding the HARQ ACK/NACK information at the reception end. Meanwhile, the RI is rank information used for MIMO operation, and since an amount of CQI/PMI information may vary according thereto, the RI needs to be decoded prior to the CQI/PMI information. Therefore, the RI may be positioned next to the symbol in which the HARQ ACK/NACK information is transmitted. Meanwhile, the information amount of the CQI/PMI/BMI is larger than the HARQ ACK/NACK and RI, and may be mapped in a time-first manner as indicated by an arrow to obtain time diversity. Meanwhile, the last symbol of the slot may be used for uplink control channel (e.g., physical uplink control channel (PUCCH) of LTE).

Figure 1K:
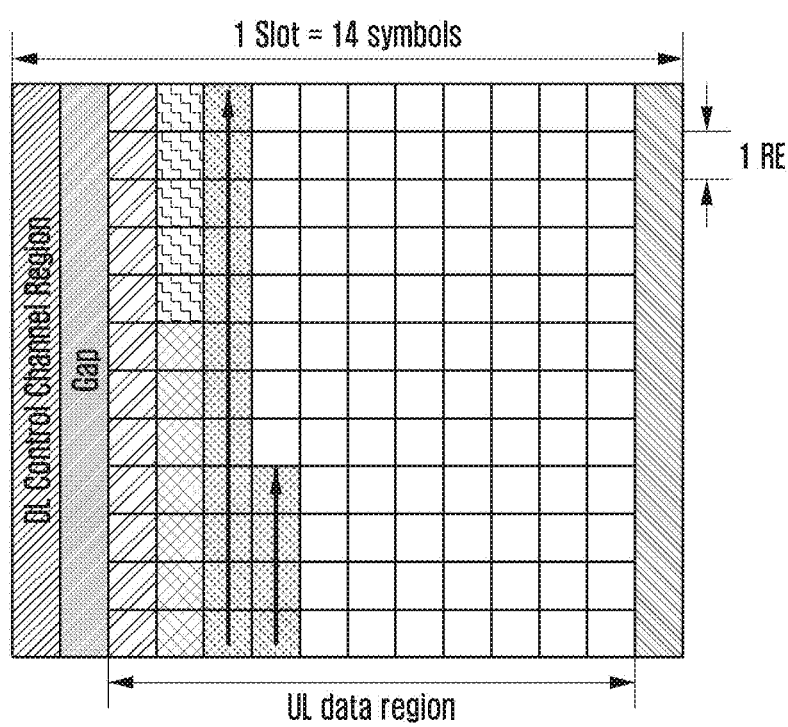
FIG. 1K is a diagram illustrating another example of a subframe for transmitting uplink data and control information according to an embodiment of the present disclosure.

FIG. 1K is a diagram illustrating another example of a subframe for transmitting uplink data and control information according to an embodiment of the present disclosure. A difference between FIGS. 1K and 1J is that in FIG. 1K, the RI information is positioned after the mapping of the HARQ ACK/NACK information is completed, and the mapping of the CQI/PMI/BMI may be made in a frequency-first manner as indicated by an arrow, rather than the time-first manner, after the mapping of the RI information is completed. In FIG. 1K, it may seem that the HARQ ACK/NACK information and the RI information are mapped to only the same symbol, but the HARQ ACK/NACK information and the RI information may be mapped to different symbols as in FIG. 1J. This is for the CQI/PMI/BMI information with a relatively large amount of data to additionally obtain frequency diversity gain.

Meanwhile, if a speed of the terminal is fast, a change of a channel according to time is increased due to the Doppler effect. In this case, if the channel is estimated only using a front-loaded DMRS as illustrated in FIGS. 1J and 1K, deterioration of channel estimation performance may occur. Therefore, the base station may configure an addition DMRS in addition to the front-loaded DMRS. When the additional DMRS is configured as such, a rule for mapping of UCI for transmitting the UCI by multiplexing with data is required. At this time, the rule for mapping of UCI may be the same as FIGS. 1J and 1K regardless of presence and absence of the additional DMRS as illustrated in FIGS. 1LA and 1MA. An advantageous of the method is that since the same mapping rule may be applied regardless of presence and absence of the additional DMRS, implementation of the base station and the terminal may be easily made. However, if an amount of UCI is increased, and a change of the time axis of the channel is large, channel estimation performance of the UCI mapped while being far away from the front-loaded DMRS may deteriorate. Further, if frequency hopping of the PUSCH (UL data region) is supported in order to maximize the frequency diversity gain, since the UCI is mapped to only the vicinity of the first DMRS (front-loaded DMRS) (that is, the UCI is not mapped to the vicinity of the second DMRS), the frequency diversity gain may not be sufficiently obtained. Accordingly, as illustrated in FIGS. 1LB and 1MB a mapping rule for making the UCI to be appropriately distributed based on two DMRSs may be required when an additional DMRS is configured from the base station. Through such a mapping rule, the UCIs are appropriately distributed based on two DMRSs, thereby improving channel estimation performing of the UCIs. Further, when applying the frequency hopping, the frequency diversity gain may be maximized.

Figure 1N:
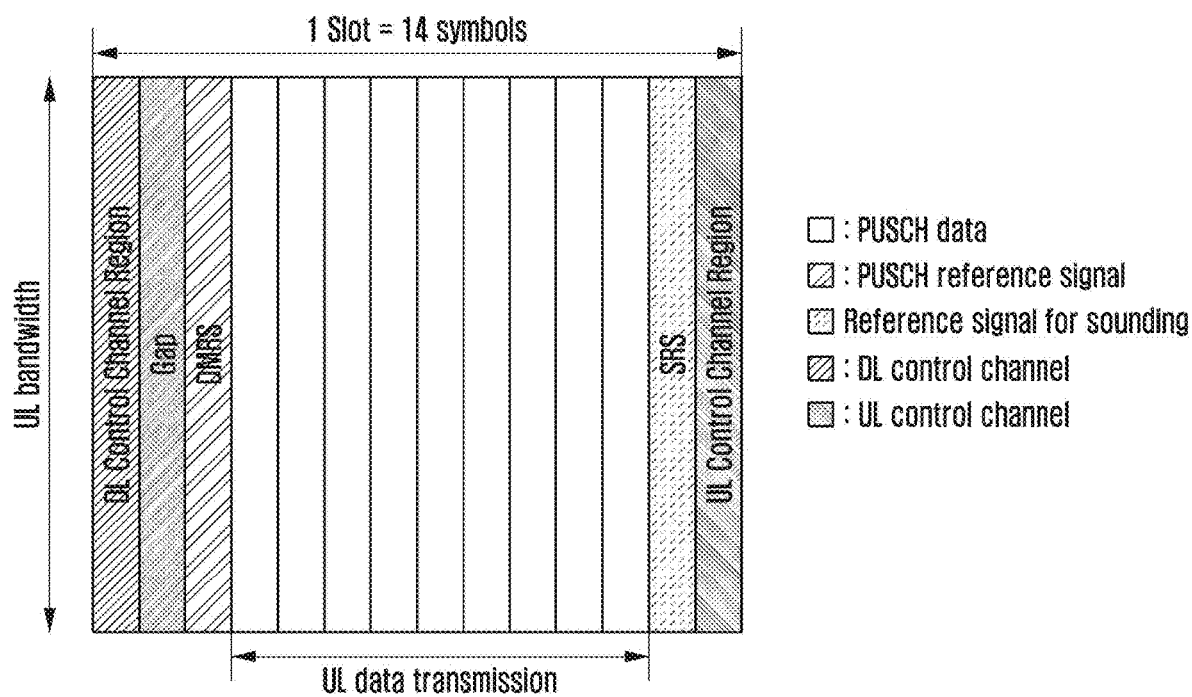
FIG. 1N is a diagram illustrating an example of transmission of a reference signal for channel sounding according to an embodiment of the present disclosure.
Figure 10:
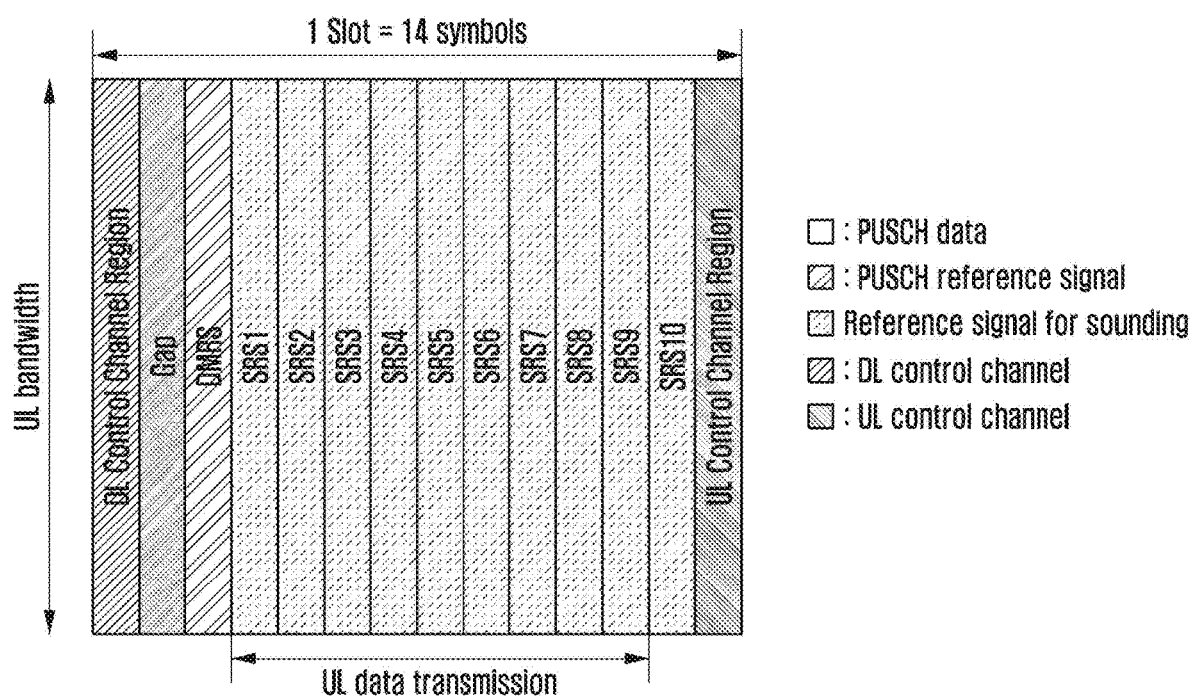

FIG. 1N is a diagram illustrating an example of transmission of a reference signal (SRS) for channel sounding according to an embodiment of the present disclosure. The terminal may periodically or aperiodically perform SRS transmission. The base station receiving the SRS may acquire uplink channel and timing information of the terminal. In the TDD system, the operation may be made under an assumption that channel information acquired through the SRS received by the base station from the terminal through uplink is similar to downlink channel information (UL/DL reciprocity). At this time, the SRS may be transmitted by being time division multiplexed (TDM) or frequency division multiplexed (FDM) with the uplink control channel. This example is a case in which the SRS is transmitted by being time division multiplexed, and a case in which the SRS and the uplink control channel occupy the entire UL bandwidth is illustrated, but the SRS and the uplink control channel may occupy part of the UL bandwidth, and the bandwidths thereof may be different. For example, the transmission bandwidth of the SRS may use A tones, and the uplink control channel may use B tones. The SRS transmission may be instructed through the downlink control channel or RRC signaling, and once the instruction is transmitted, the SRS may be periodically transmitted for a predetermined period or transmitted only once. Further, transmission resources of the SRS in the system may be one or two symbols on the time axis in one slot (or subframe or multi-slot). That is, the terminal transmits the SRS once in one or two symbols allocated in a slot for the SRS transmission by the system.

FIG. 1O is a diagram illustrating another example of transmission of a reference signal (SRS) for channel sounding according to an embodiment of the present disclosure. A difference from the FIG. 1N is that the terminal transmits the SRS two or more times in two or more symbols, rather than transmitting once in one symbol. For example, in FIG. 1O, one terminal transmits the SRS 10 times through 10 symbols. At this time, the SRSs transmitted through each symbol may be transmitted in different beam directions. Further, in FIG. 1O, a case in which a third symbol is to be used for DMRS transmission is illustrated, but the third symbol may be used for SRS symbol transmission in place of DMRS transmission. Similarly, a case in which the last symbol is used for uplink control channel, but it may also be replaced with the SRS symbol transmission.

The base station may perform indication for signal transmission or multiple transmission of the SRS. The indication may be made through L1-signaling (e.g., DCI of PDCCH). At this time, information on in how many symbols the SRS will be transmitted may be included in the DCI. Meanwhile, the slot/subframe/mini-slot in which the multiple transmission of the SRS is possible may be set through the signaling together with the information on in how many symbols the SRS will be transmitted. The terminal receiving this transmits the corresponding number of SRSs in the corresponding slot/subframe/mini-slot.

As another example, the RRC signaling and the L1 signaling may be combined. For example, the slot/subframe/mini-slot in which the multiple transmission of the SRS is possible may be configured through the RRC signaling, and in how many symbols the SRS will be transmitted may be determined using a fixed value (for example, fixing the fixed number in standard). The base station may indicate a slot/subframe/mini-slot in which actual transmission is made among slots/subframes/mini-slots configured through the RRC through 1-bit of the DCI. As another example of the combination of the RRC signaling and the L1 signaling, a slot/subframe/mini-slot in which multiple transmission of the SRS is configured through the RRC signaling, and in how many symbols the SRS will be transmitted in the corresponding slot/subframe/mini-slot may be indicated by the base station through the DCI.

Figure 1P:
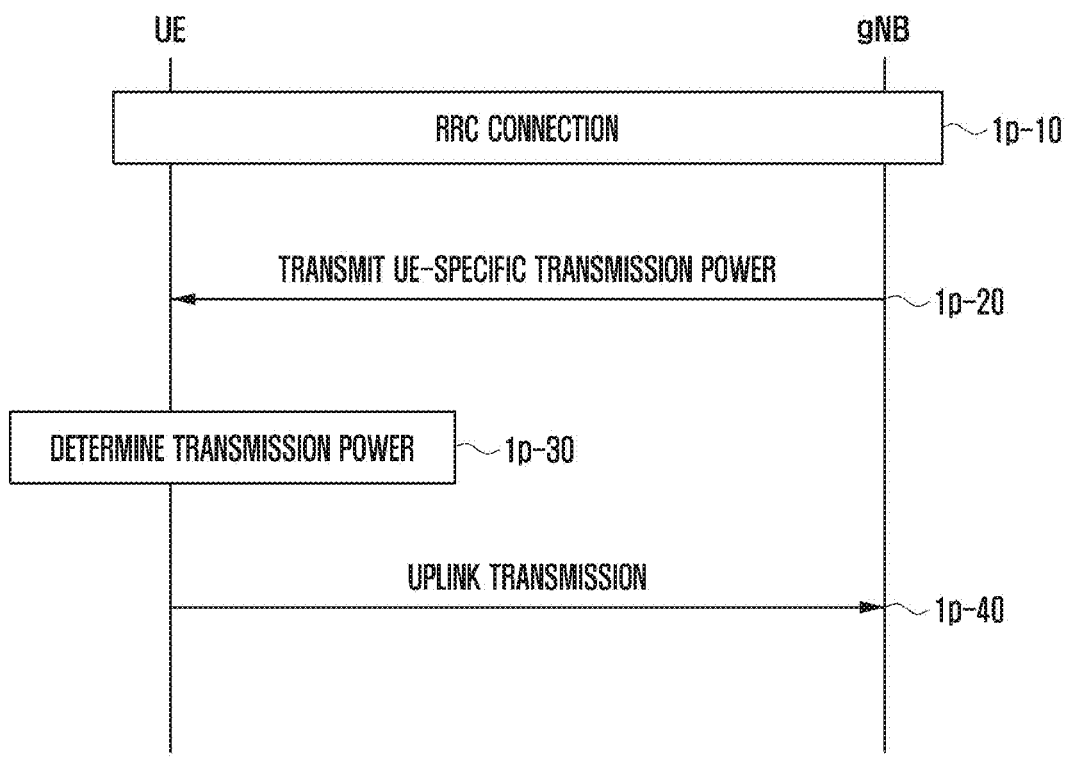
FIG. 1P is a diagram illustrating an operation of a terminal and a base station according to an embodiment of the present disclosure

FIG. 1P is a diagram illustrating an operation of a terminal and a base station according to an embodiment of the present disclosure.

Referring to FIG. 1P, in operation 1p-10, the terminal and the base station may be in an RRC connection state. The terminal may perform operations 1a-10, 1a-20, and 1a-30 in FIG. 1A, and be in an RRC connection state. The terminal and the base station may perform the operation described with reference to FIGS. 1B, 1C, 1D, and 1E in the random access process.

In operation 1p-20, the terminal may receive UE-specific transmission power parameter from the base station. The terminal may receive the UE-specific transmission power parameter through the RRC signaling, MAC control element/MAC message, or DCI, and may also receive the UE-specific transmission power parameter according to a combination of at least two of the messages. For example, some information of the UE-specific transmission power parameter is received through the RRC signaling, and some information may be received through the DCI.

The UE-specific transmission power parameter may include the transmission power parameter described in operation 1a-40 in FIG. 1A. Further, the UE-specific transmission power parameter may include the transmission power parameter described in FIGS. 1F and 1G. Further, the UE-specific transmission power parameter may include the transmission power parameter described in operations 1h-10 and 1h-20 in FIG. 1H, and the transmission power parameter described in operations 1i-20 and 1i-30 in FIG. 1I.

For example, as mentioned in FIGS. 1F and 1G, a combination of the RRC signaling and the signaling through the PDCCH may be considered. For example, a set of parameters in FIGS. 1F and 1G may be configured by the RRC signaling, and which value in the set will be used may be configured through the PDCCH. Further, the base station may signal a P0 value as a reference through RRC and then signal an offset value with an actually used beam from the reference through RRC or DCI.

For example, the transmission power parameter may include a parameter (information on a beam) for path-loss for each beam as mentioned in FIG. 1H. In determining the uplink transmission power, path-loss may be considered, and in the hybrid beamforming system, there may be a number of beams according to combinations of the transmission beam of the base station and the reception beam of the terminal. Therefore, path-loss calculation for each beam is required. The base station may indicate for how many beams the terminal needs to perform path-loss measurement and store through the RRC signaling, MAC control element/MAC message, or DCI. The base station may provide information on a beam which may indicate a beam for which the path-loss measurement to be performed. For example, a beam index or beam index set may be indicated. The terminal may measure path-loss for the indicated beam, and determine transmission power based on the measured path-loss.

For example, the transmission power parameter may include information on subcarrier spacing (SCS) for interpreting a M value as mentioned in FIG. 1I.

The transmission power parameter is not limited to the above configuration but may include parameters mentioned in respective embodiments of the present disclosure.

In operation 1p-30, the terminal may calculate transmission power based on a UE-specific transmission power parameter. The terminal may determine transmission power for uplink data channel transmission and/or transmission power for uplink control channel transmission. For example, the terminal may also calculate transmission power by combining transmission power parameters received through the RRC signaling and the PDCCH. For example, the terminal may determine transmission power in consideration of path-loss for each beam. For example, the terminal may interpret the M value in consideration of information on the SCS, and maintain PSD by interpreting the M value. The terminal is not limited to the above configuration but may determine transmission power in consideration of various parameters mentioned in respective embodiments of the present disclosure.

In operation 1p-40, the terminal may transmit uplink. Transmitting uplink may represent transmitting at least one of an uplink channel (data channel and control channel), an uplink signal, uplink data, and uplink information.

Detailed operations of the terminal and the base station are not limited to FIG. 1P, and a detailed operation corresponding to each parameter in FIG. 1P refers to the operations of the terminal and the base station described with reference to FIGS. 1A to 1O.

Figure 1Q:
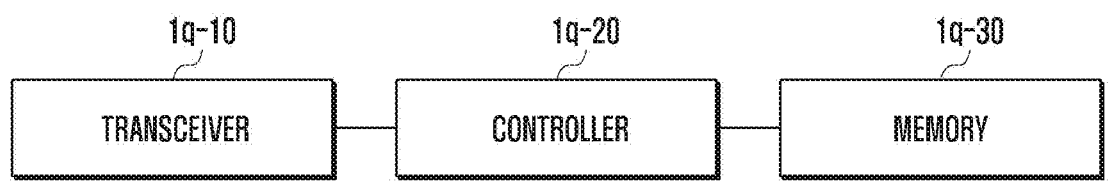
FIG. 1Q is a diagram illustrating a configuration of a terminal according to an embodiment of the present disclosure.

FIG. 1Q is a diagram illustrating a configuration of a terminal according to an embodiment of the present disclosure.

Referring to FIG. 1Q, the terminal may include a transceiver 1q-10, a controller 1q-20, and a memory 1q-30. According to the present disclosure, the controller 1q-20 may be defined as a circuit or application-specific integrated circuit or at least one processor.

The transceiver 1q-10 may transmit and receive a signal to and from other network entity. The transceiver 1q-10, for example, may receive system information from the base station, and may receive a synchronization signal or a reference signal.

The controller 1q-20 may control a general operation of the terminal according to an embodiment suggested in the present disclosure. For example, the controller 1q-20 may control the operation of the terminal described with reference to FIGS. 1A to 1P of the present disclosure.

According to an embodiment of the present disclosure, the controller 1q-20 may control to receive a terminal-specific transmission power parameter from the base station, determine transmission power of the terminal based on the terminal-specific transmission power parameter and a subcarrier spacing allocated to the terminal, and transmit an uplink signal based on the determined transmission power. Further, the controller 1q-20 may control to apply an M value used in determining the transmission power based on the subcarrier spacing. The terminal-specific transmission power parameter includes information on a beam, and the transmission power may be determined based on path-loss measured based on the information on the beam. Further, the controller 1q-20 may control to receive a radio resource control (RRC) message including a set of transmission power parameters, and receive a physical downlink control channel (PDCCH) including information indicating a transmission power parameter used in determining the transmission power among the set of the transmission power parameters.

The memory 1q-30 may store at least one of information transmitted and received through the transceiver 1q-10 and information generated through the controller 1q-20.

Figure 1R:
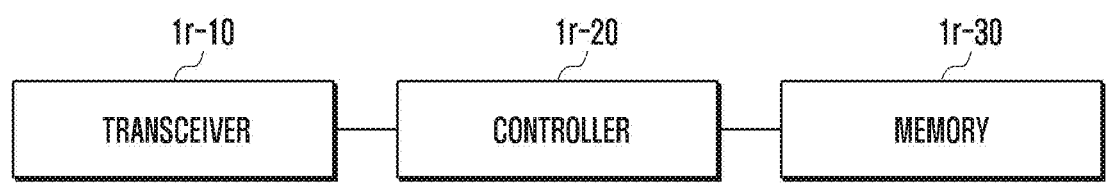
FIG. 1R is a diagram illustrating a configuration of a base station according to an embodiment of the present disclosure.

FIG. 1R is a view illustrating a configuration of a base station according to an embodiment of the present disclosure.

In FIG. 1R, a configuration of the base station may also be used as a structure of a TRP. Further, the TRP may also be configured as a part of the configuration of the base station.

Referring to FIG. 1R, the base station may include a transceiver 1r-10, a controller 1r-20, and a memory 1r-30. According to the present disclosure, the controller 1r-20 may be defined as a circuit or application-specific integrated circuit or at least one processor.

The transceiver 1r-10 may transmit and receive a signal to and from other network entity. The transceiver 1r-10, for example, may transmit system information to the terminal, and may transmit a synchronization signal or a reference signal.

The controller 1r-20 may control a general operation of the base station according to an embodiment suggested in the present disclosure. For example, the controller 1r-20 may control the operation of the base station described with reference to FIGS. 1A to 1O of the present disclosure.

According to an embodiment of the present disclosure, the controller 1r-20 may control to transmit a message including subcarrier spacing configuration information to the terminal, transmit a terminal-specific transmission power parameter to the terminal, and receive an uplink signal from the terminal. The transmission power of the uplink signal may be determined based on the terminal-specific transmission power parameter and the subcarrier spacing configuration information. Further, an M value used in determining the transmission power may be applied based on the subcarrier spacing configuration information. Further, the terminal-specific transmission power parameter includes information on a beam, and the transmission power may be determined based on path-loss measured based on the information on the beam. Further, the controller 1r-20 may control to transmit a radio resource control (RRC) message including a set of transmission power parameters, and transmit a physical downlink control channel (PDCCH) including information indicating a transmission power parameter used in determining the transmission power among the set of the transmission power parameters.

The memory 1r-30 may store at least one of information transmitted and received through the transceiver 1r-10 and information generated through the controller 1r-20.

Second Embodiment

A DL common control signal includes synchronization signals (sync signals), a channel (or channels) transmitting essential system information for at least performing random access (i.e., PBCH), a signal used for RRM measurement, and a signal used for L3 mobility. As the RRM measurement, beam measurement may be included. The DL common control signal needs to be broadcasted so that users in the cell or neighboring cells may hear.

Therefore, in the multi-beam-based system, needs to be transmitted through multi-beam sweeping. The sync signals may include a primary synchronization signal (PSS), a secondary synchronization signal (SSS), and a tertiary synchronization signal (TSS). The PSS/SSS may be used for coarse timing frequency synchronization, and may also be used for detecting a cell-ID. Alternatively, the PSS/SSS may also be used for selecting a coarse TRP transmission beam. In the case of a system transmitting signals beam-swept by using a continuous OFDM symbol, a boundary of a subframe (SF) or slot may not be recognized by synchronization using the PSS and SSS. Thus, the system may be designed so as to recognize the boundary of SF/slot using an SSS sequence and PBCH information. Alternatively, for the corresponding function, new synchronization signal such as a tertiary synchronization signal (TSS) may be introduced. The TSS uses different sequences for each OFDM symbol such that from which OFDM symbol a beam detected by the terminal is transmitted may be known, thereby being used to determine the boundary of SF/slot.

In some cases, the DL common control signals need not be transmitted frequently, and the system may be designed so that a transmission period of the DL common control signals is variably changed. In the case in which the transmission is made while variably changing the transmission period of the DL common control signal (i.e., configurable DL common control signal), the following effects may be expected:

1. Reducing always-on transmission
2. Minimizing overhead
3. Minimizing network energy consumption As a form of the configurable DL common control signal, the following two scenarios are possible.

Alternative scenario 1. Synchronization is transmitted at a minimum fixed period (agreed period).

Alternative scenario 2. A network for each cell autonomically determines a period of the synchronization.

A detailed operation in each Alternative scenario is as follows.

Operation in Alternative Scenario 1

Figure 2A:
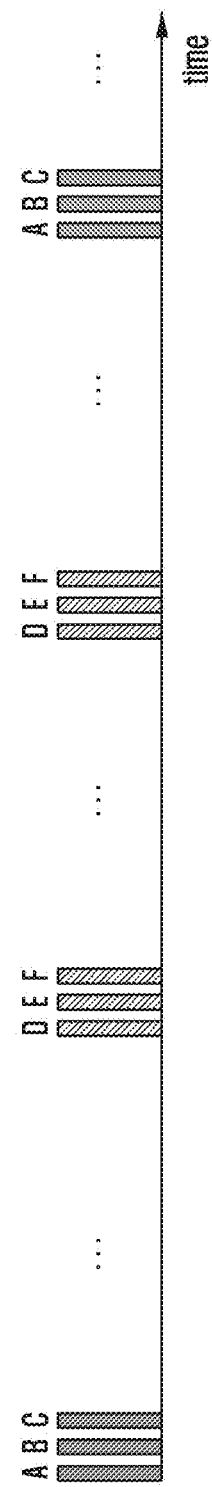
FIG. 2A is a diagram illustrating an example of Alternative scenario 1 according to an embodiment of the present disclosure.

FIG. 2A is a diagram illustrating an example of Alternative scenario 1. A to F in FIG. 2A mean different physical channels, and each channel may be used for the following purpose.

A: Synchronization for non-connected user
B: PBCH 1
C: Measurement reference signal used by at least non-connected UE for mobility and measurement. The corresponding signal may also be used by connected UE in some cases.
D: Synchronization for connected user
E: PBCH 2
F: Measurement reference signal used by at least connected UE for mobility and measurement.

In the embodiment of the present disclosure, a non-connected UE means a terminal that is in an idle state or attempts to newly access.

The physical channels A/B/C may be or may not be included in one SS block defined in NR. Further, periods of the physical channels A/B/C may be the same as or different from each other. For example, the physical channels A and B are included in one SS block, and may have the same period. However, the physical channel C may have a period different from that of the physical channels A/B in the system. Similarly, the physical channels D/E/F may be or may not be included in one SS block defined in NR. Further, periods of the physical channels D/E/F may be the same as or different from each other.

A detailed TRP/UE operation in Alternative scenario 1 is as follows.

Step 1. A non-connected UE reads A and performs cell-ID detection through a PSS/SSS.

Step 2. If a beam-swept PSS/SSS signal is transmitted to a continuous OFDM symbol, detection of a boundary of a SF or slot is performed through an SSS, PBCH, or TSS.

Step 3. B is decoded based on cell-ID information detected in Step 1.

B may be a single physical channel or multiple physical channels, and basically serves to transmit essential system information for at least performing initial access and random access.

Further, B is self-decodable.

B may have at least the following information: i) configuration of C if needed, ii) system bandwidth (BW), iii) system frame number (SFN), iv) information for performing, by the terminal, random access (e.g., random access resource configuration).

Step 4. If configuration information of C is transmitted through B, the UE receives C.

C may be used for i) initial cell selection/cell re-selection, and ii) beam-ID acquisition.

If a sync signal (i.e., A) is used in the process of initial cell selection and cell re-selection of the non-connected UE, C may not be transmitted.

If C is a designated signal determined according to cell-ID, a non-connected UE does not perform Step 3, and cell-selection and re-selection may be performed through C.

Step 5. Random access is performed. The UE is changed to be in an RRC connected state.

Step 6. The UE receives D. Period information of D may be transmitted to the UE in Steps 1 to 5.

Sequences of PSS/SSS of A and D may not be the same as each other. For example, sequence lengths or sequence values themselves may be different from each other.

Further, even when A includes an SF/slot boundary detection function (for example, through the SSS sequence, PBCH contents, TSS, or the like), D may not need to include the SF/slot boundary detection function. For example, if A includes a TSS, D need not include a TSS.

Step 6. The UE decodes E.

Frequency/time axis mapping (e.g., FDM) of D and E may be the same as or different from frequency/time axis mapping of A and B.

E and B may include or may not include the same contents. For example, if F and C are signals having the same form (e.g., the same sequence and the same time/frequency mapping), configuration for F need not be made in E. That is, after configuring C in B, F which is a mobility/measurement signal for the connected UE may be transmitted at the same period as D. At this time, a frequency/time mapping relationship of F and D may be the same as a frequency/time mapping relationship of C and A. Alternatively, if D/E is not separately transmitted, only F may be transmitted.

Alternatively, E may include configuration for F.

Alternatively, E may not be transmitted.

Step 7. If F is transmitted, F may be received.

F may be the same as or may not be the same as C.

F may be used for i) handover and ii) L1/L2 mobility.

If F is not transmitted, an HO operation may be performed based on a sync signal (i.e., A and/or D) or measurement through C.

According to another embodiment, C may be a pre-designated signal for each cell-ID, and in this case, the non-connected UE may not separately receive PBCH for cell-selection or re-selection (Step 3 is unnecessary). Alternatively, according to another embodiment, if C does not exist, and the non-connected UE performs cell-selection and re-selection through the sync signal (i.e., A), Steps 3 and 4 are unnecessary.

The sync signal A is transmitted at a predetermined period, thus may be received by both of the non-connected UE and the connected UE of the corresponding cell, and a period of the sync signal D may be known only when in the connected state, therefore, the non-connected UEs basically may not receive the corresponding information.

In order to receive D in Step 5, there is a need to know a period of D. The corresponding information may be transmitted to the UE by the following method:

Alternative 1. Transmitting through channel B

Alternative 2. Transmitting through Msg4 in random access process

Alternative 3. After random access process, transmitting through UE-specific RRC signaling Basically, information in PBCH may not be changed for a predetermined time (for example, the same PBCH is transmitted for 40 ms in the case of LTE), thus the non-connected UE may combine periodically transmitted multiple B channels at the time of receiving and decoding the PBCH information. This enables more robust PBCH decoding.

B and E are the same as each other, the connected UE may more rapidly decode the same system information as compared to the non-connected UE.

If B is configured of multiple channels, and information included in B is part of information included in B, E may have the same form (e.g., code rate, frequency/time axis mapping) as one of the channels configuring B.

Contents and channel forms included in B and E may not be the same as each other, and periods during which information included in B and E is maintained may also be different from each other (for example, information in PBCH 1 is maintained to be the same for 400 ms, and information in PBCH 2 is maintained to be the same for 40 ms.)

Forms of C and F may be the same as each other (for example, the same sequence and the same time/frequency mapping), and at this time, separate configuration for F may not be performed in E. This is because F may be transmitted based on information of C configured in B and period information of D. At this time, a frequency/time mapping relationship of A and C may be the same as or different from a frequency/time mapping relationship of D and F.

Operation in Alternative Scenario 2

Figure 2B:
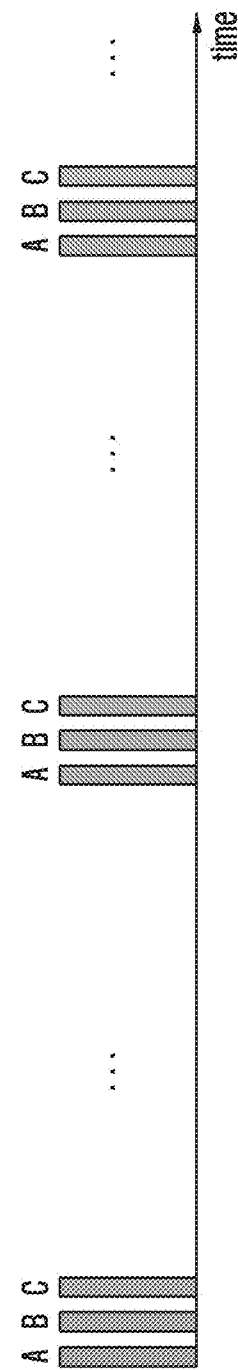
FIG. 2B is a diagram illustrating an example of Alternative scenario 2 according to an embodiment of the present disclosure.

FIG. 2B is a diagram illustrating an example of Alternative scenario 2. A to F in FIG. 2A mean different physical channels, and each channel may be used for the following purpose.

A: Sync signals
B: PBCH
C: Signal used by at least connected UE for mobility and measurement A detailed operation in Alternative scenario 2 is as follows.

Step 1. A non-connected UE reads A and performs cell-ID detection through a PSS/SSS.

Step 2. If a beam-swept PSS/SSS signal is transmitted to a continuous OFDM symbol, detection of a boundary of a SF or slot is performed through an SSS, PBCH, or TSS.

<Sync Detection>

In the case of Alternative scenario 2, a period of the synchronization is selected in the network, thus the terminal needs to perform blind detection. For example, if the network may select one of synchronization periods {5 ms, 20 ms, 40 ms}, the terminal may use 5 ms which is the smallest value for synchronization signal detection.

<PBCH Detection>

As described in Alternative scenario 1, robust B decoding may be performed by combining multiple Bs periodically transmitted as the same contents are transmitted for a predetermined time. At this time, in order for the UE to combine the signals, there is a need to know a definite period (e.g., 5 ms, 20 ms, 40 ms) at which B is transmitted. The period value may be transmitted through one or more of the synchronization signals (i.e., PSS, SSS, TSS). For example, different PSS or SSS sequences may be used according to the period value, and by doing so, the UE may recognize the period of B. Alternatively, the period may also be indicated through the TSS. The TSS uses different sequences according to each period value, and configures one sequence in a cyclic form for one period value, thereby presenting multiple OFDM symbols, such that an SF boundary may be distinguished. If periods of A and B are the same as each other, the UE may acquire the period of A and B through the above method.

Step 3. The UE decodes B based on the period information acquired in Step 2.

B may be a single physical channel or multiple physical channels, and basically serves to transmit essential system information for performing initial access and random access.

B is self-decodable.

B may have at least the following information: e.g., i) configuration of C (if needed), ii) system BW, iii) system frame number, and iv) information for performing RA.

Step 4. If C is configured through B, the UE receives C.

C may be used for i) cell selection/re-selection, and ii) beam-ID acquirement.

If C is not configured, the cell-selection and re-selection operation of the non-connected UE may be performed through the sync signal (i.e., A).

If C is a designated signal determined according to cell-ID, a non-connected UE does not perform Step 3, and cell-selection and re-selection may be performed through C.

Step 5. Random access is performed. The UE is changed to be in an RRC connected state.

Step 6. A and B are respectively received for synchronization and PBCH reception in the connected state.

Step 7. If C is transmitted, the UE (connected) receives C.

C may be used for i) handover, and ii) beam-ID update.

In the case in which the UE performs the cell-selection/re-selection based on A in the non-connected state, the UE is changed to be in the connected state, and then may receive configuration information on C included in B and use the received information for i) handover and ii) L1/L2 mobility.

If C is not transmitted, an HO operation may be performed based on measurement through a sync signal (i.e., A).

According to another embodiment of the operation of the non-connected UE, C may be a pre-designated signal for each cell-ID, and in this case, the non-connected UE may not separately receive PBCH for cell-selection or re-selection (Step 3 is unnecessary). Alternatively, according to another embodiment of the operation of the non-connected UE, if C does not exist, and the non-connected UE performs cell-selection and re-selection through the sync signal (i.e., A), Steps 3 and 4 are unnecessary.

According to another embodiment of the operation of the non-connected UE and the connected UE, the non-connected UE performs the cell-selection/re-selection through the sync signal (e.g., A) without performing Step 3, and then may be RRC connected through random access, and after connection establishment, B is received to find out configuration for C, and the configuration may be used for handover and L1/L2 mobility.

In the case of Alternative scenario 2, the period value information is transmitted through a sequence, thus the terminal continuously detect a sync sequence, thereby checking whether the period of synchronization is updated from the existing value. At this time, information is transmitted before the period is actually changed, such that the terminal may immediately receive the updated synchronization. At this time, Alternative 1. The change of the period is informed an absolute time before a period change point in time (e.g., 40 ms before the change).

Alternative 2. The period is changed immediately after transmitting a sync signal informing the change point in time.

[Multi-Cell Measurement Support]

C and/or F which is a signal for mobility/measurement may be used for the UE to perform handover. In order for the UE to perform handover, there is a need to know information of C and/of F of a neighboring cell. The corresponding information may include period information of C and/or F, frequency/time mapping information, the number of antenna ports used to transmit C and/or F, and the like.

In the case of Alternative scenario 1, a method for acquiring information on a measurement signal (i.e., C and/or F) of a neighboring cell is as follows.

Alternative 1. A case in which C and/or F is used at the time of HO

Alternative 1-1. In the case in which C and F are the same signal, and transmitted together with the sync signal (e.g., FIG. 2A), the terminal decodes B of a neighboring cell after receiving A of the neighboring cell, thereby acquiring configuration information (mapping, pattern, and period information) for C and/or F of the neighboring cell. This information is used for measurement for HO later.

Alternative 1-2. If only C of C and F of the neighboring cell is transmitted, the terminal decodes B of the neighboring cell after receiving A of the neighboring cell, thereby acquiring configuration information (mapping, pattern, and period information) for C of the neighboring cell. This information is used for measurement for HO later.

Alternative 1-3. If only F of the neighboring cell is transmitted, the terminal finds out a period of connected synchronization (i.e., D of neighboring cell) by the above described methods, and then acquiring configuration information of F by decoding E of the neighboring cell. This information is used for measurement for HO later.

Alternative 1-4. Alternatively, in the situation of Alternatives 1-1, 1-2, and 1-3 (the case in which C and F are the same signal and transmitted together with the sync signal, or the case in which only C of C and F of the neighboring cell is transmitted, or the case in which only F of the neighboring cell is transmitted), a serving cell TRP may inform mobility measurement signal information of the neighboring cell. For example, the serving cell TRP may inform a period of C and/or F of the neighboring cell or a period of D of the neighboring cell together with a cell-ID of the neighboring cell through the SIB (cell-specific RRC signaling) or UE-specific RRC signaling. Further, configuration information of C and/or F may also be transmitted together through the cell-specific or UE-specific RRC signaling. As described above, the configuration information of C and/or F may include period information, frequency/time mapping information, the number of antenna ports used to transmit C and/or F, and the like.

Alternative 1-5. If C and/or F is a designated signal that may be selected only with the cell-ID, the terminal may perform neighboring cell measurement by acquiring only the period information without other information of C and/or F of the neighboring cell. The period information of C and/or F of the neighboring cell may be informed by the TRP of the serving cell to the UE through the SIB (cell-specific RRC signaling) or UE-specific RRC signaling.

Figure 2C:
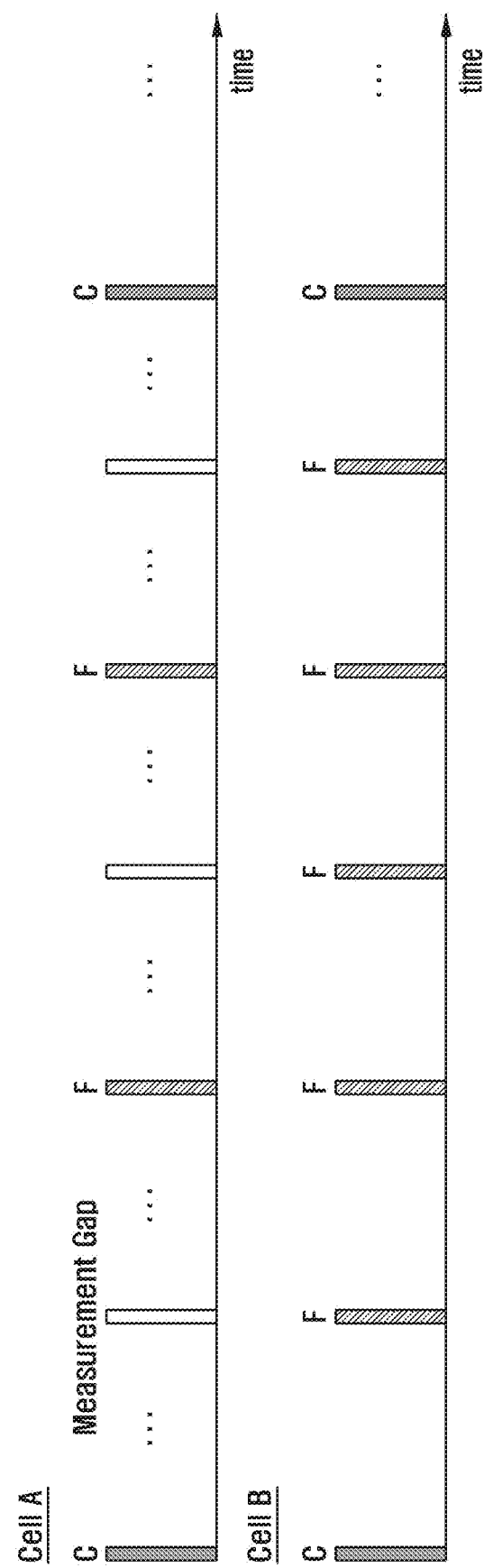
FIG. 2C is a diagram illustrating an example related to neighboring cell measurement of Alternative scenario 1 according to an embodiment of the present disclosure.

In the case in which the period of C and/or F for each cell is different, and the terminal performs beam sweeping, if the terminal performs measurement for a neighboring cell, a situation in which a measurement signal needs to be received through an RX beam having different directivity, rather than an RX beam associated with the current serving cell may occur. Therefore, while the terminal performs measurement for the neighboring cell, there is a need for the serving cell not to transmit a DL signal for the terminal (see FIG. 2C). As such, there is a need to designate a section (i.e., measurement gap) allowing measurement for the neighboring cell of the terminal. As a method for designating the measurement gap, the following methods may be used.

Alternative 1. The TRP informs period information of the measurement gap and a start point (e.g., SF number) of the measurement gap for each UE through the UE-specific RRC signaling. In the measurement gap designated for the UE, DL information for the corresponding UE is not transmitted.

Alternative 2. A case in which a sync signal is a mobility/measurement signal

Alternative 2-1. A case in which only A is used as a mobility/measurement signal, and C and/or F exists Alternative 2-1-1. Measurement is performed by receiving only A of the neighboring cell.

Alternative 2-1-2. Period information of D is acquirement through PBCH after receiving A of the neighboring cell, and after receiving D, configuration information of C and/or F is acquired through E. C and/or F, or A and C and/or F are simultaneously used for measurement.

Alternative 2-2. A case in which both A and D are used as a mobility/measurement signal Alternative 2-2-1. Measurement is performed by receiving only A of the neighboring cell.

Alternative 2-2-2. After receiving A of the neighboring cell, period information of D is acquired through PBCH of the neighboring cell, and D, or A and D are used for measurement.

Alternative 2-3. In both of Alternatives 2-1 and 2-2, a serving cell base station may inform information of a mobility/measurement signal of a neighboring cell base station. For example, a period of D and/or a period of C/F may be transmitted together with a cell-ID of the neighboring cell through the SIB (cell-specific RRC signaling) or UE-specific RRC signaling.

In the case in which the terminal performs beam sweeping together with measurement based on synchronization, if the terminal performs measurement for a neighboring cell, a situation in which a measurement signal needs to be received through an RX beam having different directivity, rather than an RX beam associated with the current serving cell may occur. Therefore, while the terminal performs measurement for the neighboring cell, there is a need for the serving cell not to transmit a DL signal for the terminal (concept similar to FIG. 2C). As such, there is a need to designate a section (i.e., measurement gap) allowing measurement for the neighboring cell of the terminal. As a method for designating the measurement gap, the following method may be used.

Alternative 1. The TRP informs period information of the measurement gap and a start point (e.g., SF number) of the measurement gap for each UE through the UE-specific RRC signaling. In the measurement gap designated for the UE, DL information for the corresponding UE is not transmitted. D of the serving cell is not transmitted as well.

In the case of Alternative scenario 2, the information may be transmitted to the neighboring cell by the following methods.

Alternative 1. A case of using C

Alternative 1-1. The terminal decodes B after receiving A of the neighboring cell to acquire configuration information (mapping, pattern, and period information) for C. This information is used for measurement for HO later.

Alternative 1-2. If C distinguished only with cell-ID is designated in advance, the terminal uses C for measurement for HO after receiving A of the neighboring cell.

Alternative 2. A case of using A

Measurement is performed by receiving only A of the neighboring cell.

Alternative 3. In both of Alternatives 1 and 2, a serving cell base station may inform information of a mobility/measurement signal of a neighboring cell base station. For example, period information of C may be transmitted together with a cell-ID of the neighboring cell through the SIB (cell-specific RRC signaling) or UE-specific RRC signaling.

If a period of D for each cell is different and the terminal performs beam sweeping, the measurement gap is also needed for the case of Alternative scenario 2.

[Update of Periodicity of C, D, E, F]

In Alternative scenarios described above, if the network intends to change the periods of the C, D, E, and F signals that may be changed in addition to the synchronization transmitted at a fixed period in Alternative scenario 1, or intends to change the period in Alternative scenario 2, this information needs to be updated for the connected users of the serving cell. The update of the period information in Alternative scenario 1 may be performed by the following methods.

Alternative 1. Period values of C, D, E, and/or F are updated through channel B. Only the period information for some physical channels of C, D, E, and/or F may be transmitted. The terminal check whether the update is made from the existing value by continuously receiving the transmitted period value.

Alternative 2. Whether the period is changed is indicated through DCI. It is possible to specify a definite point in time (e.g., after +2 SF) at which the period is changed.

In the case of Alternative scenario 2, the period value information is transmitted through a sequence, thus the terminal continuously detect a sync sequence, thereby checking whether the period of synchronization is updated from the existing value. At this time, information is transmitted before the period is actually changed, such that the terminal may immediately receive the updated synchronization. At this time, Alternative 1. The change of the period is informed an absolute time before a period change point in time (e.g., 40 ms before the change).

Alternative 2. The period is changed immediately after transmitting a sync signal informing the change point in time.

When the terminal intends to perform HO, C, D, E, and/or F of the neighboring cell may be used. At this time, if the period of the neighboring cell is changed, the change information needs to be acquired by the terminal. The terminal may directly acquire the corresponding information by receiving A and/or B, but if the serving cell base station transmits the corresponding information to the terminal in the serving cell, the following methods may be used.

Alternative 1. Transmitting through system information

That is, it is possible to transmit the information through physical channel B. The corresponding information may be included in the MIB or SIB.

Alternative 2. Transmitting through an RRC reconfiguration message

Alternative 3. Transmitting the corresponding information through DCI

Alternative 4. Transmitting the corresponding information through MAC-CE

Alternative 5. Transmitting the corresponding information through PDSCH (message for each terminal)

If the measurement gap information is changed, the corresponding information may also be transmitted through the channel together. For example, the changed period information of the neighboring cell is transmitted through Alternative 1, and the changed measurement gap information for each terminal may be transmitted through the RRC reconfiguration message. Alternatively, the changed period information of the neighboring cell and the changed measurement gap information for each terminal may be transmitted through the PDSCH.

When the terminal intends to perform measurement for the neighboring cell, if a signal (A, C, D, and/or F) that may perform the measurement of the neighboring cell is not transmitted, the terminal may request the signal for performing the measurement to the serving base station. Thereafter, the serving base station may transmit or not transmit the signal for the measurement by transmitting the corresponding request to the neighboring cell.

The terminal may check whether or not a measurement signal of a neighboring cell is transmitted through the serving cell base station, or by directly receiving A/B of the neighboring cell. For example, if the serving cell base station informs a cell-ID of the neighboring cell through the SIB or UE-specific RRC signaling, but measurement signal information for the corresponding cell is not transmitted, and the terminal intends to perform measurement for the corresponding neighboring cell, the terminal may request transmission of the measurement signal of the neighboring cell to the serving cell through the PUCCH or PDSCH. If the corresponding terminal (terminal requesting a measurement signal for neighboring cell A) terminates connection with the serving cell base station (if performing HO to other cell), the serving cell base station informs the corresponding fact to the neighboring cell, such that the neighboring cell may not transmit the measurement signal when it is not necessary, thereby helping decrease energy consumption of the base station.

[Sync Design for Supporting Fast Paging Process]

Figure 2D:
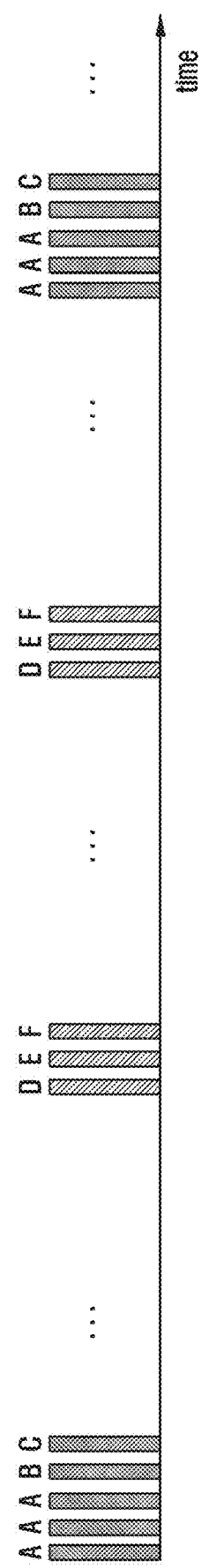
FIG. 2D is a diagram illustrating another example of Alternative scenario 1 according to an embodiment of the present disclosure.

For an UE in an idle state, a process of finding a reception beam for receiving paging information through UE Rx beam sweeping during a short period of time is required after waking up for receiving the paging information. A or C may be used therefor, and in order to perform the corresponding operation within a short time, A and C need to be repeatedly transmitted many times (FIG. 2D).

For this, the following methods may be considered.

Alternative 1. A subcarrier spacing for synchronization transmission for a non-connected UE is designed to be larger than a subcarrier spacing for data transmission, such that a sync signal transmitted in the same beam is repeated multiple times for nominal symbol duration (one symbol duration of data). The terminal may perform reception beam sweeping for selecting a Rx beam through the sync signal transmitted multiple times within the corresponding time (FIG. 2D).

Alternative 2. Synchronization for the synchronization transmission for the non-connected UE may be repeatedly transmitted multiple times using the same subcarrier spacing as that of the data (FIG. 2D).

Alternative 3. At the time of synchronization for the non-connected UE, a case of transmission of a sync signal with high density and a case of transmission of a sync signal with low density may be mixedly used. For example, a sync signal for the non-connected UE with high sync density may be transmitted occasionally for terminal waking up to receive paging information. In a period in which the sync signal for the non-connected UE with high sync density is not transmitted, a sync signal for the non-connected UE with low sync density is transmitted. That is, if a transmission period of a sync signal for a non-connected UE is 100 ms, the sync signal for the non-connected UE with high density is transmitted every 1000 ms, and the sync signal for the non-connected UW with low sync density is transmitted at the rest transmission point in time. This is shown in FIG. 2E. The sync signal for the non-connected UE with high sync density may be generated by the method introduced in Alternative 1/2 above. Accordingly, the terminal intending to receive paging information may wake up earlier than an originally scheduled point in time to receive the sync signal for the non-connected UE with high sync density, and a period of the sync signal for the non-connected UE with high sync density may be configured through the MIB, SIB, UE-specific RRC signaling, and the like when in the connected state.

[TSS and PBCH Design]

As described above, in the case of a multi-beam based system transmitting signals beam-swept by using a continuous OFDM symbol, a boundary of a subframe (SF) or slot may not be recognized by synchronization using the PSS and SSS. Thus, the system may be designed so as to recognize the boundary of slot/subframe using the SSS sequence and PBCH information. Alternatively, a new synchronization signal may be introduced for the corresponding function (i.e., or tertiary synchronization signal (TSS)). Hereinafter, the corresponding signal is referred to as TSS. The TSS uses different sequences for each OFDM symbol such that from which OFDM symbol a beam detected by the terminal is transmitted may be known, thereby being used to determine the boundary of slot/subframe.

In order for the non-connected UE to select a cell or in order for the connected UE to change a cell, there is a need to perform measurement for a neighboring cell. The measurement for the neighboring cell may be performed through a synchronization signal (SS) or a reference signal for measurement. However, since the synchronization signal is transmitted through a more wide beam as compared to the reference signal for measurement, and may be transmitted only in a relatively narrow band, accuracy of a measurement value (metric) may deteriorate. Thus, it is more efficient to use the reference signal for measurement in selecting a cell or changing a cell. Basically, units of beam sweeping time of the synchronization signal and the reference signal for measurement are the same as each other (e.g., 2 subframes), and both of the two signals may be used as a signal for measurement (RRM measurement of a terminal), thus the two signals will hereinafter be referred to as a "measurement signal".

In the multi-beam based system, signals like the TSS and the reference signal for measurement need to be cell-specific, periodically transmitted, and beam-swept to be transmitted. This is because the corresponding signals are signals that may be received by all users in any position in a cell.

Figure 2F:
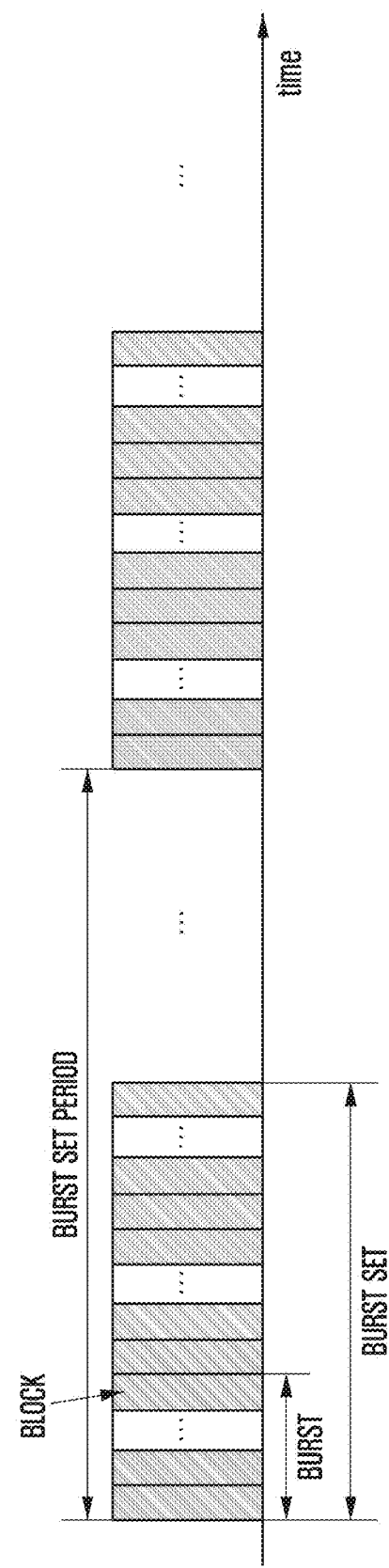
FIG. 2F is a diagram illustrating a unit of a signal that is beam-swept in a multi-beam system including a block, a burst, and a burst set (continuous burst) according to an embodiment of the present disclosure.
Figure 2G:
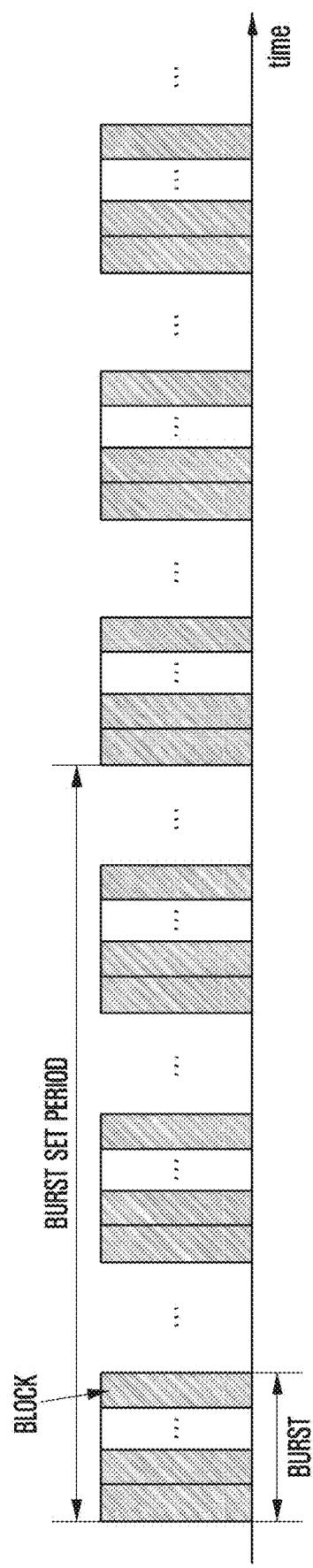
FIG. 2G is a diagram illustrating a unit of a signal that is beam-swept in a multi-beam system including a block, a burst, and a burst set (discontinuous burst) according to an embodiment of the present disclosure.
Figure 20:
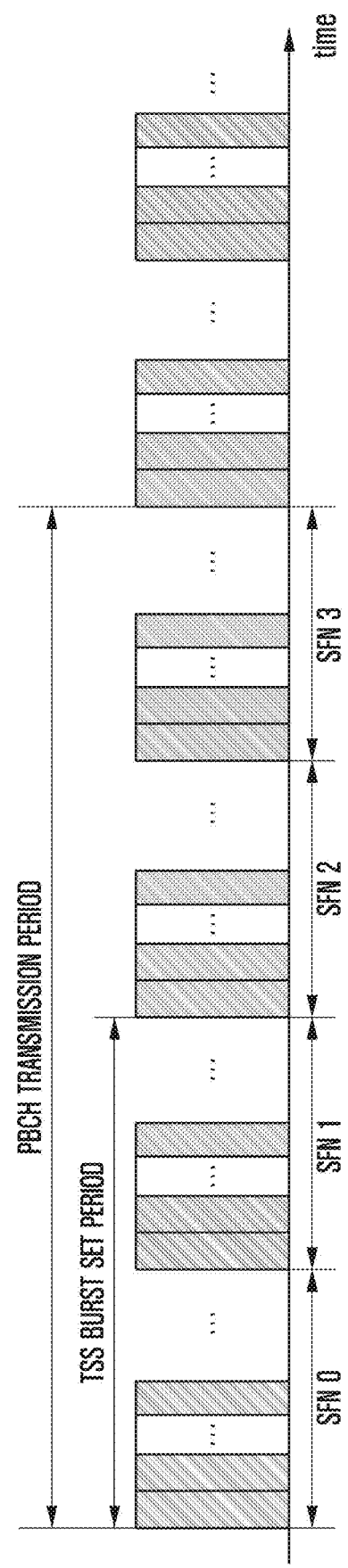

For understanding of the technology described below, a division of the signal beam-swept in the multi-beam system is shown in FIGS. 2F and 2G.

In FIGS. 2F and 2G, a burst may occupy one slot or one subframe, and a burst set basically may include a signal that is beam-swept of one period. A burst set period indicates a period in which a burst set is generated. Further, a subunit configuring burst is a block. Each block may be transmitted using different transmission beams. Each block may be configured of a single or a plurality of OFDM symbols. FIG. 2F shows a case in which a burst is continuously transmitted in a burst set period, and FIG. 2G shows a case in which a burst is discontinuously transmitted in a burst set period.

In an embodiment of the present disclosure, it is assumed that the TSS burst set period and a burst set period of a measurement signal are the same as each other.

In order for the terminal to perform measurement using the measurement signal, terminal needs to know configuration information for the corresponding measurement signal. For receiving the corresponding measurement signal in the multi-beam system, the terminal needs the following configuration information:

Information 1) A block number in a burst set (that is, slot/frame boundary)

Information 2) An entire size of a burst set transmitting the corresponding measurement signal or the number or period of occupied slot/subframe/frame Information 3) The number of antenna ports used at the time of transmission of the measurement signal Information 4) Single beam/multi-beam based system identification Usually, the NR system is basically based on the multi-beam in above-6 GHz band, however, in some cells (or TRP or TRP group), a single-beam based system may also be driven, rather than the multi-beam based system. In this case, the single-beam based system is a special case of the multi-beam-based system, and beam sweeping the cell-specific signals is not accompanied unlike the multi-beam based system. That is, it refers to a situation in which the number of block in a burst is 1. If a cell (or TRP or TPR group) supporting the terminal informs that it is a single-beam based system in advance, much signaling overheads such as beam-related information feedback accompanied in the multi-beam based system may be decreased later. Information 4 is to transmit information on this through the TSS.

The TSS may be used to inform terminal of the configuration information of the measurement signal described above. In the case of transmitting the corresponding information using the TSS, the information may be more rapidly and conveniently acquired as compared to the case in which the configuration information of the measurement signal can be acquired only when the terminal performs PBCH. Some of three Information above may be fixed to standard, and in this case, the information on the fixed information need not be transmitted through the TSS. For example, if the terminal uses a synchronization signal as the measurement signal, Information 3 need not be transmitted through the TSS. For TSS design, the following embodiments are possible.

Embodiment 1-1) Information 1 and Information 2 may be distinguished using different versions of cyclic shifts. FIG. 2H shows an example of a cyclic shift index of the TSS for transmitting Information 1 and Information 2 in a case in which sequence having a length of L (that is, d(0), . . . , d(L-1)) is used as a basic sequence for the TSS; in a case in which one block is one OFDM symbol; in a case in which a unit occupied by one burst is one subframe; and a period of a burst set is 1,2 or 4 frames.

The TSS sequence transmitted in an m-th block is $$\tilde{d}^m(n)=d((n+\Delta_m)\bmod L)\ n=0,1,\ldots,L-1$$

That is, the terminal may acquire Information 1 and Information 2 through the received TSS sequence. For example, if a TSS detection result received by the terminal indicates that the sequence is [d(14), d(L-1), d(0), d(13)], it may be appreciated that the measurement signal is transmitted through one time of beam sweeping during two subframes, and an OFDM symbol receiving the TSS is a first OFDM symbol in the subframe (symbol number in the subframe is 0).

Embodiment 2-2) A TSS structure for transmitting information 1/2/4 is proposed. With the extension of embodiment 2-1, the information 1/2/4 can be transmitted by making the root index of the TSS sequence different, and an example of which is shown in FIG. 2I.

Embodiment 2-3) A TSS structure for transmitting information 1/2/4 is proposed. With the extension of embodiment 2-1, the information 1/2/4 can be transmitted by making the cyclic shift and the root index of the TSS sequence different, and an example of which is shown in FIG. 2m.

Embodiment 3-1) It is possible to distinguish information 1, information 2, and information 3 using different versions of cyclic shifts and root indices. FIG. 2n shows an example of the root index and the cyclic shift index of the TSS for transmitting the information 1/2/3 when a sequence (i.e., du (0), . . . , du (L-1)) of length L whose root index is u is used as a basic sequence for TSS; when one block is one OFDM symbol; when a unit occupied by one burst is one subframe; and when a period of a burst set is one, two, or four frames; and when the number of antenna ports is 1, 2, or 4.

The TSS sequence transmitted in an m-th block for each burst in the burst set is as follows:

$$\tilde{d}_u^m(n)=d_u((n+\Delta_m)\bmod L)\ n=0,1,\ldots,L-1$$

That is, the terminal can know the information 1 and the information 2 through the received TSS sequence. For example, if the root index of the sequence is r2 and the sequence value is [d(1), . . . , d(L-1), d(0)] as a result of the TSS detection received by the terminal, the measurement signal is transmitted through two antenna ports in one OFDM symbol (i.e., transmitted in two different directions of beam), and the number of bursts in the burst set is one, and the OFDM symbol receiving the TSS in the burst set is a second OFDM symbol (symbol number 1 in a subframe).

In addition to the embodiment shown in FIG. 2n, the method for dividing the information 2 through the root index of the TSS sequence, and dividing the information 1 and the information 3 through the cyclic shift index is possible.

Embodiment 3-2) In distinguishing Information 1/2/3/4, as described in Embodiment 1-2 or 2-2, when the number of burst in a burst set is 1, in order to distinguish a single-beam based system and a multi-beam based system, the TSS sequence root index or the cyclic shift of the TSS sequence, etc. may be used.

In the case in which the TSS serves to transmit the information (as described above, some information may be selected as a value fixed in standard, and in this case, the corresponding information may not need to be transmitted), PBCH decoding may be performed based on the information acquired through the TSS. Describing in more detail, a scrambling sequence of the PBCH may be differently applied based on the information transmitted through the TSS, thereby decreasing complexity in decoding by the terminal. The method described below may be applied to a burst transmission structure as in FIG. 2g. For reference, the PBCH is a physical channel transmitting some or all of minimum system information (minimum SI) in a 3GPP New RAT standard. Therefore, basically, the PBCH also needs to be transmitted through beam sweeping, and in the present disclosure, it is assumed that a TSS transmission burst set and a PBCH transmission burst set have the same period. An actual PBCH transmission period may be larger than the PBCH transmission burst set period due to repetitive transmission.

A more specific embodiment will be described while being divided into two cases.

<Situation 1: A Case in Which a PBCH Transmission Period is Fixed>

For example, a transmission period of the PBCH may be fixed regardless of a period of a burst set transmitting a measurement signal. For example, as shown in FIG. 2L, in the case in which the transmission period of the PBCH is fixed to 4 frames, if a period of the measurement signal transmission burst set is 2 frames, the same PBCH information is repeated twice for the transmission period of the PBCH (this is to perform more robust PBCH information decoding).

At this time, $M_{bit}$ information bit blocks b(0), . . . , b($M_{bit}$-1) to be transmitted through the PBCH are scrambled to $\tilde{b}(i)=(b(i)+c^{n_f}(i))\bmod 2$ using a cell-specific sequence before modulation, and a method thereof is as follows:

If a system frame number (SFN) is $n_f$, a TSS/PBCH burst set period is K frames, and a PBCH transmission period is Q frames, a scrambling sequence $c^{n_f}(i)$ has a period of Q. That is, a scrambling sequence $c^{n_f}(i)$ applied to a PBCH transmitted in a $n_f$-th frame and a scrambling sequence applied to a PBCH transmitted in a $n_f+Q$-th frame are the same as each other. In a $n_f\sim n_f+Q$-th frame satisfying $n_f$ mod $Q$=0, a scrambling sequence is changed every W=min (K,$Q$) frame. That is, all scrambling sequences applied to PBCHs transmitted in ($n_f$+mW), . . . , ($n_f$+mW+W-1)-th frames obtained when substituting each m from the $n_f$-th frame satisfying $n_f$ mod $Q$=0 are the same as each other, but different scrambling sequences are used for different m values.

That is, in FIG. 2N, K=2 and Q=4, thus W=2, the same scrambling sequence is used in SFN0 and SFN1 frames (that is, $c^0(i)=c^1(i)$=seq1), and the same scrambling sequence is used in the SFN2 and SFN3 frames as well (that is, $c^2(i)=c^3(i)$=seq2). However, scrambling sequence used in the SFN0/1 and SFN2/3 frames are different from each other (difference m values).

If a period of a TSS/PBCH burst set may not be acquired through the TSS, a scrambling sequence needs to be changed for every frame in a PBCH period, and the terminal needs to bear somewhat high PBCH blind decoding complexity in order to find out an accurate system frame number. However, if the corresponding information may be acquired through the TSS, at the time of PBCH transmission, the smaller number of scrambling sequences may be used, thereby decreasing decoding complexity of the terminal.

<Situation 2: A case in which a PBCH transmission period is changed according to an entire size of a burst set transmitting the corresponding measurement signal or the number of occupied slot/subframe>

For example, if the number of subframes occupied by a burst set transmitting a measurement signal is X, and if the same PBCH information is repeated four times (this is to perform more robust PBCH information decoding), a transmission period of the PBCH is 4X subframes.

At this time, $M_{bit}$ information bit blocks b(0), . . . , b($M_{bit}$−1) to be transmitted through the PBCH are scrambled to b̃(0), . . . , b̃($M_{bit}$−1) using a cell-specific sequence before modulation, and a method thereof is as follows:

$$\tilde{b}(i)=(b(i)+c^{n_f}(i)) \bmod 2$$

If a system frame number (SFN) is $n_f$, a TSS/PBCH burst set period is K frames, and a PBCH transmission period is Q frames, a scrambling sequence $c^{n_f}(i)$ has a period of Q.

That is, a scrambling sequence $c^{n_f}(i)$ applied to a PBCH transmitted in a $n_f$-th frame and a scrambling sequence $c^{n_f+Q}(i)$ applied to a PBCH transmitted in a $n_f+Q$-th frame are the same as each other. In a $n_f$−$n_f+Q$-th frame satisfying $n_f \bmod Q$=0, a scrambling sequence is changed every K frame. That is, all scrambling sequences applied to PBCHs transmitted in ($n_f$+mK), . . . , ($n_f$+mK+K−1)-th frames obtained when substituting each m from the $n_f$-th frame satisfying $n_f \bmod Q$=0 are the same as each other, but different scrambling sequences are used for different m values.

That is, in FIG. 2N, K=2 and Q=4, thus the same scrambling sequence is used in SFN0 and SFN1 frames (that is, $c^0(i)=c^1(i)$=seq1), and the same scrambling sequence is used in the SFN2 and SFN3 frames as well (that is, $c^2(i)$=$c^3(i)$=seq2). However, scrambling sequence used in the SFN0/1 and SFN2/3 frames are different from each other (difference m values).

[PBCH Design]

The following information may be included in a PBCH.

Information 1) An entire size of a burst set transmitting the measurement signal or the number or period of occupied slot/subframe/frame Information 2) The number of antenna ports used at the time of transmission of the measurement signal In this case, only a block number in a burst set (that is, slot/frame boundary) is included in a TSS.

[Configuration of SS Block]

One SS block may include some or all of a PSS, SSS, TSS, PBCH, and a reference signal (RS) for PBCH decoding. One OFDM symbol duration is determined based on a subcarrier spacing of a data channel, and one SS block may be configured of a single or a plurality of OPDM symbols or OFDM subsymbols according to a value of the subcarrier spacing transmitting the SS block. For example, if a subcarrier spacing of the data channel is 60 kHz, and a value of a subcarrier spacing used when transmitting the SS block is 240 kHz, the SS block may form a channel configured of four OFDM subsymbols. The reference signal for PBCH decoding may also be used as a RRM measurement reference signal, and the RRM measurement reference signal may be used at the time of beam selection or cell selection/re-selection. Both of the PSS and the SSS may be used for cell-ID detection, or only the SSS may be used for cell-ID detection. The PSS is basically used to estimate initial frequency/time offset. The TSS serves to transmit information such as a slot/frame boundary, SS block number indication in an SS burst, an SS burst size, the number of antenna ports transmitting the RRM measurement reference signal, and the like. The PBCH transmits some or all of minimum SI defined in NR. Embodiments for a method of multiplexing the channels in the SS block will be described below.

Figure 2P:
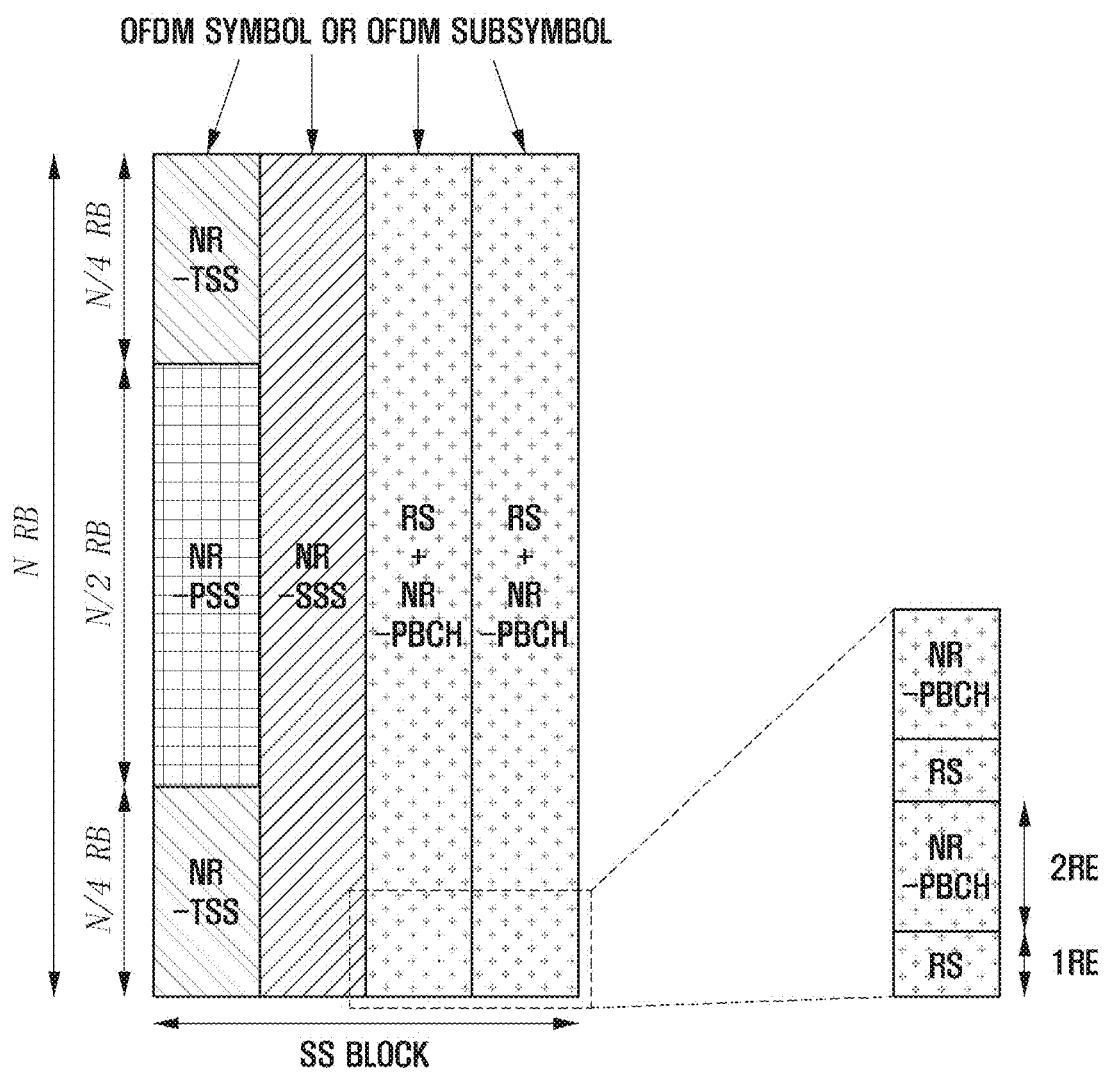
FIG. 2P is a diagram illustrating multiplexing of a PSS, SSS, TSS, PBCH, and reference signal for PBCH decoding in an SS block according to an embodiment of the present disclosure.

Embodiment 1) FIG. 2P is a diagram illustrating an example of multiplexing of a PSS, SSS, TSS, PBCH and reference signal for PBCH decoding. As an example, a case in which SS block subcarrier spacing=120 kHz and SS-BW=40 MHz or SS block subcarrier spacing=240 kHz and SS-BW=80 MHz may be considered, and in this case, detailed design parameters are as follows.

PSS: 12 RBs=144 REs
SSS: 24 RBs=288 REs
TSS: 12 RBs=144 REs
PBCH+BRS: 48 RBs=576 REs
PBCH:BRS ratio=2:1

Here, RB represents a resource block, and RE represents a resource elements. In FIG. 2P, in addition to the reference signal for PBCH decoding, the SSS may also be used for the PBCH decoding. In FIG. 2P, an order between OFDM symbols or OFDM subsymbols in the SS block may be changed.

Embodiment 2-1) FIG. 2P is a diagram illustrating an example of multiplexing of a PSS, SSS, TSS, PBCH and reference signal for RRM measurement. As an example, a case in which SS block subcarrier spacing=120 kHz and SS-BW=40 MHz or SS block subcarrier spacing=240 kHz and SS-BW=80 MHz may be considered, and in this case, detailed design parameters are as follows.

PSS: 12 RBs=144 REs
SSS: 24 RBs=288 REs
TSS: 12 RBs=144 REs
PBCH: 48 RBs=576 REs

Figure 2Q:
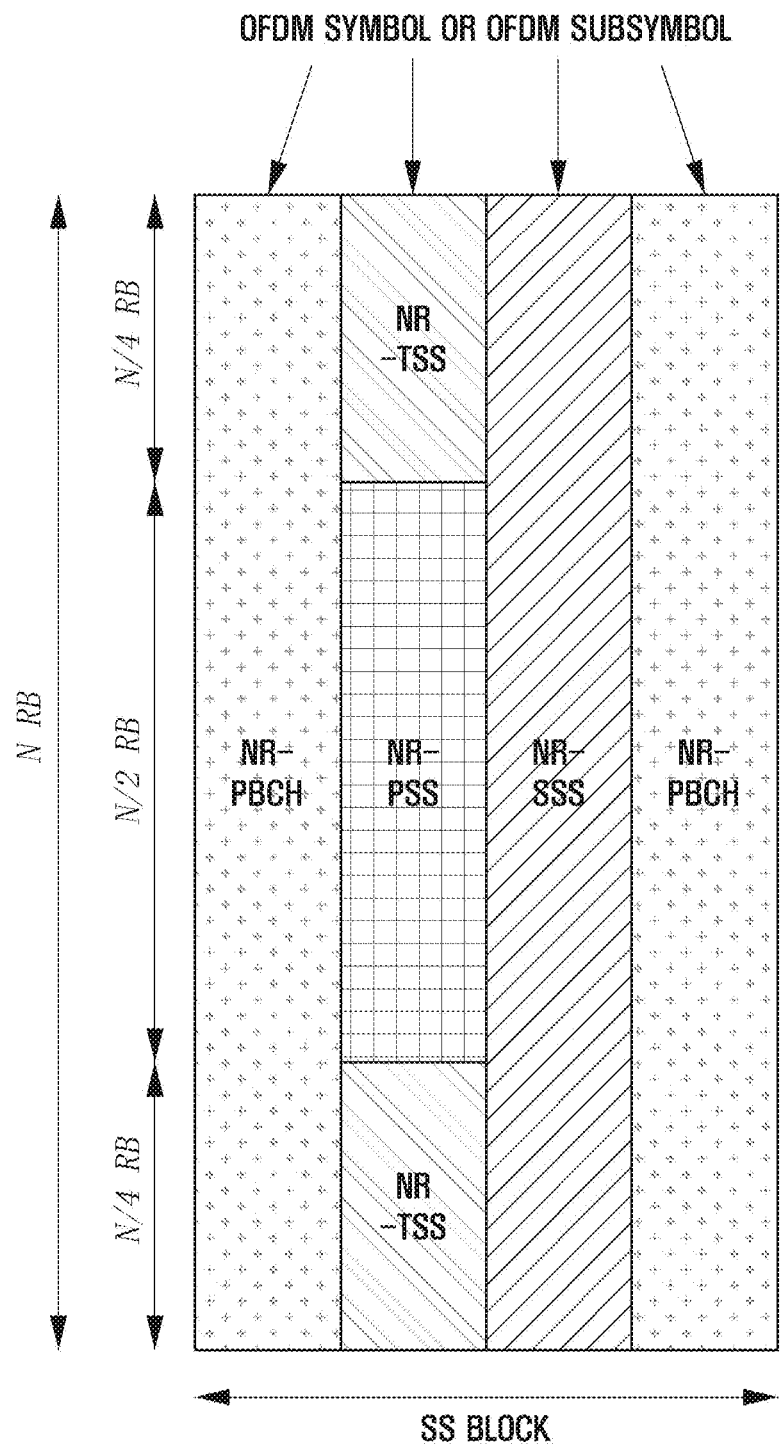
FIG. 2Q is a diagram illustrating multiplexing 1 of a PSS, SSS, TSS, and PBCH in an SS block according to an embodiment of the present disclosure.

In the embodiment of FIG. 2Q, the SSS may be used as a reference signal at the time of PBCH decoding. In FIG. 2Q, an order between OFDM symbols or OFDM subsymbols in the SS block may be changed. Even when SS block subcarrier spacing=120 kHz and SS-BW=20 MHz or SS block subcarrier spacing=240 kHz and SS-BW=40 MHz, the same form of multiplexing may be applied, and in this case, an RB occupied by each channel becomes exactly half.

Figure 2R:
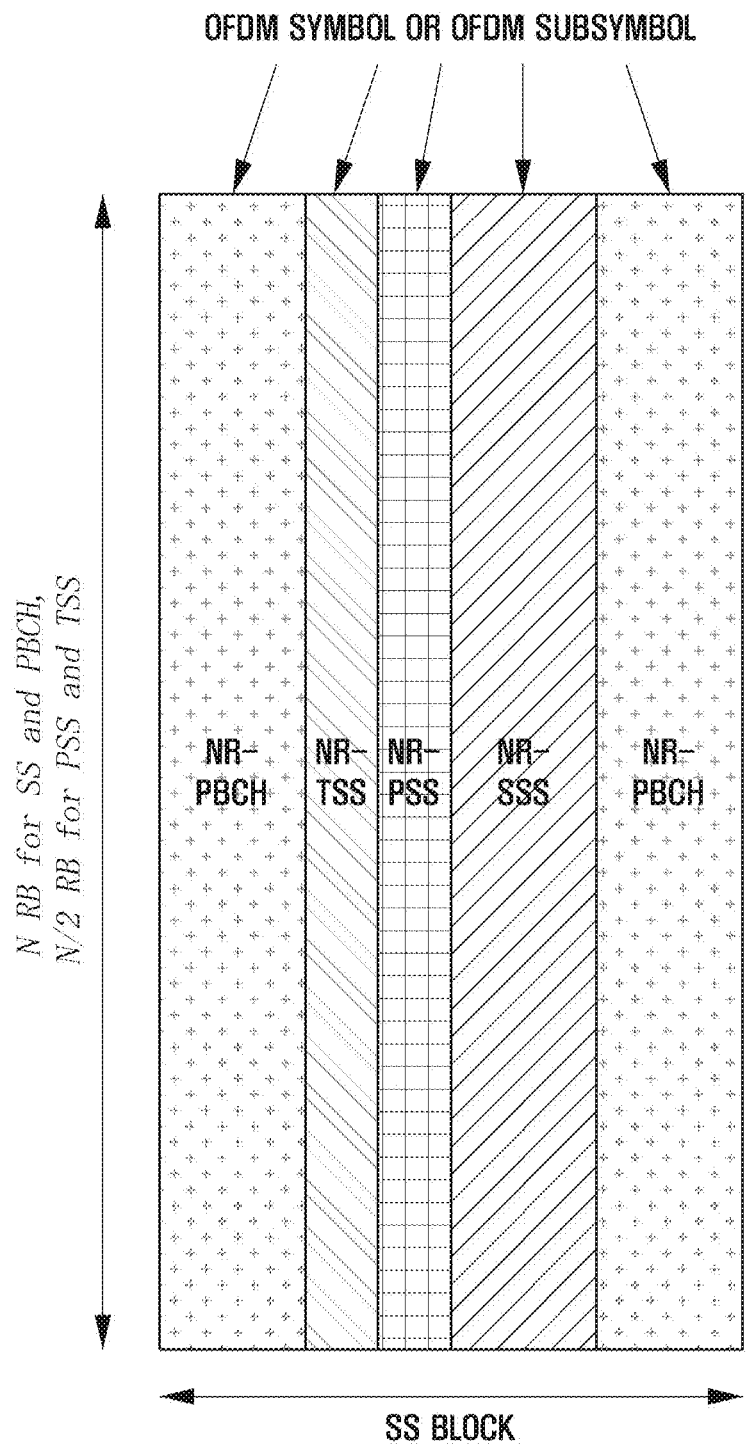
FIG. 2R is a diagram illustrating multiplexing 2 of a PSS, SSS, TSS, and PBCH in an SS block according to an embodiment of the present disclosure.

Embodiment 2-2) FIG. 2R is a diagram illustrating an example of multiplexing of a PSS, SSS, TSS, PBCH and reference signal for RRM measurement. As an example, a case in which SS block subcarrier spacing=120 kHz and SS-BW=40 MHz or SS block subcarrier spacing=240 kHz and SS-BW=80 MHz may be considered, and in this case, detailed design parameters are as follows.

PSS: 12 RBs=144 REs (based on subcarrier spacing having size of SS block subcarrier spacing×2)
SSS: 24 RBs=288 REs
TSS: 12 RBs=144 REs (based on subcarrier spacing having size of SS block subcarrier spacing×2)
PBCH: 48 RBs=576 REs In the embodiment of FIG. 2R, the PSS and the TSS may be transmitted at a subcarrier spacing corresponding to two times the SS block subcarrier spacing. Further, the SSS may be used as a reference signal at the time of PBCH decoding. In FIG. 2R, an order between OFDM symbols or OFDM subsymbols in the SS block may be changed. Even when SS block subcarrier spacing=120 kHz and SS-BW=20 MHz or SS block subcarrier spacing=240 kHz and SS-BW=40 MHz, the same form of multiplexing may be applied, and in this case, an RB occupied by each channel becomes exactly half.

Figure 2S:
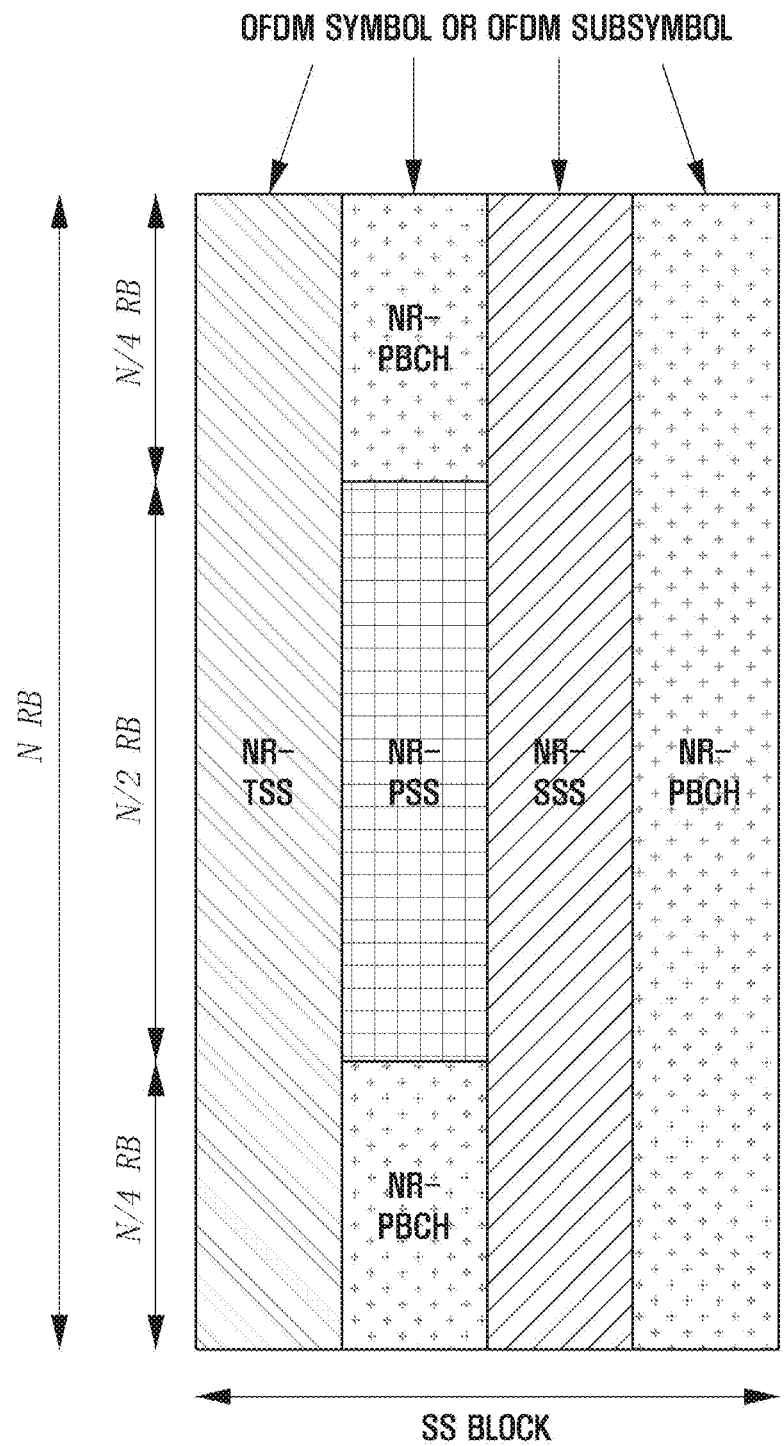
FIG. 2S is a diagram illustrating multiplexing 3 of a PSS, SSS, TSS, and PBCH in an SS block according to an embodiment of the present disclosure.

Embodiment 3) FIG. 2S is a diagram illustrating an example of multiplexing of a PSS, SSS, TSS, PBCH and reference signal for RRM measurement. As an example, a case in which SS block subcarrier spacing=120 kHz and SS-BW=40 MHz or SS block subcarrier spacing=240 kHz and SS-BW=80 MHz may be considered, and in this case, detailed design parameters are as follows.

PSS: 12 RBs=144 REs
SSS: 24 RBs=288 REs
TSS: 24 RBs=288 REs
PBCH: 36 RBs=432 REs

In the embodiment of FIG. 2S, the SSS may be used as a reference signal at the time of PBCH decoding. In FIG. 2S, an order between OFDM symbols or OFDM subsymbols in the SS block may be changed. Even when SS block subcarrier spacing=120 kHz and SS-BW=20 MHz or SS block subcarrier spacing=240 kHz and SS-BW=40 MHz, the same form of multiplexing may be applied, and in this case, an RB occupied by each channel becomes exactly half.

Figure 2T:
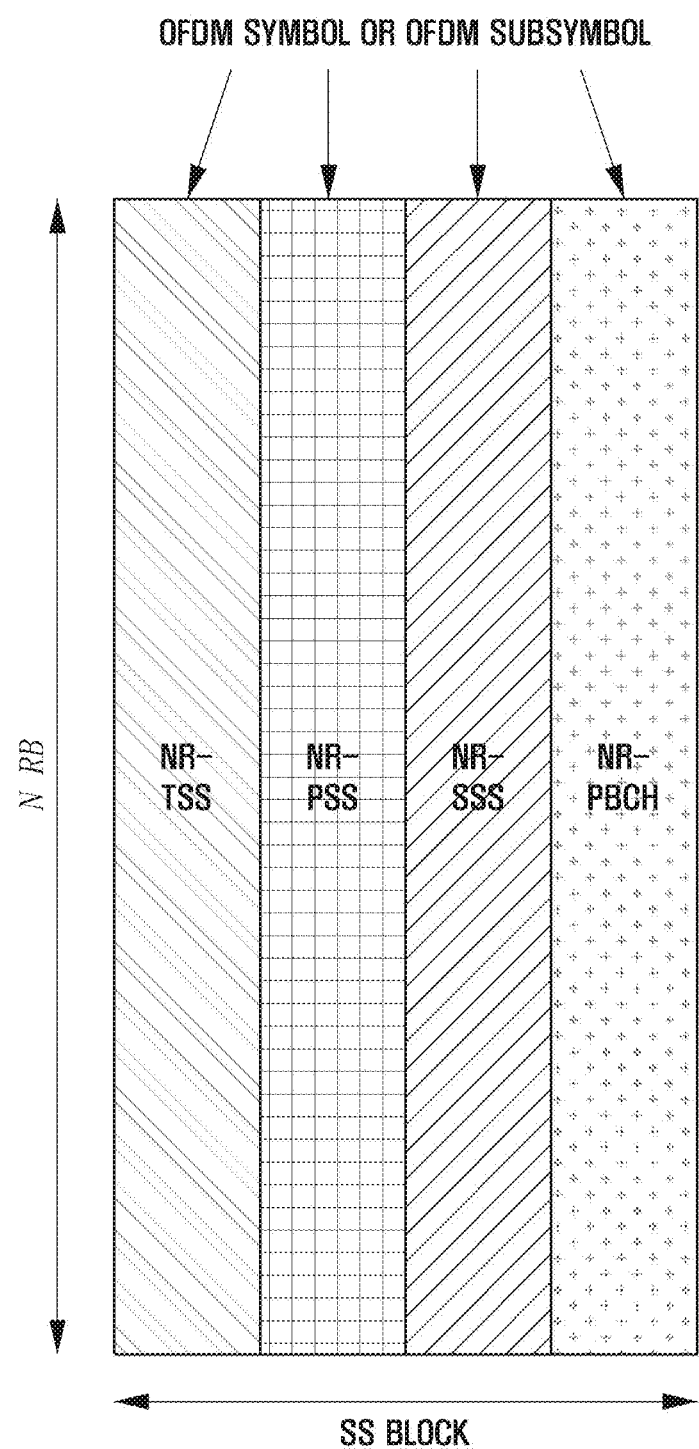
FIG. 2T is a diagram illustrating multiplexing 4 of a PSS, SSS, TSS, and PBCH in an SS block according to an embodiment of the present disclosure.

Embodiment 4) FIG. 2T is a diagram illustrating an example of multiplexing of a PSS, SSS, TSS, PBCH and reference signal for RRM measurement. As an example, a case in which SS block subcarrier spacing=120 kHz and SS-BW=40 MHz or SS block subcarrier spacing=240 kHz and SS-BW=80 MHz may be considered, and in this case, detailed design parameters are as follows.

PSS: 24 RBs=288 REs
SSS: 24 RBs=288 REs
TSS: 24 RBs=288 REs
PBCH: 24 RBs=288 REs

In the embodiment of FIG. 2T, the SSS may be used as a reference signal at the time of PBCH decoding. In FIG. 2T, an order between OFDM symbols or OFDM subsymbols in the SS block may be changed. Even when SS block subcarrier spacing=120 kHz and SS-BW=20 MHz or SS block subcarrier spacing=240 kHz and SS-BW=40 MHz, the same form of multiplexing may be applied, and in this case, an RB occupied by each channel becomes exactly half.

Figure 2U:
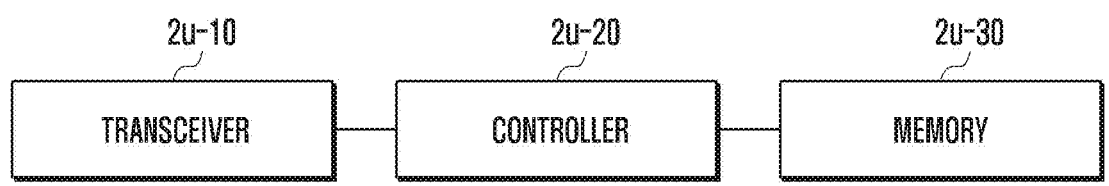
FIG. 2U is a diagram illustrating a configuration of a terminal according to an embodiment of the present disclosure.

FIG. 2U is a diagram illustrating a configuration of a terminal according to an embodiment of the present disclosure.

Referring to FIG. 2U, the terminal may include a transceiver 2u-10, a controller 2u-20, and a memory 2u-30. According to the present disclosure, the controller 2u-20 may be defined as a circuit or application-specific integrated circuit or at least one processor.

The transceiver 2u-10 may transmit and receive a signal to and from other network entity. The transceiver 2u-10, for example, may receive system information from the base station, and may receive a synchronization signal or a reference signal.

The controller 2u-20 may control a general operation of the terminal according to an embodiment suggested in the present disclosure. For example, the controller 2u-20 may control the operation of the terminal described with reference to FIGS. 2A to 2T of the present disclosure.

The memory 2u-30 may store at least one of information transmitted and received through the transceiver 2u-10 and information generated through the controller 2u-20.

Figure 2V:
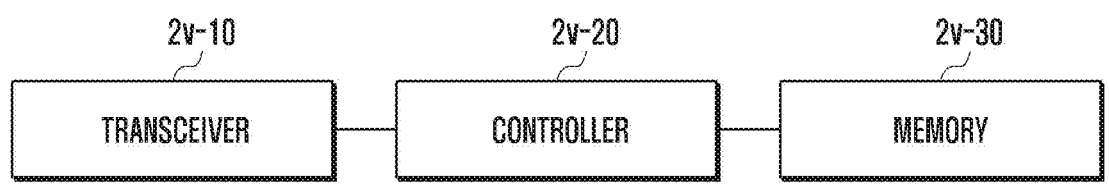
FIG. 2V is a diagram illustrating a configuration of a base station according to an embodiment of the present disclosure.

FIG. 2V is a view illustrating a configuration of a base station according to an embodiment of the present disclosure. In FIG. 2V, a configuration of the base station may also be used as a structure of a TRP. Further, the TRP may also be configured as a part of the configuration of the base station.

Referring to FIG. 2V, the base station may include a transceiver 2v-10, a controller 2v-20, and a memory 2v-30. According to the present disclosure, the controller 2v-20 may be defined as a circuit or application-specific integrated circuit or at least one processor.

The transceiver 2v-10 may transmit and receive a signal to and from other network entity. The transceiver 2v-10, for example, may transmit system information to the terminal, and may transmit a synchronization signal or a reference signal.

The controller 2v-20 may control a general operation of the base station according to an embodiment suggested in the present disclosure. For example, the controller 2v-20 may control the operation of the base station described with reference to FIGS. 2A to 2T of the present disclosure.

The memory 2v-30 may store at least one of information transmitted and received through the transceiver 2v-10 and information generated through the controller 2v-20.

The exemplary embodiments of the present disclosure disclosed in the present specification and the accompanying drawings have been provided merely as specific examples in order to assist in understanding of the present disclosure and do not limit the scope of the present disclosure. Therefore, the scope of the present disclosure should be interpreted that all the modifications or changed forms derived based on the technical idea of the present disclosure are included in the scope of the present disclosure.

The invention claimed is:

1. A method performed by a terminal in a wireless communication system, the method comprising:
   receiving, from a base station, sounding reference signal (SRS) configuration information including a number of symbols and slot information related to a slot on which an SRS is transmitted;
   identifying resources for SRS transmission based on the number of symbols and the slot information;
   determining an SRS transmission power; and
   transmitting the SRS on the identified resources after transmission of uplink data and a demodulation reference signal (DM-RS) based on the SRS transmission power,
   wherein the SRS is transmitted on consecutive symbols within the slot determined based on the number of symbols.

2. The method of claim 1, wherein the SRS configuration information is received via radio resource control (RRC) signaling.

3. The method of claim 1, wherein the number of symbols is indicated by a fixed value.

4. The method of claim 1, wherein the resources include 1, 2, or more symbols.

5. A method performed by a base station in a wireless communication system, the method comprising:
   generating sounding reference signal (SRS) configuration information including a number of symbols and slot information related to a slot on which an SRS is transmitted;
   transmitting, to a terminal, the SRS configuration information; and
   receiving, from the terminal, the SRS on resources identified based on the number of symbols and the slot information after reception of uplink data and a demodulation reference signal (DM-RS),
   wherein the SRS is received on consecutive symbols within the slot determined based on the number of symbols.

6. The method of claim 5, wherein the SRS configuration information is transmitted via radio resource control (RRC) signaling.

7. The method of claim 5, wherein the number of symbols is indicated by a fixed value.

8. The method of claim 5, wherein the resources include 1, 2, or more symbols.

9. A terminal in a wireless communication system, the terminal comprising:
   a transceiver; and
   a controller configured to:
      receive, via the transceiver from a base station, sounding reference signal (SRS) configuration information including a number of symbols and slot information related to a slot on which an SRS is transmitted,
      identify resources for SRS transmission based on the number of symbols and the slot information,
      determine an SRS transmission power, and
      transmit, via the transceiver to the base station, the SRS on the identified resources after transmission of uplink data and a demodulation reference signal (DM-RS) based on the SRS transmission power,
      wherein the SRS is transmitted on consecutive symbols within the slot determined based on the number of symbols.

10. The terminal of claim 9, wherein the SRS configuration information is received via radio resource control (RRC) signaling.

11. The terminal of claim 9, wherein the number of symbols is indicated by a fixed value.

12. The terminal of claim 9, wherein the resources include 1, 2, or more symbols.

13. A base station in a wireless communication system, the base station comprising:
   a transceiver; and
   a controller configured to:
      generate sounding reference signal (SRS) configuration information including a number of symbols and slot information related to a slot on which an SRS is transmitted,
      transmit, to a terminal, the SRS configuration information, and
      receive, from the terminal, the SRS on resources identified based on the number of symbols and the slot information after reception of uplink data and a demodulation reference signal (DM-RS),
      wherein the SRS is received on consecutive symbols within the slot determined based on the number of symbols.

14. The base station of claim 13, wherein the SRS configuration information is transmitted via radio resource control (RRC) signaling.

15. The base station of claim 13,
   wherein the number of symbols is indicated by a fixed value, and
   wherein the resources include 1, 2, or more symbols.

* * * * *